(12) United States Patent
Namiki et al.

(10) Patent No.: US 10,081,707 B2
(45) Date of Patent: Sep. 25, 2018

(54) POLYCARBONATE RESIN, MOLDED ARTICLE, AND OPTICAL FILM

(71) Applicant: MITSUBISHI CHEMICAL CORPORATION, Chiyoda-ku (JP)

(72) Inventors: Shingo Namiki, Fukuoka (JP); Yuuichi Hirami, Fukuoka (JP)

(73) Assignee: MITSUBISHI CHEMICAL CORPORATION, Chiyoda-ku (JP)

( * ) Notice: Subject to any disclaimer, the term of this patent is extended or adjusted under 35 U.S.C. 154(b) by 0 days.

(21) Appl. No.: 15/476,227

(22) Filed: Mar. 31, 2017

(65) Prior Publication Data

US 2017/0204220 A1     Jul. 20, 2017

Related U.S. Application Data

(63) Continuation of application No. PCT/JP2015/080293, filed on Oct. 27, 2015.

(30) Foreign Application Priority Data

Oct. 28, 2014  (JP) ................................. 2014-219462
Jan. 5, 2015   (JP) ................................. 2015-000163

(51) Int. Cl.
G02B 1/04     (2006.01)
C08G 64/16    (2006.01)
G02B 1/08     (2006.01)
G02B 5/30     (2006.01)

(52) U.S. Cl.
CPC ........... C08G 64/1608 (2013.01); G02B 1/04 (2013.01); G02B 1/08 (2013.01); G02B 5/3083 (2013.01)

(58) Field of Classification Search
CPC .................................................. C08G 64/1608
USPC ........................................ 528/196, 198, 219
See application file for complete search history.

(56) References Cited

U.S. PATENT DOCUMENTS

| | | | |
|---|---|---|---|
| 6,060,577 A | 5/2000 | Davis | |
| 6,080,833 A | 6/2000 | Otsuji et al. | |
| 2006/0046065 A1 | 3/2006 | Suzuki et al. | |
| 2011/0003101 A1* | 1/2011 | Fuji ............................ | C08J 5/18 428/35.7 |
| 2013/0085254 A1* | 4/2013 | Namiki .............. | C08G 64/1608 528/219 |
| 2013/0131271 A1 | 5/2013 | Yokogi et al. | |
| 2014/0073757 A1 | 3/2014 | Yokogi et al. | |

FOREIGN PATENT DOCUMENTS

| | | |
|---|---|---|
| EP | 2 708 568 A1 | 3/2014 |
| JP | 11-71316 | 3/1999 |
| JP | 2006-71782 | 3/2006 |
| JP | 2006-131789 | 5/2006 |
| JP | 2008-274203 | 11/2008 |
| JP | 2012-214666 | 11/2012 |
| JP | 2016-204430 A | 12/2016 |
| WO | WO 00/26705 A1 | 5/2000 |
| WO | WO 2008/156186 A1 | 12/2008 |
| WO | WO 2013/100163 A1 | 7/2013 |

OTHER PUBLICATIONS

Extended European Search Report dated Oct. 6, 2017 in Patent Application No. 15854324.9.
(Continued)

*Primary Examiner* — Terressa Boykin
(74) *Attorney, Agent, or Firm* — Oblon, McClelland, Maier & Neustadt, L.L.P.

(57) ABSTRACT

The object of the present invention is to provide a polycarbonate resin which is excellent in various properties, such as heat resistance, optical properties, melt processability, etc., and an optical film composed of the same and the present invention relates to a polycarbonate resin containing at least a structural unit represented by the following formula (1) and a structural unit represented by the following formula (2):

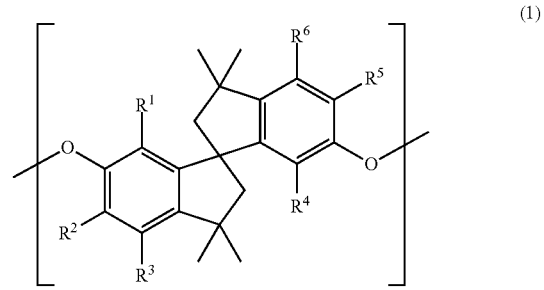

(1)

wherein in the formula (1), $R^1$ to $R^6$ each independently represent a hydrogen atom, an alkyl group having 1 to 12 carbon atoms, an aryl group, an alkoxy group having 1 to 12 carbon atoms, or a halogen atom.

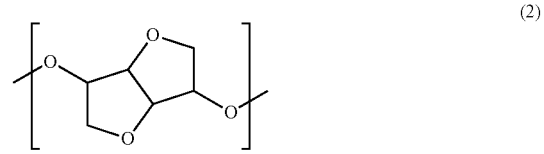

(2)

20 Claims, No Drawings

(56) References Cited

OTHER PUBLICATIONS

K. C. Stueben, "Polymers Containing the 3,3,3',3'-Tetramethyl-1,1'-Spirobiindane Residue" Journal of Polymer Science Part A, vol. 3, XP002093592, 1965, pp. 3209-3217.
International Search Report dated Nov. 24, 2015 in PCT/JP2015/080293, filed on Oct. 27, 2015 (with English Translation).
Written Opinion dated Nov. 24, 2015 in PCT/JP2015/080293, filed on Oct. 27, 2015.

\* cited by examiner

POLYCARBONATE RESIN, MOLDED ARTICLE, AND OPTICAL FILM

TECHNICAL FIELD

A first embodiment and a second embodiment of the present invention relate to a polycarbonate resin which is excellent in various properties, such as heat resistance, moist heat resistance, optical properties, weather resistance, etc., and a molded article obtained using the same.

A third embodiment of the present invention relates to a polycarbonate resin which is excellent in optical properties, heat resistance, and melt processability, and an optical film.

BACKGROUND ART

In general, polycarbonate resins include a bisphenol as a monomer component and are widely utilized as a so-called engineering plastic in optical fields of electric•electronic parts, automotive parts, optical recording media, lenses, etc., and so on, based on superiority in transparency, heat resistance, mechanical strength, and so on.

The conventional polycarbonate resins have used mainly bisphenol A for the monomer; however, in recent years, polycarbonate resins including isosorbide (hereinafter sometimes abbreviated as "ISB") as the monomer component are developed. The polycarbonate resins using ISB are excellent in various properties, such as heat resistance, optical properties, etc., and utilization for an optical application, such as a retardation film, etc., a glass substitute application, or the like is investigated (see, for example, Patent Literatures 1 and 2). In addition, an interest is also given in the matter that ISB is a dihydroxy compound obtained from biomass resources and is a carbon-neutral material which does not contribute to an increase of emissions of carbon dioxide even when it is incinerated.

However, ISB is a component having high water absorption properties, and there is a case where a polycarbonate resin including ISB as the monomer component causes such a problem that a molded article thereof is deformed under high temperature and high humidity conditions, or other problems. Then, an improvement of moist heat resistance is investigated by a method, such as copolymerization with a monomer capable of imparting heat resistance or low water absorption properties, etc. (see, for example, Patent Literature 3).

In addition, it is known that polycarbonate resins having a structural unit derived from 6,6'-dihydroxy-3,3,3',3'-tetramethyl-1,1'-spirobiindane (hereinafter sometimes abbreviated as "SBI") exhibit properties, such as high heat resistance and low birefringence, optical applications for retardation films, lenses, and so on, are investigated based on those properties (see, for example, Patent Literatures 4, 5, and 6).

In addition, in recent years, demands of transparent resins which are used for optical applications inclusive of molded articles represented by front plates of smartphones or automotive navigation systems, optical lenses, optical films, and optical recording media increase. Among these, the diffusion of a thin flat panel display (FPD) represented by liquid crystal displays or organic EL displays is remarkable, and for the purpose of improving a display quality, such as improvement of contrast or coloring, expansion of a viewing angle, prevention of external light reflection, etc., various optical films are developed and utilized.

For example, in organic EL displays, a quarter-wave plate for preventing reflection of external light is used. In retardation films which are used for the quarter-wave plate, in order to suppress coloring and make it possible to reveal a clear black play, wavelength dispersion properties at a broad band such that ideal retardation properties can be obtained at each wavelength in a visible region are demanded. As those corresponding thereto, for example, there are disclosed retardation films composed of a polycarbonate copolymer including a bisphenol structure having a fluorene ring in a side chain thereof and exhibiting reverse wavelength dispersibility such that the retardation becomes smaller as the wavelength becomes shorter (see, for example, Patent Literatures 7 and 8).

CITATION LIST

Patent Literature

Patent Literature 1: JP-A-2008-274203
Patent Literature 2: JP-A-2012-214666
Patent Literature 3: WO2013/100163
Patent Literature 4: JP-A-2006-131789
Patent Literature 5: JP-A-2006-71782
Patent Literature 6: JP-A-H11-71316
Patent Literature 7: WO2000/026705
Patent Literature 8: WOA-2008/156186

SUMMARY OF INVENTION

Technical Problem

As means for improving the moist heat resistance of the polycarbonate resins using ISB, there is a method of copolymerizing a monomer of a bisphenol having high heat resistance. However, resins containing an aromatic structure involve such a problem that the resins are liable to be colored under irradiation with sunlight or UV light. Polymers including an aliphatic structure do not have ultraviolet absorption properties and hence, are favorable in such weather resistance. However, in copolymerization with a monomer of a bisphenol, a strong merit to be brought by the use of ISB is impaired.

In addition, in general, aromatic monomers inclusive of bisphenols exhibit positive wavelength dispersibility such that the retardation becomes larger as the wavelength becomes shorter. Cycloolefin polymer (hereinafter sometimes abbreviated as "COP") resins which are currently widely used as a retardation film of liquid crystal display have flat wavelength dispersion properties such that the retardation does not substantially change depending upon the wavelength. Additionally, in comparison with COP, retardation films composed of a material exhibiting positive wavelength dispersibility are inferior in display properties, such as hue or reflectance of display, etc.

As described previously, the polycarbonate resins are used as a molded article or an optical film. In addition, the required properties are different for every application thereof.

For example, in recent years, as the properties required for molded articles represented by front plates of smartphones or automotive navigation systems, surface hardness, weather resistance, and moist heat resistance are simultaneously required along with optical properties, such as transparency, low retardation, etc.

On the other hand, with respect to the polycarbonate resins containing an SBI structural unit, though copolymerization with other bisphenol has been investigated so far, findings with respect to copolymerization with an aliphatic monomer are less. In addition, any investigation directed to control of wavelength dispersion of retardation is not made.

In addition, in recent years, in an application of optical films inclusive of retardation films, in a process accompanied with heating during a production step of a polarizing plate or display or in an operating environment of high temperature and high humidity, or the like, an improvement of heat resistance of the material such that optical physical properties or dimensions do not change is required. The development of a material in which various properties, such as optical physical properties, e.g., transparency, wavelength dispersibility of retardation, photoelastic coefficient, etc., mechanical physical properties, e.g., toughness, etc., melt processability, etc., and high heat resistance are made compatible with each other is required.

In addition, in recent years, in an application of optical films inclusive of retardation films, in a process accompanied with heating in an assembling step of a polarizing plate or display or in an operating environment of high temperature and high humidity, or the like, an improvement of heat resistance is required for the materials such that the optical physical properties or dimensions of the film do not change. In addition to that, a more improvement in optical properties or quality, cost reduction, and an improvement in productivity in each of steps, such as film formation, stretching, lamination, etc., are also required, and therefore, it is necessary to contrive a material design such that other properties are not impaired, too. Specifically, the development of a material in which the heat resistance is improved by increasing a glass transition temperature to reduce a water absorption, or balance of physical properties, such as optical physical properties, e.g., wavelength dispersibility of retardation, photoelastic coefficient, etc., mechanical physical properties, e.g., toughness of film, etc., melt processability, etc., is optimized is required.

On the other hand, with respect to the polycarbonate resins containing an SBI structural unit, though copolymerization with other bisphenol has been investigated so far, in general, aromatic monomers inclusive of bisphenols exhibit positive wavelength dispersibility such that the retardation becomes larger as the wavelength becomes shorter, and the photoelastic coefficient becomes higher, too. The cycloolefin polymer (COP) which is currently widely used as a retardation film of liquid crystal display has flat wavelength dispersion properties such that the retardation does not substantially change depending upon the wavelength. Additionally, in comparison with COP or a material having reverse wavelength dispersibility, retardation films composed of a material exhibiting positive wavelength dispersibility are inferior in display properties, such as hue or reflectance of display, etc. With respect to resins containing an SBI structural unit, any investigation directed to control of wavelength dispersibility of retardation in such a viewpoint is not made.

An object of the present invention is to solve the above-described various problems and to provide a polycarbonate resin which is excellent in various properties, such as heat resistance, moist heat resistance, optical properties, weather resistance, etc., and a molded article obtained using the same.

In addition, another object of the present invention is to solve the above-described various problems and to provide a polycarbonate resin which is excellent in optical properties, heat resistance, and melt processability, and an optical film.

Solution to Problem

In order to solve the above-described problems, the present inventors made extensive and intensive investigations. As a result, it has been found that a polycarbonate resin containing a specified amount of an SBI structural unit and specified copolymerization components is excellent in physical properties, such as moist heat resistance, optical properties, weather resistance, etc., leading to accomplishment of the present invention.

In addition, in order to solve the above-described problems, the present inventors made extensive and intensive investigations. As a result, it has been found that by containing an SBI structural unit and controlling a ratio of various copolymerization components, a polycarbonate resin which is excellent in physical properties, such as heat resistance, optical properties, melt processability, etc., is obtained, leading to accomplishment of the present invention. Specifically, the gist of the present invention is as follows.

[1] A polycarbonate resin comprising at least a structural unit represented by the following formula (1) and a structural unit represented by the following formula (2), wherein when a total amount in weight of all of the structural units and connecting groups constituting the polycarbonate resin is defined as 100% by weight, the content of the structural unit represented by the following formula (1) is 1% by weight or more and 70% by weight or less, the content of the structural unit represented by the following formula (2) is 1% by weight or more and 70% by weight or less, and a structural unit derived from at least one compound selected from an aliphatic dihydroxy compound, an alicyclic dihydroxy compound, a dihydroxy compound containing an acetal ring, an oxyalkylene glycol, a dihydroxy compound containing an aromatic component, and a diester compound is contained in an amount of 0.1% by weight or more and 50% by weight or less.

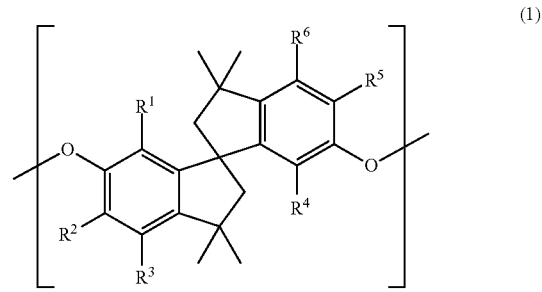

(In the formula (1), $R^1$ to $R^6$ each independently represent a hydrogen atom, an alkyl group having 1 to 12 carbon atoms, an aryl group, an alkoxy group having 1 to 12 carbon atoms, or a halogen atom.)

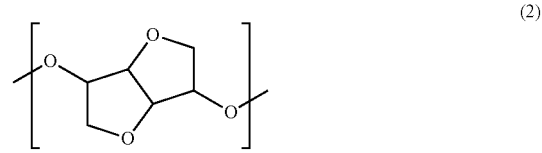

[2] A polycarbonate resin comprising at least a structural unit represented by the following formula (1) and a structural unit represented by the following formula (2), wherein when a total amount in weight of all of the structural units and connecting groups constituting the polycarbonate resin is defined as 100% by weight,
the content of the structural unit represented by the following formula (1) is 1% by weight or more and 70% by weight or less,
the content of the structural unit represented by the following formula (2) is 1% by weight or more and 70% by weight or less, and
a structural unit derived from a compound having negative intrinsic birefringence is contained in an amount of 1% by weight or more and 70% by weight or less.

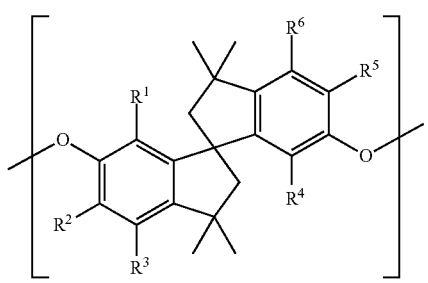

(1)

having a negative intrinsic birefringence is at least one selected from structural units represented by the following formulae (3) to (5).

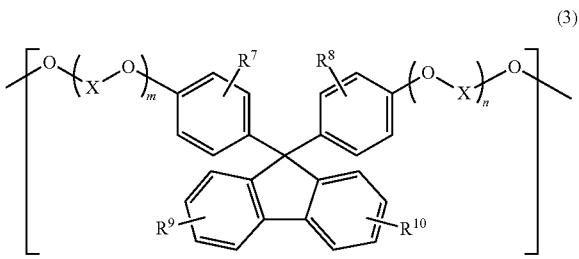

(3)

(In the formula (3), $R^7$ to $R^{10}$ each independently represent a hydrogen atom, a substituted or unsubstituted alkyl group having 1 to 20 carbon atoms, a substituted or unsubstituted cycloalkyl group having 6 to 20 carbon atoms, or a substituted or unsubstituted aryl group having 6 to 20 carbon atoms; X represents a substituted or unsubstituted alkylene group having 2 to 10 carbon atoms, a substituted or unsubstituted cycloalkylene group having 6 to 20 carbon atoms, or a substituted or unsubstituted arylene group having 6 to 20 carbon atoms, and each X may be the same as or different; and m and n each independently represent an integer of 0 to 5.)

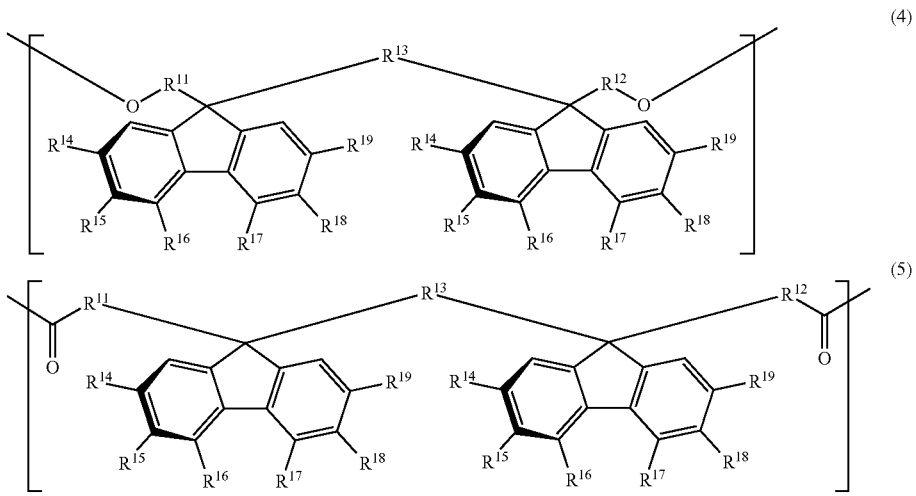

(4)

(5)

(In the formula (1), $R^1$ to $R^6$ each independently represent a hydrogen atom, an alkyl group having 1 to 12 carbon atoms, an aryl group, an alkoxy group having 1 to 12 carbon atoms, or a halogen atom.)

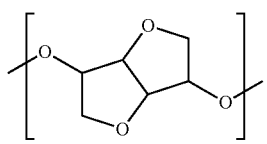

(2)

[3] The polycarbonate resin according to the above [2], wherein the structural unit derived from the compound (In the formulae (4) and (5), $R^{11}$ to $R^{13}$ each independently represent a direct bond or an optionally substituted alkylene group having 1 to 4 carbon atoms; and $R^{14}$ to $R^{19}$ each independently represent a hydrogen atom, an optionally substituted alkyl group having 1 to 10 carbon atoms, an optionally substituted aryl group having 4 to 10 carbon atoms, an optionally substituted acyl group having 1 to 10 carbon atoms, an optionally substituted alkoxy group having 1 to 10 carbon atoms, an optionally substituted aryloxy group having 1 to 10 carbon atoms, an optionally substituted amino group, an optionally substituted vinyl group having 1 to 10 carbon atoms, an optionally substituted ethynyl group having 1 to 10 carbon atoms, a sulfur atom having a substituent, a silicon atom having a substituent, a halogen atom, a nitro group, or a cyano group, provided that $R^{14}$ to $R^{19}$ may be the same as or different from each other, and at least two adjacent groups among $R^{14}$ to $R^{19}$ may be bonded to each other to form a ring.)

[4] The polycarbonate resin according to any one of the above [1] to [3], wherein a glass transition temperature thereof is 120° C. or higher and 200° C. or lower.

[5] A polycarbonate resin comprising a structural unit represented by the following formula (1) and having a glass transition temperature of 120° C. or higher and 180° C. or lower and a value of wavelength dispersion (R450/R550) which is a ratio of a retardation (R450) at a wavelength of 450 nm and a retardation (R550) at a wavelength of 550 nm of 0.50 or more and 1.03 or less.

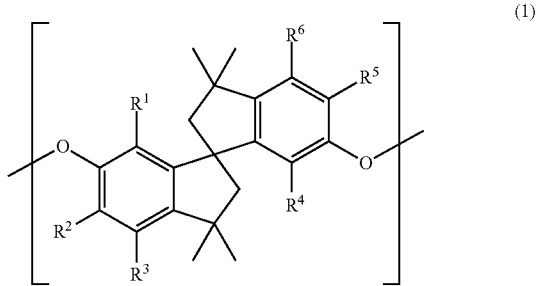

(1)

(In the formula (1), $R^1$ to $R^6$ each independently represent a hydrogen atom, an alkyl group having 1 to 12 carbon atoms, an aryl group, an alkoxy group having 1 to 12 carbon atoms, or a halogen atom.)

[6] The polycarbonate resin according to the above [5], wherein when a total amount in weight of all of the structural units and connecting groups constituting the polycarbonate resin is defined as 100% by weight, the structural unit represented by the formula (1) is contained in an amount of 1% by weight or more and 30% by weight or less.

[7] The polycarbonate resin according to the above [5] or [6], wherein when a total amount in weight of all of the structural units and connecting groups constituting the polycarbonate resin is defined as 100% by weight, the structural unit represented by the following formula (2) is contained in an amount of 1% by weight or more and 70% by weight or less.

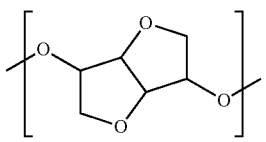

(2)

[8] The polycarbonate resin according to any one of the above [5] to [7], wherein when a total amount in weight of all of the structural units and connecting groups constituting the polycarbonate resin is defined as 100% by weight, at least one selected from structural units represented by the following formulae (3) to (5) is contained in an amount of 1% by weight or more and 70% by weight or less.

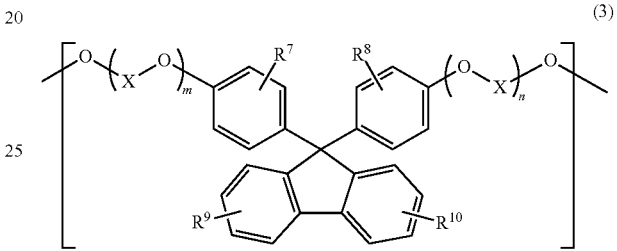

(3)

(In the formula (3), $R^7$ to $R^{10}$ each independently represent a hydrogen atom, a substituted or unsubstituted alkyl group having 1 to 20 carbon atoms, a substituted or unsubstituted cycloalkyl group having 6 to 20 carbon atoms, or a substituted or unsubstituted aryl group having 6 to 20 carbon atoms; X represents a substituted or unsubstituted alkylene group having 2 to 10 carbon atoms, a substituted or unsubstituted cycloalkylene group having 6 to 20 carbon atoms, or a substituted or unsubstituted arylene group having 6 to 20 carbon atoms, and each X may be the same as or different; and m and n each independently represent an integer of 0 to 5.)

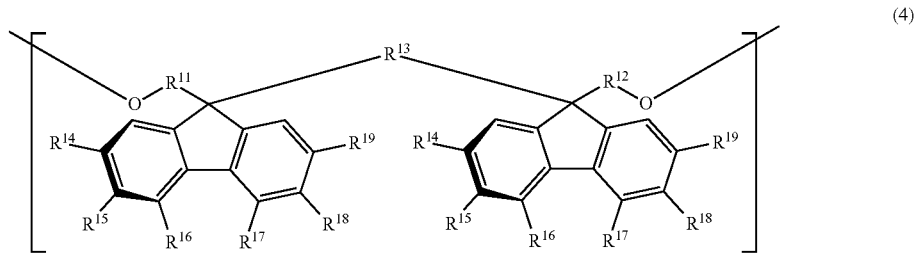

(4)

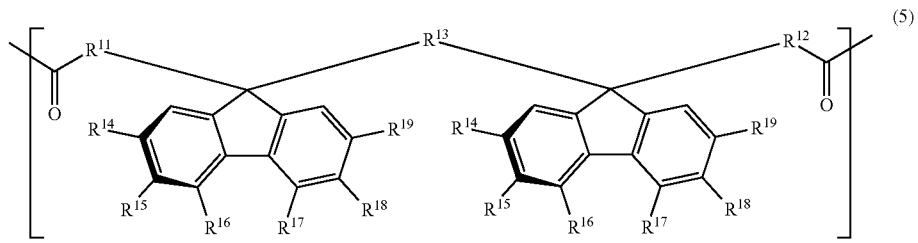

(5)

(In the formulae (4) and (5), $R^{11}$ to $R^{13}$ each independently represent a direct bond or an optionally substituted alkylene group having 1 to 4 carbon atoms; and $R^{14}$ to $R^{19}$ each independently represent a hydrogen atom, an optionally substituted alkyl group having 1 to 10 carbon atoms, an optionally substituted aryl group having 4 to 10 carbon atoms, an optionally substituted acyl group having 1 to 10 carbon atoms, an optionally substituted alkoxy group having 1 to 10 carbon atoms, an optionally substituted aryloxy group having 1 to 10 carbon atoms, an optionally substituted amino group, an optionally substituted vinyl group having 1 to 10 carbon atoms, an optionally substituted ethynyl group having 1 to 10 carbon atoms, a sulfur atom having a substituent, a silicon atom having a substituent, a halogen atom, a nitro group, or a cyano group, provided that $R^{14}$ to $R^{19}$ may be the same as or different from each other, and at least two adjacent groups among $R^{14}$ to $R^{19}$ may be bonded to each other to form a ring.)

[9] The polycarbonate resin according to any one the above [5] to [8], wherein when a total amount in weight of all of the structural units and connecting groups constituting the polycarbonate resin is defined as 100% by weight, a structural unit derived from at least one compound selected from an aliphatic dihydroxy compound, an alicyclic dihydroxy compound, a dihydroxy compound containing an acetal ring, an oxyalkylene glycol, a dihydroxy compound containing an aromatic component, and a diester compound is contained in an amount of 0.1% by weight or more and 50% by weight or less.

[10] The polycarbonate resin according to any one of the above [1] to [9], wherein when a total amount in weight of all of the structural units and connecting groups constituting the polycarbonate resin is defined as 100% by weight, an aromatic structural unit other than the structural units represented by the formulae (1), (3), (4), and (5) is contained in an amount of 5% by weight or less.

[11] The polycarbonate resin according to any one of the above [1] to [10], wherein a melt viscosity thereof at a measurement temperature of 240° C. and a shear rate of 91.2 sec$^{-1}$ is 800 Pa·s or more and 7,000 Pa·s or less.

[12] The polycarbonate resin according to any one of the above [1] to [11], wherein in the polycarbonate resin, the content of the carbonic diester is 1 weight ppm or more and 300 weight ppm or less, the content of the monohydroxy compound derived from the carbonic diester is 1 weight ppm or more and 1,000 weight ppm or less, and the content of the dihydroxy compound represented by the following formula (6) is 1 weight ppm or more and 1,000 weight ppm or less.

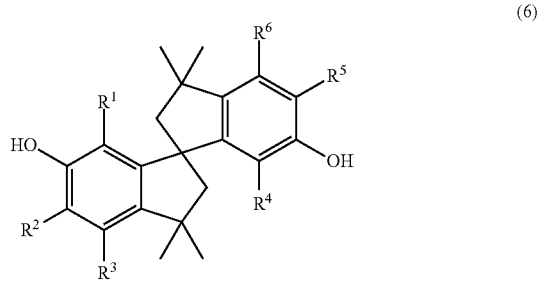

(6)

(In the formula (6), $R^1$ to $R^6$ each independently represent a hydrogen atom, an alkyl group having 1 to 12 carbon atoms, an aryl group, an alkoxy group having 1 to 12 carbon atoms, or a halogen atom.)

[13] A polycarbonate resin molded article comprising the polycarbonate resin according to any one of the above [1] to [12].

[14] A film or sheet comprising the polycarbonate resin according to any one of the above [1] to [12].

[15] A method for producing a transparent film comprising molding the polycarbonate resin according to any one of the above [1] to [12] at a molding temperature of 280° C. or lower by a melt film formation method.

[16] A retardation film comprising the film according to the above [14].

Effects of Invention

Each of the polycarbonate resins according to the first embodiment and the second embodiment of the present invention is excellent in heat resistance, durability under high temperature and high humidity (moist heat resistance), optical properties, durability against irradiation with UV light, etc. (weather resistance), and the like and can be used as a material to be used for molded articles which are obtained by means of injection molding, extrusion molding, or the like. In particular, each of the polycarbonate resins according to the first embodiment and the second embodiment of the present invention is suitably used for an application of transparent molded articles required to have moist heat resistance or weather resistance, or a retardation film to be used for optical compensation of liquid crystal displays, organic EL displays, etc., or the like.

The polycarbonate resin according to the third embodiment of the present invention is excellent in optical properties, heat resistance, and melt processability and can be used as a material to be used for optical films. In particular, the polycarbonate resin according to the third embodiment of the present invention is suitably used for a retardation film etc. to be used for optical compensation of liquid crystal displays, organic EL displays, etc., or the like.

DESCRIPTION OF EMBODIMENTS

The embodiments of the present invention are hereunder explained in detail. However, the explanations regarding constituent features described below are examples (representative examples) of the embodiments of the present invention, and it should be construed that the present invention is by no means limited to the following contents so long as it does not deviate from the gist thereof. In the present invention, the "structural unit" refers to a partial structure sandwiched by connecting groups adjacent to each other in a polymer and a partial structure sandwiched by a polymerization reactive group existent in an end portion of a polymer and a connecting group adjacent to the polymerization reactive group.

In addition, in the present invention, the polycarbonate resin includes a polyester carbonate resin. The polyester carbonate resin refers to a polymer in which a structural unit constituting the polymer contains a portion connected with not only a carbonate bond but also an ester bond.

The polycarbonate resin of the present invention is as follows.

<First Embodiment>

A polycarbonate resin including at least a structural unit represented by the following formula (1) and a structural unit represented by the following formula (2), wherein when a total amount in weight of all of the structural units and connecting groups constituting the polycarbonate resin is defined as 100% by weight, the content of the structural unit represented by the following formula (1) is 1% by weight or more and 70% by weight or less, the content of the structural unit represented by the following formula (2) is 1% by weight or more and 70% by weight or less, and a structural unit derived from at least one compound selected from an aliphatic dihydroxy compound, an alicyclic dihydroxy compound, a dihydroxy compound containing an acetal ring, an oxyalkylene glycol, a dihydroxy compound containing an aromatic component, and a diester compound is contained in an amount of 0.1% by weight or more and 50% by weight or less.

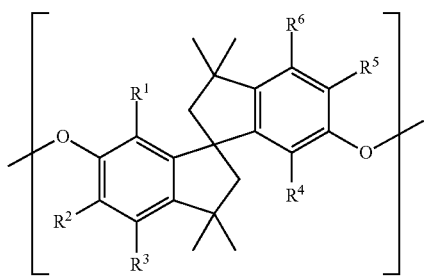

(In the formula (1), $R^1$ to $R^6$ each independently represent a hydrogen atom, an alkyl group having 1 to 12 carbon atoms, an aryl group, an alkoxy group having 1 to 12 carbon atoms, or a halogen atom.)

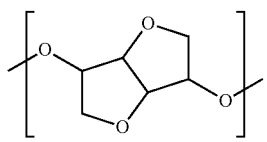

<Second Embodiment>

A polycarbonate resin including at least a structural unit represented by the following formula (1) and a structural unit represented by the following formula (2), wherein when a total amount in weight of all of the structural units and connecting groups constituting the polycarbonate resin is defined as 100% by weight, the content of the structural unit represented by the following formula (1) is 1% by weight or more and 70% by weight or less, the content of the structural unit represented by the following formula (2) is 1% by weight or more and 70% by weight or less, and a structural unit derived from a compound having a negative intrinsic birefringence is contained in an amount of 1% by weight or more and 70% by weight or less.

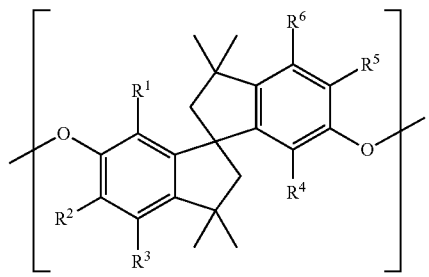

(In the formula (1), $R^1$ to $R^6$ each independently represent a hydrogen atom, an alkyl group having 1 to 12 carbon atoms, an aryl group, an alkoxy group having 1 to 12 carbon atoms, or a halogen atom.)

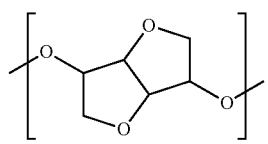

<Third Embodiment>

A polycarbonate resin including a structural unit represented by the following formula (1) and having a glass transition temperature of 120° C. or higher and 180° C. or lower and a value of wavelength dispersion (R450/R550) that is a ratio of a retardation (R450) at a wavelength of 450 nm and a retardation (R550) at a wavelength of 550 nm of 0.50 or more and 1.03 or less.

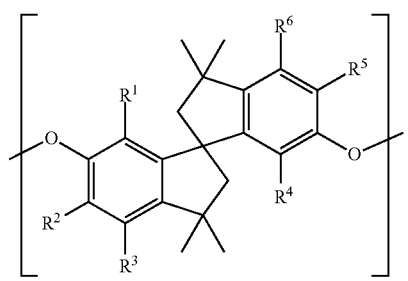

(In the formula (1), $R^1$ to $R^6$ each independently represent a hydrogen atom, an alkyl group having 1 to 12 carbon atoms, an aryl group, an alkoxy group having 1 to 12 carbon atoms, or a halogen atom.)

[Structure and raw materials of polycarbonate resin of the present invention]

Each of the polycarbonate resins according to the first embodiment and the second embodiment of the present invention contains a structural unit represented by the foregoing formula (1) in an amount of 1% by weight or more or 70% by weight or less. In addition, the polycarbonate resin according to the third embodiment of the present invention contains a structural unit represented by the foregoing formula (1).

In each of the above-described first embodiment and second embodiment, the content of the structural unit represented by the foregoing formula (1) is 1% by weight or more and 70% by weight or less. The content of the structural unit represented by the foregoing formula (1) is preferably 5% by weight or more and 50% by weight or less, more preferably 8% by weight or more and 40% by weight or less, and still more preferably 10% by weight or more and 30% by weight or less.

In addition, the content of the structural unit represented by the foregoing formula (2) is 1% by weight or more and 70% by weight or less. The content of the structural unit represented by the foregoing formula (2) is preferably 10% by weight or more and 65% by weight or less, and more preferably 20% by weight or more and 60% by weight or less.

The aromatic dihydroxy compound and the aliphatic dihydroxy compound are different from each other in terms of an appropriate temperature region of the polymerization reaction. Therefore, in the case where the content of the structural unit represented by the foregoing formula (1) is larger than the above-described range, there is a possibility that in copolymerization with ISB or other aliphatic dihydroxy compound, the reactivity at the final stage of the polymerization reaction is insufficient, so that the molecular weight does not increase to a predetermined value. In addition, there is a concern that in view of the matter that the polymerization reaction is delayed, the polymer causes heat deterioration, so that the color tone is remarkably worsened. On the other hand, in the case where the content of the structural unit represented by the foregoing formula (1) is smaller than the above-described range, the effect for improving the moist heat resistance as a strong point of the present invention cannot be thoroughly obtained.

In the case where the content of the structural unit represented by the foregoing formula (2) is larger than the above-described range, the heat resistance becomes excessively high, and the mechanical properties or melt processability is worsened. In addition, since the structural unit represented by the foregoing formula (2) is a structure with high hygroscopicity, in the case where the content is excessively large, the water absorption of the resin becomes high, so that there is a concern that deformation or cracking, or the like of a molded article is caused in an environment at a high humidity. On the other hand, in the case where the content of the structural unit represented by the foregoing formula (2) is smaller than the above-described range, there is a concern that the heat resistance becomes insufficient, or optical properties, such as high transmittance or low photoelastic coefficient, etc., as a strong point of the polycarbonate resin of the present invention is not obtainable.

As a result of investigations made by the present inventors, it has been found that nonetheless the structural unit represented by the foregoing formula (1) is an aromatic structure, coloration of the resin under irradiation with UV light is small. In consequence, even when the compound having the structural unit represented by the foregoing formula (1) is contained in a larger amount than that of a compound having a usual aromatic structure, the polycarbonate resin which is excellent in heat resistance or moist heat resistance and weather resistance can be obtained.

In consequence, as a result of investigations made by the present inventors, the first embodiment and the second embodiment of the present invention are ones resulting from a finding that by regulating the contents of the structural unit represented by the foregoing formula (1) and the structural unit represented by the foregoing formula (2) to the specified values, the polycarbonate resin which is excellent in heat resistance or moist heat resistance and weather resistance can be obtained.

In the polycarbonate resin according to the third embodiment of the present invention, when a total amount in weight of all of the structural units and connecting groups constituting the polycarbonate resin is defined as 100% by weight, the content of the structural unit represented by the foregoing formula (1) is preferably 1% by weight or more and 30% by weight or less. The content of the structural unit represented by the foregoing formula (1) is more preferably 3% by weight or more and 25% by weight or less, and especially preferably 5% by weight or more and 20% by weight or less.

In the case where the content of the structural unit represented by the foregoing formula (1) is larger than the above-described range, there is a concern that the heat resistance becomes excessively high, or the resulting resin becomes brittle. In addition, for that reason, in order to allow the polymerization reaction to proceed to an extent of sufficient molecular weight, since it is needed to make the reaction temperature high or to make the reaction time long, there is a concern that the polymer causes heat deterioration, so that the color tone is remarkably worsened. On the other hand, in the case where the content of the structural unit represented by the foregoing formula (1) is smaller than the above-described range, the effect for improving the heat resistance as a strong point cannot be thoroughly obtained.

As a result of investigations made by the present inventors, it has been found that nonetheless the structural unit represented by the foregoing formula (1) is an aromatic structure, coloration of the resin under irradiation with UV light is small. In consequence, even when the compound having the structural unit represented by the foregoing formula (1) is contained in a larger amount than that of a compound having a usual aromatic structure, the polymer hardly causes heat deterioration, so that the polycarbonate resin in which a color tone is hardly worsened can be obtained.

In addition, in general, there is a tendency that an aromatic structure becomes higher than an aliphatic structure in terms of a photoelastic coefficient. However, in the structural unit represented by the foregoing formula (1), since two benzene rings are oriented at an angle close to orthogonality, by cancelling the mutual birefringences each other, nonetheless the structural unit represented by the foregoing formula (1) is aromatic, it has a relatively low photoelastic coefficient and a low birefringence and also has flat wavelength dispersion properties. By appropriately combining the structural unit represented by the foregoing formula (1) with other structural unit, it becomes possible to obtain a resin having high heat resistance and excellent optical physical properties.

(Dihydroxy Compound A)

In order to introduce the structural unit represented by the foregoing formula (1), polymerization is performed using a dihydroxy compound represented by the following formula (6) (hereinafter sometimes referred to as "dihydroxy compound A").

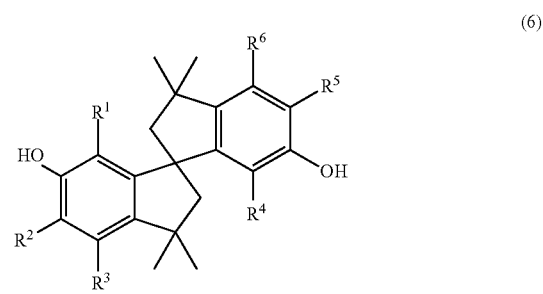

(6)

(In the formula (6), $R^1$ to $R^6$ each independently represent a hydrogen atom, an alkyl group having 1 to 12 carbon atoms, an aryl group, an alkoxy group having 1 to 12 carbon atoms, or a halogen atom.)

Above all, in order to obtain the effects of the present invention, the formula (6) is preferably the following formula (6').

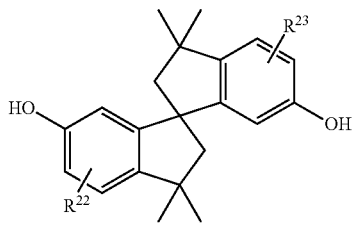

(6')

(In the formula (6'), $R^{22}$ and $R^{23}$ each independently represent a hydrogen atom, an alkyl group having 1 to 12 carbon atoms, an aryl group, an alkoxy group having 1 to 12 carbon atoms, or a halogen atom.)

In the foregoing formula (6), the carbon number of each of $R^1$ to $R^6$ is typically 1 to 12, and in order to obtain the effects of the present invention, it is preferably 1 to 6.

In the foregoing formula (6), examples of the alkyl group having 1 to 12 carbon atoms represented by each of $R^1$ to $R^6$ include a methyl group, an ethyl group, a n-propyl group, an isopropyl group, a n-butyl group, an isobutyl group, a sec-butyl group, a tert-butyl group, a n-pentyl group, a sec-pentyl group, a n-hexyl group, a cyclohexyl group, an o-methylcyclohexyl group, a m-methylcyclohexyl group, a p-methylcyclohexyl group, a n-octyl group, a cyclooctyl group, a n-dodecyl group, and the like.

Among these, in order to obtain the effects of the present invention, $R^1$ to $R^6$ are each preferably an alkyl group having 1 to 6 carbon atoms, such as a methyl group, an ethyl group, a n-propyl group, an isopropyl group, a n-butyl group, an isobutyl group, a sec-butyl group, a tert-butyl group, a n-pentyl group, a sec-pentyl group, a n-hexyl group, etc., more preferably a methyl group, an ethyl group, or a n-propyl group, and still more preferably a methyl group.

Specifically, examples of the compound represented by the foregoing formula (6) include 6,6'-dihydroxy-3,3,3',3'-tetramethyl-1,1'-spirobiindane, 7,7'-dimethyl-6,6'-dihydroxy-3,3,3',3'-tetramethyl-1,1'-spirobiindane, 7,7'-tert-butyl-6,6'-dihydroxy-3,3,3',3'-tetramethyl-1,1'-spirobiindane, 7,7'-diphenyl-6,6'-dihydroxy-3,3,3',3'-tetramethyl-1,1'-spirobiindane, and the like.

Above all, from the standpoints of easiness of availability and balance in physical properties of the resulting polycarbonate resin, 6,6'-dihydroxy-3,3,3',3'-tetramethyl-1,1'-spirobiindane and 7,7'-dimethyl-6,6'-dihydroxy-3,3,3',3'-tetramethyl-1,1'-spirobiindane are preferred, with 6,6'-dihydroxy-3,3,3',3'-tetramethyl-1,1'-spirobiindane being more preferred.

(Dihydroxy Compound B)

Each of the polycarbonate resins according to the first embodiment and the second embodiment of the present invention contains a structural unit represented by the following formula (2) in an amount of 1% by weight or more or 70% by weight or less.

It is preferred that the polycarbonate resin according to the third embodiment of the present invention contains a structural unit represented by the following formula (2).

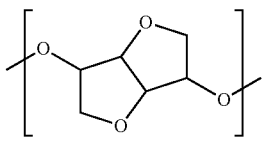

(2)

In the third embodiment of the present invention, when a total amount in weight of all of the structural units and connecting groups constituting the polycarbonate resin is defined as 100% by weight, the content of the structural unit represented by the foregoing formula (2) is preferably 1% by weight or more and 70% by weight or less. In all of the embodiments of the present invention, the content of the structural unit represented by the foregoing formula (2) is more preferably 10% by weight or more and 65% by weight or less, and especially preferably 20% by weight or more and 60% by weight or less.

In the case where the content of the structural unit represented by the foregoing formula (2) is larger than the above-described range, the heat resistance becomes excessively high, and the mechanical properties or melt processability is worsened. In addition, since the structural unit represented by the foregoing formula (2) is a structure with high hygroscopicity, in the case where the content is excessively large, the water absorption of the resin becomes high, so that there is a concern that in a molded article, optical physical properties change, or deformation or cracking, or the like is caused in an environment at a high humidity. On the other hand, in the case where the content of the structural unit represented by the foregoing formula (2) is smaller than the above-described range, there is a concern that the heat resistance becomes insufficient, or optical properties, such as high transmittance or low photoelastic coefficient, etc., as a strong point of the polycarbonate resin of the present invention is not obtainable.

Examples of the dihydroxy compound capable of introducing the structural unit represented by the foregoing formula (2) include isosorbide (ISB), isomannide, and isoidet, all of which have a relation of stereoisomer (hereinafter sometimes referred to as "dihydroxy compound B"). These may be used either alone or in combination of two or more thereof. Among these, ISB is most preferably used from the viewpoints of availability and polymerization reactivity.

The dihydroxy compound B may include a stabilizer, for example, a basic stabilizer, a reducing agent, an antioxidant, a free-oxygen scavenger, a light stabilizer, an antacid, a pH stabilizer, a heat stabilizer, etc. Since the dihydroxy compound B is apt to change in quality especially under acidic conditions, it is preferred that the dihydroxy compound B contains a basic stabilizer.

Examples of the basic stabilizer include hydroxides, carbonates, phosphates, phosphites, hypophosphites, borates, and fatty acid salts of metals belonging to the Group 1 or Group 2 of the long-form periodic table (Nomenclature of Inorganic Chemistry IUPAC Recommendations 2005). Examples thereof further include basic ammonium compounds, such as tetramethylammonium hydroxide, tetraethylammonium hydroxide, tetrapropylammonium hydroxide, tetrabutylammonium hydroxide, trimethyl ethylammonium hydroxide, trimethylbenzylammonium hydroxide, trimethylphenylammonium hydroxide, triethylmethylammonium hydroxide, triethylbenzylammonium hydroxide, triethylphenylammonium hydroxide, tributylbenzylammonium hydroxide, tributylphenylammonium hydroxide, tetraphenylammonium hydroxide, benzyltriphenylammonium hydroxide, methyltriphenyl ammonium hydroxide, butyltriphenylammonium hydroxide, etc.; amine compounds, such as diethylamine, dibutylamine, triethylamine, morpholine, N-methylmorpholine, pyrrolidine, piperidine, 3-amino-1-propanol, ethylenediamine, N-methyldiethanolamine, diethyl ethanolamine, diethanolamine, triethanolamine, 4-aminopyridine, 2-aminopyridine, N,N-dimethyl-4-aminopyridine, 4-diethylaminopyridine, 2-hydroxypyridine, 2-methoxypyridine, 4-methoxypyridine, 2-dimethylaminoimidazole, 2-methoxyimidazole, imidazole, 2-mercaptoimidazole, 2-methylimidazole, aminoquinoline, etc.; and hindered amine-based compounds, such as di-(tert-butyl) amine, 2,2,6,6-tetramethylpiperidine, etc.

Though the content of such a basic stabilizer in the dihydroxy compound B is not particularly limited, since the dihydroxy compound B is unstable in an acidic state, it is preferred to add the basic stabilizer in such a manner that the pH of an aqueous solution of the dihydroxy compound B containing the above-described stabilizer becomes close to 7.

When the amount of the basic stabilizer is too small, there is a possibility that an effect for preventing a change in quality of the dihydroxy compound B from occurring is not obtained, whereas when the amount of the basic stabilizer is too large, denaturation of the dihydroxy compound B is brought. Therefore, the amount of the basic stabilizer is preferably 0.0001% by weight to 0.1% by weight, and more preferably 0.001% by weight to 0.05% by weight relative to the dihydroxy compound B.

In addition, the dihydroxy compound B is apt to absorb moisture and is also apt to be gradually oxidized with oxygen. Thus, on handling at the time of storage or production, it is preferred to prevent incorporation of moisture, to use a free-oxygen scavenger, or to render it under a nitrogen atmosphere.

<Structural Unit Derived from at Least One Compound Selected from an Aliphatic Dihydroxy Compound, an Alicyclic Dihydroxy Compound, a Dihydroxy Compound Containing an Acetal Ring, an Oxyalkylene Glycol, a Dihydroxy Compound Containing an Aromatic Component, and a Diester Compound>

The polycarbonate resin according to the first embodiment of the present invention includes a structural unit derived from at least one compound selected from an aliphatic dihydroxy compound, an alicyclic dihydroxy compound, a dihydroxy compound containing an acetal ring, an oxyalkylene glycol, a dihydroxy compound containing an aromatic component, and a diester compound in an amount of 0.1% by weight or more and 50% by weight or less.

Examples of the monomer containing the foregoing structural unit include an aliphatic dihydroxy compound, an alicyclic dihydroxy compound, a dihydroxy compound containing an acetal ring, an oxyalkylene glycol, a dihydroxy compound containing an aromatic component, a diester compound, and the like.

Among these, from the viewpoint of enhancing the reaction efficiency, an aliphatic dihydroxy compound, an alicyclic dihydroxy compound, a dihydroxy compound containing an acetal ring, an oxyalkylene glycol, and a dihydroxy compound containing an aromatic component are preferred; an aliphatic dihydroxy compound, an alicyclic dihydroxy compound, a dihydroxy compound containing an acetal ring, and an oxyalkylene glycol are more preferred; an aliphatic dihydroxy compound, an alicyclic dihydroxy compound, and a dihydroxy compound containing an acetal ring are still more preferred; and an aliphatic dihydroxy compound and an alicyclic dihydroxy compound are especially preferred.

As the aliphatic dihydroxy compound, for example, the following dihydroxy compounds can be used.

Dihydroxy compounds of linear aliphatic hydrocarbons, such as ethylene glycol, 1,3-propanediol, 1,2-propanediol, 1,4-butanediol, 1,3-butanediol, 1,2-butanediol, 1,5-heptanediol, 1,6-hexanediol, 1,9-nonanediol, 1,10-decanediol, 1,12-dodecanediol, etc.; and dihydroxy compounds of branched aliphatic hydrocarbons, such as neopentyl glycol, hexylene glycol, etc.

As the alicyclic dihydroxy compound, for example, the following dihydroxy compounds can be used.

Dihydroxy compounds that are a primary alcohol of an alicyclic hydrocarbon, as exemplified by dihydroxy compounds derived from terpene compounds, such as 1,2-cyclohexane dimethanol, 1,3-cyclohexane dimethanol, 1,4-cyclohexane dimethanol, tricyclodecane dimethanol, pentacyclopentadecane dimethanol, 2,6-decalin dimethanol, 1,5-decalin dimethanol, 2,3-decalin dimethanol, 2,3-norbornane dimethanol, 2,5-norbornane dimethanol, 1,3-adamantane dimethanol, limonene, etc., and the like; and dihydroxy compounds that are a secondary alcohol or tertiary alcohol of an alicyclic hydrocarbon, as exemplified by 1,2-cyclohexanediol, 1,4-cyclohexanediol, 1,3-adamantanediol, hydrogenated bisphenol A, 2,2,4,4-tetramethyl-1,3-cyclobutanediol, and the like.

As the dihydroxy compound containing an acetal ring, for example, a spiroglycol represented by the following structural formula (10), a dioxane glycol represented by the following structural formula (11), and the like can be used.

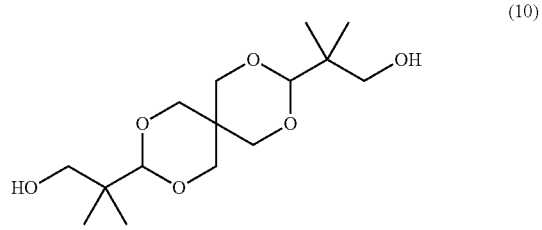

(10)

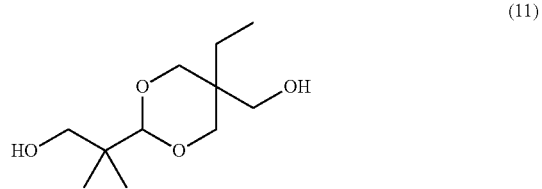

(11)

As the oxyalkylene glycol, for example, the following dihydroxy compounds can be used.

Diethylene glycol, triethylene glycol, tetraethylene glycol, polyethylene glycol, and polypropylene glycol.

As the dihydroxy compound containing an aromatic component, for example, the following dihydroxy compounds can be used.

Aromatic bisphenol compounds, such as 2,2-bis(4-hydroxyphenyl)propane, 2,2-bis(3-methyl-4-hydroxypheny)propane, 2,2-bis(4-hydroxy-3,5-dimethylphenyl)propane, 2,2-bis(4-hydroxy-3,5-diethylphenyl)propane, 2,2-bis(4-hydroxy-(3-phenyl)phenyl)propane, 2,2-bis(4-hydroxy-(3,5-diphenyl)phenyl)propane, 2,2-bis(4-hydroxy-3,5-dibromophenyl)propane, bis(4-hydroxyphenyl)methane, 1,1-bis(4-hydroxyphenyl)ethane, 2,2-bis(4-hydroxyphenyl)butane, -2,2-bis(4-hydroxyphenyl)pentane, 1,1-bis(4-hydroxyphenyl)-1-phenylethane, bis(4-hydroxyphenyl)diphenylmethane, 1,1-bis(4-hydroxyphenyl)-2-ethylhexane, 1,1-bis(4-hydroxyphenyl)decane, bis(4-hydroxy-3-nitrophenyl) methane, 3,3-bis(4-hydroxyphenyl)pentane, 1,3-bis(2-(4-hydroxyphenyl)-2-propyl)benzene, 2,2-bis(4-hydroxyphenyl)hexafluoropropane, 1,1-bis(4-hydroxyphenyl)cyclohexane, bis(4-hydroxyphenyl)sulfone, 2,4'-dihydroxydiphenylsulfone, bis(4-hydroxyphenyl)sulfide, bis(4-hydroxy-3-methylphenyl)sulfide, bis(4-hydroxyphenyl)disulfide, 4,4'-dihydroxydiphenyl ether, 4,4'-dihydroxy-3,3'-dichlorodiphenyl ether, etc.; and dihydroxy compounds having an ether group bonded to an aromatic group, such as 2,2-bis(4-(2-hydroxyethoxy)phenyl)propane, 2,2-bis(4-(2-hydroxypropoxy)phenyl)propane, 1,3-bis(2-hydroxyethoxy)benzene, 4,4'-bis(2-hydroxyethoxy)biphenyl, bis(4-(2-hydroxyethoxy)phenyl)sulfone, etc.

As the diester compound, for example, the following dicarboxylic acids and the like can be used.

Aromatic dicarboxylic acids, such as terephthalic acid, phthalic acid, isophthalic acid, 4,4'-diphenyldicarboxylic acid, 4,4'-diphenyl ether dicarboxylic acid, 4,4'-benzophenone dicarboxylic acid, 4,4'-diphenoxyethane dicarboxylic acid, 4,4'-diphenylsulfone dicarboxylic acid, 2,6-naphthalenedicarboxylic acid, etc.; alicyclic dicarboxylic acids, such as 1,2-cyclohexanedicarboxylic acid, 1,3-cyclohexanedicarboxylic acid, 1,4-cyclohexanedicarboxylic acid, decalin-2,6-dicarboxylic acid, etc.; and aliphatic dicarboxylic acids, such as malonic acid, succinic acid, glutaric acid, adipic acid, pimelic acid, suberic acid, azelaic acid, sebacic acid, etc. Though such a dicarboxylic acid component can be used as a dicarboxylic acid itself for a raw material of a polyester carbonate, a dicarboxylic acid ester, such as a methyl ester body, a phenyl ester body, etc., or a dicarboxylic acid derivative, such as a dicarboxylic acid halide, etc., can also be used as a raw material according to the production method.

From the viewpoint of optical properties or weather resistance, as the above-described other structural unit, a structural unit not containing an aromatic component is preferably used.

On the other hand, in order to take balance with heat resistance, mechanical properties, or the like while securing optical properties, there is a case where it is effective to incorporate an aromatic component into a main chain or a side chain of the polymer. In this case, for example, the aromatic component can be introduced into the polymer by the above-described other structural unit containing an aromatic structure; however, when a total amount in weight of all of the structural units and connecting groups constituting the polycarbonate resin is defined as 100% by weight, the content of such other structural unit in the polycarbonate resin is preferably 5% by weight or less, and more preferably 3% by weight. When the amount of the other structural unit containing an aromatic structure is larger, there is a concern that the weather resistance or photoelastic coefficient is worsened.

As the above-described at least one compound selected from an aliphatic dihydroxy compound, an alicyclic dihydroxy compound, a dihydroxy compound containing an acetal ring, an oxyalkylene glycol, a dihydroxy compound containing an aromatic component, and a diester compound, it is especially preferred to use 1,6-hexanediol, 2,2,4,4-tetramethyl-1,3-cyclobutanediol, 1,4-cyclohexane dimethanol, tricyclodecane dimethanol, spiroglycol, 1,4-cyclohexanedicarboxylic acid, or decalin-2,6-dicarboxylic acid (or a derivative thereof). The polycarbonate resin containing a structural unit derived from such a monomer is excellent in balance among optical properties, heat resistance, mechanical properties, and so on.

Since the polymerization reactivity of the diester compound is relatively low, from the viewpoint of enhancing the reaction efficiency, it is more preferred that a diester compound other than a diester compound having an oligofluorene structural unit is not used.

The dihydroxy compound or the diester compound for introducing a structural unit derived from at least one compound selected from an aliphatic dihydroxy compound, an alicyclic dihydroxy compound, a dihydroxy compound containing an acetal ring, an oxyalkylene glycol, a dihydroxy compound containing an aromatic component, and a diester compound may be used either alone or in combination of two or more thereof according to the required performance of the resulting resin.

When a total amount in weight of all of the structural units and connecting groups constituting the polycarbonate resin is defined as 100% by weight, the content of the structural unit derived from at least one compound selected from an aliphatic dihydroxy compound, an alicyclic dihydroxy compound, a dihydroxy compound containing an acetal ring, an oxyalkylene glycol, a dihydroxy compound containing an aromatic component, and a diester compound in the resin is 0.1% by weight or more and 50% by weight or less, preferably 1% by weight or more and 45% by weight or less, and more preferably 3% by weight or more and 40% by weight or less. Since the other structural unit mainly plays a role to regulate the heat resistance of the resin, or to impart flexibility or toughness, when its content is too small, the mechanical properties or melt processability of the resin is worsened, whereas when the content is too large, there is a concern that the heat resistance or optical properties are worsened.

<Structural Unit Derived from a Compound Having Negative Intrinsic Birefringence>

The polycarbonate resin according to the second embodiment of the present invention includes a structural unit derived from a compound having negative intrinsic birefringence in an amount of 1% by weight or more and 70% by weight or less.

In view of the fact that the polycarbonate resin according to the third embodiment of the present invention contains a structural unit derived from a compound having a negative intrinsic birefringence, a wavelength dispersion (R450/R550) can be regulated to a preferred value. The compound having a negative intrinsic birefringence refers to a compound exhibiting such physical properties that on stretching a film composed of a homopolymer thereof, its slow axis is in a direction perpendicular to the stretching direction.

As the structural unit derived from the compound having a negative intrinsic birefringence, a structural unit selected from structural units represented by the following formulae (3) to (5) may be contained. A bifunctional monomer containing any of the structural units represented by the following formulae (3) to (5) is sometimes referred to as "fluorene-based monomer". In addition, the structural unit represented by any of the following formulae (4) and (5) is sometimes referred to as "oligofluorene structural unit".

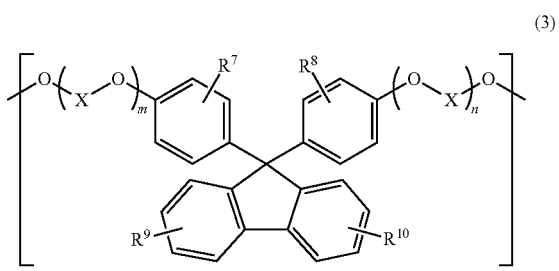

(3)

(In the formula (3), $R^7$ to $R^{10}$ each independently represent a hydrogen atom, a substituted or unsubstituted alkyl group having 1 to 20 carbon atoms, a substituted or unsubstituted cycloalkyl group having 6 to 20 carbon atoms, or a substituted or unsubstituted aryl group having 6 to 20 carbon atoms; X represents a substituted or unsubstituted alkylene group having 2 to 10 carbon atoms, a substituted or unsubstituted cycloalkylene group having 6 to 20 carbon atoms, or a substituted or unsubstituted arylene group having 6 to 20 carbon atoms, and each X may be the same as or different; and m and n each independently represent an integer of 0 to 5.)

(wavelength dependence) of the retardation. A lot of polymers have such positive wavelength dispersibility that the retardation becomes larger as the wavelength becomes shorter. However, since the above-described structural unit derived from the compound having a negative intrinsic birefringence has such reverse wavelength dispersibility that the retardation becomes smaller as the wavelength becomes shorter, it is possible to regulate the wavelength dispersion from flat wavelength dispersibility to reverse wavelength dispersibility according to the content of the above-described structural unit derived from the compound having a negative intrinsic birefringence.

As for the content of the above-described structural unit derived from the compound having a negative intrinsic birefringence, the revelation of the reverse wavelength dispersion varies with the structure. However, in order to obtain optimum wavelength dispersion properties as the retardation film, when a total amount in weight of all of the structural units and connecting groups constituting the polycarbonate resin is defined as 100% by weight, in the third embodiment of the present invention, the content of the above-described structural unit derived from the compound having a negative intrinsic birefringence is preferably 1% by weight or more and 70% by weight or less, and in the second embodiment

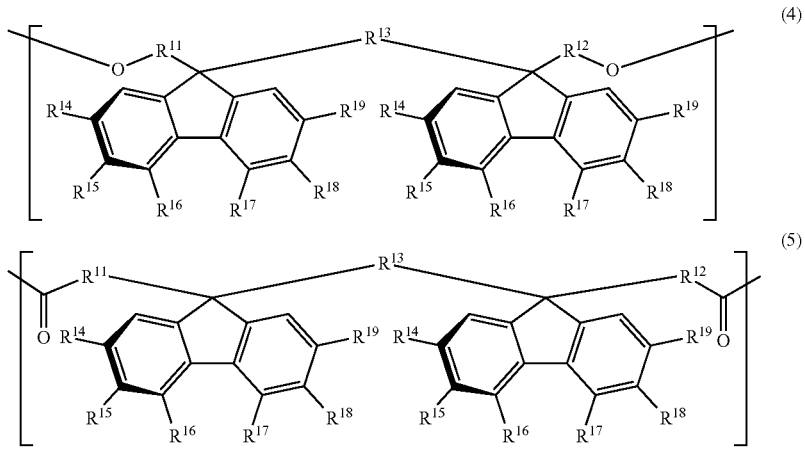

(4)

(5)

(In the formulae (4) and (5), $R^{11}$ to $R^{13}$ each independently represent a direct bond or an optionally substituted alkylene group having 1 to 4 carbon atoms; and $R^{14}$ to $R^{19}$ each independently represent a hydrogen atom, an optionally substituted alkyl group having 1 to 10 carbon atoms, an optionally substituted aryl group having 4 to 10 carbon atoms, an optionally substituted acyl group having 1 to 10 carbon atoms, an optionally substituted alkoxy group having 1 to 10 carbon atoms, an optionally substituted aryloxy group having 1 to 10 carbon atoms, an optionally substituted amino group, an optionally substituted vinyl group having 1 to 10 carbon atoms, an optionally substituted ethynyl group having 1 to 10 carbon atoms, a sulfur atom having a substituent, a silicon atom having a substituent, a halogen atom, a nitro group, or a cyano group, provided that $R^{14}$ to $R^{19}$ may be the same as or different from each other, and at least two adjacent groups among $R^{14}$ to $R^{19}$ may be bonded to each other to form a ring.)

By introducing such a structural unit derived from a compound having a negative intrinsic birefringence, it becomes possible to regulate the wavelength dispersibility and the third embodiment of the present invention, the content of the above-described structural unit derived from the compound having a negative intrinsic birefringence is more preferably 3% by weight or more and 65% by weight or less, and especially preferably 5% by weight or more and 60% by weight or less.

Since the above-described structural unit derived from the compound having a negative intrinsic birefringence weakens the birefringence in the stretching direction, in the case where its content in the resin is larger than the above-described range, there is a concern that the birefringence becomes too small, so that a desired retardation is not obtained. In addition, since a ratio of other copolymerization components is small, it becomes difficult to regulate the balance with other properties, such as heat resistance, mechanical physical properties, etc.

Specifically, examples of the dihydroxy compound which is used for introducing the structural unit represented by the foregoing formula (3) include 9,9-bis(4-(2-hydroxyethoxy) phenyl)fluorene, 9,9-bis(4-hydroxyphenyl)fluorene, 9,9-bis (4-hydroxy-3-methylphenyl)fluorene, 9,9-bis(4-(2-hydroxypropoxy)phenyl)fluorene, 9,9-bis(4-(2-hydroxyethoxy)-3-methylphenyl)fluorene, 9,9-bis(4-(2-hydroxypropoxy)-3-methylphenyl)fluorene, 9,9-bis(4-(2-hydroxyethoxy)-3-isopropylphenyl)fluorene, 9,9-bis(4-(2-hydroxyethoxy)-3-isobutylphenyl)fluorene, 9,9-bis(4-(2-hydroxyethoxy)-3-tert-butylphenyl)fluorene, 9,9-bis(4-(2-hydroxyethoxy)-3-cyclohexylphenyl)fluorene, 9,9-bis(4-(2-hydroxyethoxy)-3-phenylphenyl)fluorene, 9,9-bis(4-(2-hydroxyethoxy)-3,5-dimethylphenyl)fluorene, 9,9-bis(4-(2-hydroxyethoxy)-3-tert-butyl-6-methylphenyl)fluorene, 9,9-bis(4-(3-hydroxy-2,2-dimethylpropoxy)phenyl)fluorene, and the like.

In order to efficiently reveal the properties of the fluorene ring as a side chain and from the viewpoints of balance of various properties, such as mechanical physical properties, heat resistance, etc., and easiness of production, in the foregoing formula (3), $R^7$ and $R^8$ are each preferably a hydrogen atom or a methyl group, and $R^9$ and $R^{10}$ are each preferably a hydrogen atom. In addition, in the foregoing formula (3), m and n are each preferably 0 or 1; and two Xs are preferably the same as each other, and are each preferably an ethylene group.

Among the above-described dihydroxy compounds, from the viewpoints of excellence in various properties, such as heat resistance, optical physical properties, mechanical physical properties, etc., and easiness of availability, 9,9-bis(4-(2-hydroxyethoxy)phenyl)fluorene and 9,9-bis(4-hydroxy-3-methylphenyl)fluorene are especially preferred.

In $R^{11}$ and $R^{12}$ in the foregoing formulae (4) and (5), as the "optionally substituted alkylene group having 1 to 4 carbon atoms", for example, the following alkylene groups can be adopted.

Linear alkylene groups, such as a methylene group, an ethylene group, a n-propylene group, a n-butylene group, etc.; and alkylene groups having a branched chain, such as a methylmethylene group, a dimethylmethylene group, an ethylmethylene group, a propylmethylene group, a (1-methylethyl)methylene group, a 1-methylethylene group, a 2-methylethylene group, a 1-ethylethylene group, a 2-ethylethylene group, a 1-methylpropylene group, a 2-methylpropylene group, a 1,1-dimethylethylene group, a 2,2-dimethylpropylene group, a 3-methylpropylene group, etc. Here, the position of the branched chain in each of $R^{11}$ and $R^{12}$ is expressed by the number given such that the carbon on the fluorene ring side is the 1-position.

The selection of $R^{11}$ and $R^{12}$ exerts a particularly significant influence upon revelation of the reverse wavelength dispersibility. In a state where the fluorene ring in the fluorene-based monomer structure is oriented perpendicular to the main chain direction (stretching direction), the strongest reverse wavelength dispersibility is exhibited. In order to make the oriented state of the fluorene ring close to the above-described state to reveal the strong wavelength dispersibility, it is preferred to adopt $R^{11}$ and $R^{12}$ in which the carbon number on the main chain of the alkylene group is 2 to 3. In the case where the carbon number is 1, there is a case where the reverse wavelength dispersibility is not exhibited unexpectedly.

As a factor that in the case where the carbon number is 1, the reverse wavelength dispersibility is not exhibited, the matter that the orientation of the fluorene ring is immobilized to a direction not perpendicular to the main chain direction due to steric hindrance of a carbonate group or an ester group that is a connecting group of the oligofluorene structural unit, or the like may be considered. On the other hand, in the case where the carbon number is too large, there is a concern that the reverse wavelength dispersibility is weakened due to the matter that immobilization of the orientation of the fluorene ring becomes weak. In addition, the heat resistance of the resin tends to be worsened, too.

As expressed in the foregoing formulae (4) and (5), in $R^{11}$ and $R^{12}$, one end of the alkylene group is bonded to the fluorene ring, and the other end is bonded to either one of the oxygen atom or the carbonyl carbon contained in the connecting group. From the viewpoints of heat stability, heat resistance, and reverse wavelength dispersibility, it is preferred that the other hand of the alkylene group is bonded to the carbonyl carbon. As described later, as a monomer having an oligofluorene structure, specifically, a structure of a diol or a diester (hereinafter, the diester will also include a dicarboxylic acid) may be considered; however, it is preferred to perform the polymerization using a diester as a raw material. In addition, from the viewpoint of making the production easy, it is preferred to adopt the same alkylene group for $R^{11}$ and $R^{12}$.

In $R^{13}$, as the "optionally substituted alkylene group having 1 to 4 carbon atoms", for example, the following alkylene groups can be adopted.

Linear alkylene groups, such as a methylene group, an ethylene group, a n-propylene group, a n-butylene group, etc.; and alkylene groups having a branched chain, such as a methylmethylene group, a dimethylmethylene group, an ethylmethylene group, a propylmethylene group, a (1-methyl ethyl)methyl ene group, a 1-methylethylene group, a 2-methylethylene group, a 1-ethylethylene group, a 2-ethylethylene group, a 1-methylpropylene group, a 2-methylpropylene group, a 1,1-dimethylethylene group, a 2,2-dimethylpropylene group, a 3-methylpropylene group, etc.

In $R^{13}$, the carbon number on the main chain of the alkylene group is preferably 1 to 2, and especially preferably 1. In the case of adopting $R^{13}$ in which the carbon number on the main chain is too large, similar to $R^{11}$ and $R^{12}$, immobilization of the fluorene ring is weakened, so that there is a concern that worsening of the reverse wavelength dispersibility, increase of the photoelastic coefficient, worsening of the heat resistance, and so on are brought. On the other hand, though when the carbon number on the main chain is smaller, the optical properties or the heat resistance is favorable; however, in the case where the 9-positions of the two fluorene rings are directly bonded to each other, the heat stability is deteriorated.

It is preferred that the fluorene ring which is contained in the above-described oligofluorene structural unit is either a constitution in which all of $R^{14}$ to $R^{19}$ are a hydrogen atom, or a constitution in which not only $R^{14}$ and/or $R^{19}$ is any one selected from the group consisting of a halogen atom, an acyl group, a nitro group, a cyano group, and a sulfo group, but also $R^{15}$ to $R^{18}$ are a hydrogen atom.

In the case where the fluorene ring has the former constitution, a compound containing the above-described oligofluorene structural unit can be derived from an industrially inexpensive fluorene. In addition, in the case where the fluorene ring has the latter constitution, since the reactivity at the 9-position of the fluorene is improved, there is a tendency that a variety of derivation reactions are adaptable in a synthesis process of a compound containing the above-described oligofluorene structural unit.

The above-described fluorene ring is more preferably either a constitution in which all of $R^{14}$ to $R^{19}$ are a hydrogen atom, or a constitution in which not only $R^{14}$ and/or $R^{19}$ is any one selected from the group consisting of a fluorine atom, a chlorine atom, a bromine atom, and a nitro group, but also $R^{15}$ to $R^{18}$ are a hydrogen atom, and especially preferably a constitution in which all of $R^{14}$ to $R^{19}$ are a hydrogen atom. By adopting the above-described constitution, not only the fluorene ratio can be increased, but also the steric hindrance between the fluorene rings is hardly generated, so that there is a tendency that the desired optical properties originated from the fluorene ring are obtained.

Among the divalent oligofluorene structural units represented by the foregoing formulae (4) and (5), specifically, examples of a preferred structure include structures having skeletons exemplified in the following group [A].

[A]

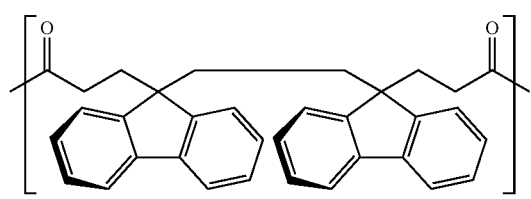
(A1)

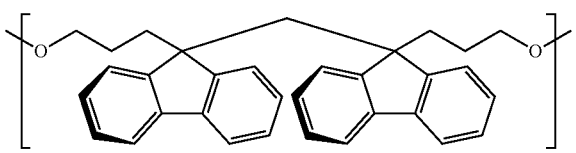
(A2)

-continued

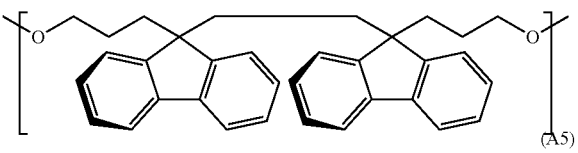
(A3)

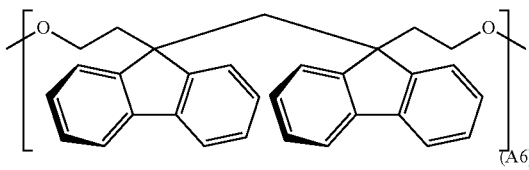
(A4)

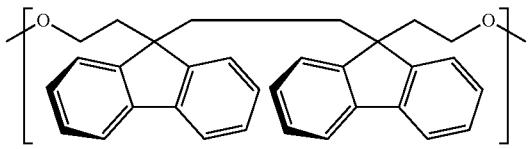
(A5)

Examples of the monomer having the above-described oligofluorene structural unit include a specified dihydroxy compound represented by the following formula (7) and a specified diester represented by the following formula (8).

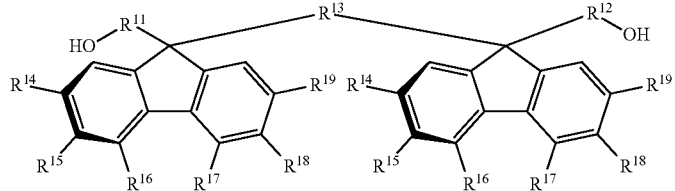
(7)

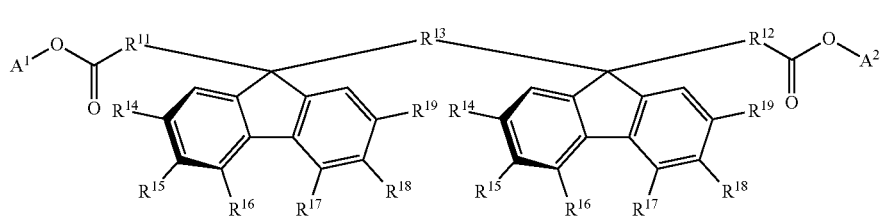
(8)

-continued

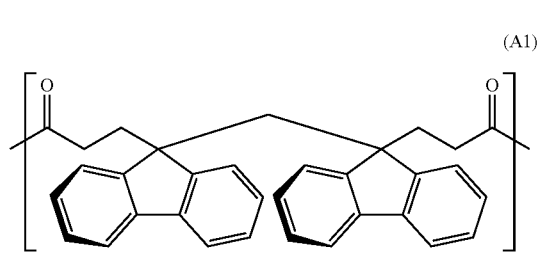
(A6)

(In the formulae (7) and (8), $R^{11}$ to $R^{13}$ each independently represent a direct bond or an optionally substituted alkylene group having 1 to 4 carbon atoms; $R^{14}$ to $R^{19}$ each independently represent a hydrogen atom, an optionally substituted alkyl group having 1 to 10 carbon atoms, an optionally substituted aryl group having 4 to 10 carbon atoms, an optionally substituted acyl group having 1 to 10 carbon atoms, an optionally substituted alkoxy group having 1 to 10 carbon atoms, an optionally substituted aryloxy group having 1 to 10 carbon atoms, an optionally substituted amino group, an optionally substituted vinyl group having 1 to 10 carbon atoms, an optionally substituted ethynyl group having 1 to 10 carbon atoms, a sulfur atom having a substituent, a silicon atom having a substituent, a halogen atom, a nitro group, or a cyano group, provided that $R^{14}$ to $R^{19}$ may be the same as or different from each other, and at least two adjacent groups among $R^{14}$ to $R^{19}$ may be bonded to each other to form a ring; and $A^1$ and $A^2$ are a hydrogen atom or are each an optionally substituted aliphatic hydrocarbon group having 1 to 18 carbon atoms or an optionally substituted aromatic hydrocarbon group, and $A^1$ and $A^2$ may be the same as or different from each other.)

As the above-described monomer having a divalent oligofluorene structural unit, the specified diester represented by the foregoing formula (8) is preferably used. As compared with the specified dihydroxy compound represented by the foregoing formula (7), the above-described specified diester is relatively favorable in terms of the heat stability, and the fluorene ring in the polymer is oriented in a preferred direction, so that it tends to exhibit stronger reverse wavelength dispersibility. In the case of containing the structural unit of a diester in the polycarbonate resin, that resin is called a polyester carbonate resin.

In the case where $A^1$ and $A^2$ of the foregoing formula (8) are a hydrogen atom or an aliphatic hydrocarbon group, such as a methyl group, an ethyl group, etc., there is a case where the polymerization reaction hardly takes place under generally adopted polymerization conditions of a polycarbonate. Therefore, $A^1$ and $A^2$ of the foregoing formula (8) are preferably an aromatic hydrocarbon group.

In the polycarbonate resin according to each of the second embodiment and the third embodiment of the present invention, a structural unit other than the above-described structural units (hereinafter sometimes referred to as "other structural unit") may be contained. Examples of a monomer containing the other structural unit include an aliphatic dihydroxy compound, an alicyclic dihydroxy compound, a dihydroxy compound containing an acetal ring, an oxyalkylene glycol, a dihydroxy compound containing an aromatic component, and a diester compound as those described above in the first embodiment of the present invention, and the like.

Among these, from the viewpoint of enhancing the reaction efficiency, an aliphatic dihydroxy compound, an alicyclic dihydroxy compound, a dihydroxy compound containing an acetal ring, an oxyalkylene glycol, and a dihydroxy compound containing an aromatic component are preferred; an aliphatic dihydroxy compound, an alicyclic dihydroxy compound, a dihydroxy compound containing an acetal ring, and an oxyalkylene glycol are more preferred; an aliphatic dihydroxy compound, an alicyclic dihydroxy compound, and a dihydroxy compound containing an acetal ring are still more preferred; and an aliphatic dihydroxy compound and an alicyclic dihydroxy compound are especially preferred.

As each of these aliphatic dihydroxy compound, alicyclic dihydroxy compound, dihydroxy compound containing an acetal ring, oxyalkylene glycol, dihydroxy compound containing an aromatic component, and diester compound, the compounds described above in the first embodiment of the present invention can be used.

From the viewpoint of optical properties, as the above-described other structural unit, a structural unit not containing an aromatic component is preferably used. However, in order to keep balance with heat resistance, mechanical properties, or the like while securing optical properties, there is a case where it is effective to incorporate an aromatic component into a main chain or a side chain of the polymer. In this case, for example, the aromatic component can be introduced into the polymer by the above-described other structural unit containing an aromatic structure; however, when a total amount in weight of all of the structural units and connecting groups constituting the polycarbonate resin is defined as 100% by weight, the content of such a structural unit in the resin of the present invention is preferably 5% by weight or less. When the amount of the other structural unit containing an aromatic structure is larger, there is a concern that the photoelastic coefficient is worsened.

As the above-described monomer having other structural unit, it is especially preferred to use 1,6-hexanediol, 2,2,4,4-tetramethyl-1,3-cyclobutanediol, 1,4-cyclohexanedimethanol, tricyclodecane dimethanol, spiroglycol, 1,4-cyclohexanedicarboxylic acid, or decalin-2,6-dicarboxylic acid (or a derivative thereof). The resin containing a structural unit derived from such a monomer is excellent in balance among optical properties, heat resistance, mechanical properties, and so on.

Since the polymerization reactivity of the diester compound is relatively low, from the viewpoint of enhancing the reaction efficiency, it is more preferred that a diester compound other than a diester compound having an oligofluorene structural unit is not used.

The dihydroxy compound or the diester compound for introducing the other structural unit may be used either alone or in combination of two or more thereof according to the required performance of the resulting resin. When a total amount in weight of all of the structural units and connecting groups constituting the polycarbonate resin is defined as 100% by weight, the content of the other structural unit in the resin is preferably 0.1% by weight or more and 50% by weight or less, more preferably 1% by weight or more and 45% by weight or less, and especially preferably 3% by weight or more and 40% by weight or less. Since the other structural unit mainly plays a role to regulate the heat resistance of the resin, or to impart flexibility or toughness, when its content is too small, the mechanical properties or melt processability of the resin is worsened, whereas when the content is too large, there is a concern that the heat resistance or optical properties are worsened.

(Carbonic Diester)

The connecting group of the above-described structural unit which is contained in the polycarbonate resin of the present invention is introduced through polymerization of a carbonic diester represented by the following formula (12).

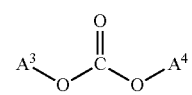

(12)

In the formula (12), $A^3$ and $A^4$ are each an optionally substituted aliphatic hydrocarbon group having 1 to 18 carbon atoms or an optionally substituted aromatic hydrocarbon group, and $A^3$ and $A^4$ may be the same as or different from each other.

$A^3$ and $A^4$ are each preferably a substituted or unsubstituted aromatic hydrocarbon group, and more preferably an unsubstituted aromatic hydrocarbon group. Examples of the substituent of the aliphatic hydrocarbon group include an ester group, an ether group, a carboxylic acid, an amide group, and halogen, and examples of the substituent of the aromatic hydrocarbon group include an alkyl group, such as a methyl group, an ethyl group, etc.

Examples of the carbonic diester represented by the foregoing formula (12) include a substituted diphenyl carbonate, such as diphenyl carbonate (hereinafter sometimes abbreviated as "DPC"), ditolyl carbonate, etc.; and a dialkyl carbonate, such as dimethyl carbonate, diethyl carbonate, di-tert-butyl carbonate, etc. The carbonic diester is preferably diphenyl carbonate or a substituted diphenyl carbonate, and especially preferably diphenyl carbonate.

There is a case where the carbonic diester contains impurities, such as a chloride ion, etc., so that there is a case where the polymerization reaction is impaired, or the hue of the resulting resin is worsened. Thus, it is preferred to use a carbonic diester purified by means of distillation or the like as the need arises.

In addition, in the case of performing the polymerization reaction using both of the diester monomer represented by the foregoing formula (8) and the carbonic diester represented by the foregoing formula (12), when all of $A^1$ and $A^2$ of the foregoing formula (8) and $A^3$ and $A^4$ of the foregoing formula (12) are the same structure, a component leaving during the polymerization reaction is identical, and the component is apt to be recovered and reused. In addition, from the viewpoints of polymerization reactivity and usefulness in the reuse, it is especially preferred that $A^1$ to $A^4$ are a phenyl group. In the case where $A^1$ to $A^4$ are a phenyl group, the component leaving during the polymerization reaction is phenol.

[Production Conditions of Polycarbonate Resin of the Present Invention]

The polycarbonate resin of the present invention can be produced by a generally used polymerization method. For example, the polycarbonate resin can be produced by adopting a solution polymerization method or an interfacial polymerization method using phosgene or a carboxylic halide, or a melt polymerization method for undergoing the reaction without using a solvent. Among these production methods, it is preferred to produce the polycarbonate resin by the melt polymerization method because in view of the fact that a solvent or a compound with high toxicity is not used, an environmental load can be reduced, and it is excellent in productivity.

In addition, when a solvent is used for the polymerization, there is a case where the solvent remains in the resin, and a glass transition temperature of the resin is decreased due to its plasticization effect, thereby possibly causing a change in quality in a processing step, such as molding, stretching, etc., as described later. In addition, a halogen-based organic solvent, such as methylene chloride, etc., is frequently used as the solvent. In the case where the halogen-based solvent remains in a resin, when a molded body using this resin is incorporated into an electronic instrument or the like, there may be possibly caused corrosion of a metallic part. Since the resin obtained by the melt polymerization method does not contain a solvent, such is advantageous for stabilizing the processing step or product quality.

On producing a polycarbonate resin by the melt polymerization method, a monomer having the above-described structural unit, a carbonic diester, and a polymerization catalyst are mixed, the mixture is subjected to an ester interchange reaction (or also referred to as "polycondensation reaction") under melting, and a rate of reaction is increased while removing a leaving component out the system. At the final stage of the polymerization, the reaction is allowed to proceed until reaching a targeted molecular weight under high vacuum conditions. After completion of the reaction, the resin in a molten state is extracted from the reactor, whereby the polycarbonate resin of the present invention is obtained.

In the polycondensation reaction, the reaction rate or the molecular weight of the resulting resin can be controlled by strictly regulating a molar ratio of all dihydroxy compounds and all diester compounds. In the case of the polycarbonate resin, the molar ratio of the carbonic diester to all dihydroxy compounds is preferably regulated to 0.90 to 1.10, more preferably regulated to 0.96 to 1.05, and especially preferably to 0.98 to 1.03. In the case of the polyester carbonate resin, the molar ratio of a total amount of the carbonic diester and all diester compounds to all dihydroxy compounds is preferably regulated to 0.90 to 1.10, more preferably regulated to 0.96 to 1.05, and especially preferably to 0.98 to 1.03.

When the above-described molar ratio is largely dislocated high and low, a resin having a desired molecular weight cannot be produced. In addition, when the above-described molar ratio is too small, there is a case where the hydroxyl group terminal of the produced resin increases, so that the heat stability of the resin is deteriorated. In addition, a plenty of an unreacted dihydroxy compound remains in the resin, thereby possibly causing staining of a molding machine in a subsequent molding processing step, or inferior appearance of a molded article. On the other hand, when the above-described molar ratio is too large, a rate of the ester interchange reaction under the same conditions is lowered, or a residual amount of the carbonic diester or diester compound in the produced resin increases, whereby this residual low-molecular component possibly brings about the same problem in the molding processing step.

The melt polymerization method is usually carried out in a multi-stage step of two or more stages. The polycondensation reaction may be carried out in a steps of two or more stages by using a single polymerization reactor and successively changing the conditions, or may also be carried out in a step of two or more stages by using two or more reactors and changing the respective conditions; however, from the viewpoint of production efficiency, the polycondensation reaction is carried out using two or more, and preferably three or more reactors. In the polycondensation reaction, any of a batch mode, a continuous mode, and a combination of a batch mode and a continuous mode may be adopted; however, from the viewpoints of production efficiency and stability of quality, a continuous mode is preferred.

In the polycondensation reaction, it is important to appropriately control the balance between the temperature and the pressure within a reaction system. When either one of the temperature and the pressure is excessively changed fast, there is a concern that the unreacted monomer distils out the reaction system. As a result, there is a case where the molar ratio of the dihydroxy compound and the diester compound changes, so that a resin having a desired molecular weight is not obtained.

In addition, a polymerization rate of the polycondensation reaction is controlled by the balance between the hydroxyl group terminal and the ester group terminal or the carbonate group terminal. Therefore, in particular, in the case of performing the polymerization in a continuous mode, when the balance of the terminal groups fluctuates due to distillation of the unreacted monomer, there is a concern that it becomes difficult to constantly control the polymerization rate, so that the molecular weight of the resulting resin largely fluctuates. Since the molecular weight of the resin correlates with a melt viscosity, on subjecting the resulting resin to molding processing, there is a concern that the melt viscosity fluctuates, thereby bringing about such a problem that a molded article having uniform dimensions is not obtained, or other problem.

Furthermore, when the unreacted monomer distils out, there is a concern that not only the balance of the terminal groups fluctuates, but also the copolymerization composition of the resin is dislocated from a desired composition, so that the mechanical physical properties or optical properties are affected. In the retardation film of the present invention, since the wavelength dispersibility of the retardation is controlled by a ratio of the fluorene-based monomer and other copolymerization component in the resin, when the ratio collapses during the polymerization, there is a concern that the designed optical properties are not obtained.

The step of the melt polycondensation reaction is hereunder mentioned while dividing it into a stage of consuming the monomers to produce an oligomer and a stage of allowing the polymerization to proceed until a desired molecular weight, to produce a polymer.

Specifically, as reaction conditions in the first stage reaction, the following conditions can be adopted. That is, an inner temperature of the polymerization reactor is set to a range of typically 130° C. or higher, preferably 150° C. or higher, and more preferably 170° C. or higher, and typically 250° C. or lower, preferably 240° C. or lower, and more preferably 230° C. or lower.

In addition, a pressure of the polymerization reactor is set to a range of typically 70 kPa or less (the pressure will hereinafter express an absolute pressure), preferably 50 kPa or less, and more preferably 30 kPa or less, and typically 1 kPa or more, preferably 3 kPa or more, and more preferably 5 kPa or more.

In addition, a reaction time is set to a range of typically 0.1 hours or more, and preferably 0.5 hours or more, and typically 10 hours or less, preferably 5 hours or less, and more preferably 3 hours or less.

The first stage reaction is carried out while distilling a monohydroxy compound derived from the generated diester compound out the reaction system. For example, in the case of using diphenyl carbonate as the carbonic diester, the monohydroxy compound to be distilled out the reaction system in the first stage reaction is phenol.

In the first stage reaction, though the polymerization reaction can be promoted as the reaction pressure is made lower; on the other hand, distillation of the unreacted monomer becomes more frequent. In order to make both inhibition of distillation of the unreacted monomer and promotion of the reaction due to pressure reduction compatible with each other, it is effective to use a reactor equipped with a reflux condenser. In particular, it is suitable to use a reflux condenser at the initial stage of reaction where the amount of the unreacted monomer is large.

In the second stage reaction, the pressure of the reaction system is gradually reduced from the first stage pressure, and subsequently, the pressure of the reaction system is finally reduced to 5 kPa or less, preferably 3 kPa or less, and more preferably 1 kPa or less while removing the generated monohydroxy compound out the reaction system. In addition, an inner temperature is set to a range of typically 210° C. or higher, and preferably 220° C. or higher, and typically 270° C. or lower, and preferably 260° C. or lower.

In addition, a reaction time is set to a range of typically 0.1 hours or more, preferably 0.5 hours or more, and more preferably 1 hour or more, and typically 10 hours or less, preferably 5 hours or less, and more preferably 3 hours or less. In order to obtain a resin in which coloration or heat deterioration is inhibited and which has favorable hue or heat stability, it is suitable to set a maximum temperature of the inner temperature at all reaction stages to 270° C. or lower, preferably 265° C. or lower, and more preferably 260° C. or lower.

An ester interchange reaction catalyst which may be used at the time of polymerization (hereinafter sometimes referred to simply as "catalyst" or "polymerization catalyst") may give a very significant influence to the reaction rate or the color tone or heat stability of the resin obtained through polycondensation. Though the catalyst to be used is not limited so long as it may satisfy the transparency, hue, heat resistance, heat stability, and mechanical strength of the produced resin, examples thereof include compounds of metals belonging to the Group 1 or Group 2 of the long-form periodic table (hereinafter expressed simply as "Group 1" or "Group 2") and basic compounds, such as basic boron compounds, basic phosphorus compounds, basic ammonium compounds, amine compounds, etc. Preferably, at least metal compound selected from the group consisting of a metal belonging to the Group 2 of the long-form periodic table and lithium is used.

As the above-described compound of a metal belonging to the Group 1, for example, the following compounds can be adopted, but it is also possible to adopt other compounds belonging to the Group 1.

Sodium hydroxide, potassium hydroxide, lithium hydroxide, cesium hydroxide, sodium hydrogencarbonate, potassium hydrogencarbonate, lithium hydrogencarbonate, cesium hydrogencarbonate, sodium carbonate, potassium carbonate, lithium carbonate, cesium carbonate, sodium acetate, potassium acetate, lithium acetate, cesium acetate, sodium stearate, potassium stearate, lithium stearate, cesium stearate, sodium borohydride, potassium borohydride, lithium borohydride, cesium borohydride, sodium tetraphenylborate, potassium tetraphenylborate, lithium tetraphenylborate, cesium tetraphenylborate, sodium benzoate, potassium benzoate, lithium benzoate, cesium benzoate, disodium hydrogenphosphate, dipotassium hydrogenphosphate, dilithium hydrogenphosphate, dicesium hydrogenphosphate, disodium phenylphosphate, dipotassium phenylphosphate, dilithium phenylphosphate, dicesium phenylphosphate, an alcoholate or phenolate of sodium, potassium, lithium, or cesium, and a disodium salt, dipotassium salt, dilithium salt, or dicesium salt of bisphenol A. Among these, from the viewpoints of polymerization activity and hue of the resulting resin, lithium compounds are preferably used.

As the above-described compound of a metal belonging to the Group 2, for example, the following compounds can be adopted, but it is also possible to adopt other compounds belonging to the Group 2.

Calcium hydroxide, barium hydroxide, magnesium hydroxide, strontium hydroxide, calcium hydrogencarbonate, barium hydrogencarbonate, magnesium hydrogencarbonate, strontium hydrogencarbonate, calcium carbonate, barium carbonate, magnesium carbonate, strontium carbonate, calcium acetate, barium acetate, magnesium acetate, strontium acetate, calcium stearate, barium stearate, magnesium stearate, and strontium stearate. Among these, magnesium compounds, calcium compounds, and barium compounds are preferably used; from the viewpoints of polymerization activity and hue of the resulting resin, magnesium compounds and/or calcium compounds are more preferably used; and calcium compounds are most preferably used.

Though it is also possible to auxiliary jointly use a basic compound, such as a basic boron compound, a basic phosphorus compound, a basic ammonium compound, an amine compound, etc., together with the above-described compound of a metal belonging to the Group 1 and/or compound of a metal belonging to the Group 2, it is especially preferred to use at least one compound of a metal selected from the group consisting of a metal belonging to the Group 2 of the long-term periodic table and lithium.

The amount of the above-described polymerization catalyst used is typically 0.1 μmol to 300 μmol, and preferably 0.5 μmol to 100 μmol per mol of all hydroxy compounds used for the polymerization. In the case of using at least one compound of a metal selected from the group consisting of a metal belonging to the Group 2 of the long-term periodic table and lithium, in particular, in the case of using a magnesium compound and/or a calcium compound, the above-described polymerization catalyst is used in an amount of typically 0.1 µmol or more, preferably 0.3 µmol or more, and especially preferably 0.5 µmol or more in terms of a metal amount per mol of the above-described all dihydroxy compounds. In addition, the amount of the above-described polymerization catalyst used is suitably 30 µmol or less, preferably 20 µmol or less, and especially preferably 10 µmol or less.

In addition, in the case of producing the polyester carbonate resin using a diester compound for the monomer, an ester interchange catalyst, such as a titanium compound, a tin compound, a germanium compound, an antimony compound, a zirconium compound, a lead compound, an osmium compound, a zinc compound, a manganese compound, etc., can also be used in combination with the above-described basic compound or without using it. The amount of such an ester interchange catalyst used is typically within a range of 1 µmol to 1 mmol, preferably within a range of 5 µmol to 800 µmol, and especially preferably within a range of 10 µmol to 500 µmol per mol of all dihydroxy compounds used for the reaction.

When the catalyst amount is too small, since the polymerization rate becomes slow, in order to obtain a resin having a desired molecular weight, the polymerization temperature must be made high in proportion thereto. For that reason, the possibility that the hue of the resulting resin is worsened becomes high, and the unreacted raw material volatilizes on the way of polymerization, and the molar ratio of the dihydroxy compound and the diester compound collapses, so that there is a possibility that the molecular weight does not reach a desired value. On the other hand, when the amount of the polymerization catalyst used is too large, an undesired side-reaction concurs, so that worsening of hue of the resulting resin, or coloration or decomposition of the resin at the time of molding processing is possibly brought.

Among the metals belonging to the Group 1, when a large amount of sodium, potassium, or cesium is contained in the resin, there is a possibility that the hue is adversely affected. There is a case where such a metal is incorporated not only from the catalyst used but also from the raw material or reaction apparatus. Regardless of the source, a total amount of compounds of these metals in the resin is suitably 2 µmol or less, preferably 1 µmol or less, and more preferably 0.5 µm or less in terms of a metal amount per mol of the above-described all dihydroxy compounds.

After undergoing the polymerization as described above, the polycarbonate resin of the present invention is usually cooled for solidification and then, can be pelletized by a rotary cutter or the like. The pelletization method is not limited. However, examples thereof include a method in which the resin in a molten state is extracted from a final-stage polymerization reactor and cooled for solidification in a form of strand, followed by pelletization; a method in which the resin in a molten state is fed from a final-stage polymerization reactor into a single-screw or twin-screw extruder and melt extruded, and the extrudate is cooled for solidification, followed by pelletization; a method in which the resin in a molten state is extracted from a final-stage polymerization reactor, cooled for solidification in a form of strand, and then once pelletized, the resulting resin is again fed into a single-screw or twin-screw extruder and melt extruded, and the extrudate is cooled for solidification, followed by pelletization; and the like.

[Preferred Physical Properties of Polycarbonate Resin of the Present Invention]

The molecular weight of each of the thus obtained polycarbonate resins according to the first embodiment and the second embodiment can be expressed in terms of a reduced viscosity. When the reduced viscosity of the resin is too low, there is a possibility that the mechanical strength of a molded article becomes small. Therefore, the reduced viscosity is typically 0.20 dL/g or more, and preferably 0.25 dL/g or more. On the other hand, when the reduced viscosity of the resin is too large, the fluidity on molding is lowered, so that the productivity or moldability tends to be worsened. Therefore, the reduced viscosity is typically 1.00 dL/g or less, preferably 0.80 dL/g or less, and more preferably 0.70 dL/g or less.

In addition, the molecular weight of the polycarbonate resin according to the third embodiment of the present invention can be expressed in terms of a reduced viscosity, too. When the reduced viscosity of the resin is too low, there is a possibility that the mechanical strength of a molded article becomes small. Therefore, the reduced viscosity is typically 0.20 dL/g or more, and preferably 0.25 dL/g or more. On the other hand, where the reduced viscosity of the resin is too large, the fluidity on molding is lowered, so that the productivity or moldability tends to be worsened. Therefore, the reduced viscosity is typically 0.80 dL/g or less, preferably 0.70 dL/g or less, and more preferably 0.60 dL/g or less. The reduced viscosity is measured by precisely regulating a sample concentration to 0.6 dL/g with methylene chloride as a solvent and performing the measurement at a temperature of 20.0° C.±0.1° C. by using an Ubbelohde viscometer.

Since the above-described reduced viscosity collates with a melt viscosity of the resin, in general, an agitation power of the polymerization reactor, a discharge pressure of a gear pump for transferring the molten resin, or the like can be used as an indicator of operation management. That is, at a stage at which an indicated value of the above-described operation instrument has reached a targeted value, the pressure of the reactor is returned to atmospheric pressure, or the resin is extracted from the reactor, thereby terminating the polymerization reaction.

The melt viscosity of the polycarbonate resin of the present invention is preferably 800 Pa·s or more and 7,000 Pa·s or less under measurement conditions at a temperature of 240° C. and a shear rate of 91.2 sec$^{-1}$. A lower limit of the melt viscosity becomes more preferable in the order of 900 Pa·s or more, 1,000 Pa·s or more, 1,100 Pa·s or more, and 1,200 Pa·s or more, and is still more preferably 1,500 Pa·s or more, and especially preferably 2,000 Pa·s or more. An upper limit of the melt viscosity is more preferably 6,500 Pa·s or less, still more preferably 6,000 Pa·s or less, especially preferably 5,500 Pa·s or less, and most preferably 5,000 Pa·s or less. The melt viscosity is measured using a capillary rheometer (manufactured by Toyo Seiki Seisaku-Sho, Ltd.). When the melt viscosity falls within the above-described range, the resin has thorough mechanical physical properties, and it becomes possible to undergo melt processing within a temperature range at which heat deterioration of the resin can be inhibited.

A glass transition temperature of each of the polycarbonate resins according to the first embodiment and the second embodiment of the present invention is preferably 120° C. or higher and 200° C. or lower. A lower limit thereof becomes more preferable in the order of 125° C. or higher, 130° C. or higher, and 135° C. or higher, and is still more preferably 140° C. or higher, and especially preferably 150° C. or higher. An upper limit thereof is more preferably 190° C. or lower, still more preferably 180° C. or lower, and especially preferably 170° C. or lower.

It is preferable that a glass transition temperature of the polycarbonate resin according to the third embodiment of the present invention is 120° C. or higher and 180° C. or lower. A lower limit thereof becomes more preferable in the order of 125° C. or higher, 130° C. or higher, and 140° C. or higher, and is still more preferably 150° C. or higher, and especially 155° C. or higher. An upper limit thereof is more preferably 175° C. or lower, and especially preferably 170° C. or lower.

The glass transition temperature can be regulated by a copolymerization ratio of the structural units or other structural unit used in the present invention. When the glass transition temperature is excessively low, the heat resistance tends to become worse, and there is a possibility that the reliability of various physical properties (e.g., optical properties, mechanical physical properties, dimensions, etc.) of a molded body in the use environment is worsened. On the other hand, when the glass transition temperature is excessively high, there is a case where the melt processability is worsened, so that the dimensional precision of a molded article is worsened, or the transparency is impaired.

In the case of using a diester compound for the polycondensation reaction, since a by-produced monohydroxy compound remains in the resin, there is a concern that on melt processing, it volatilizes to form an offensive smell, thereby worsening the work environment, or stains a molding machine to impair the appearance of a molded article. In particular, in the case of using diphenyl carbonate (DPC) that is a useful carbonic diester, the by-produced phenol has a relatively high boiling point and is not thoroughly removed by a reaction under reduced pressure, so that it is apt to remain in the resin.

Therefore, the amount of the monohydroxy compound derived from the carbonic diester contained in the resin is preferably 1,000 weight ppm or less. The content is more preferably 700 weight ppm or less, and especially preferably 500 weight ppm or less.

In order to solve the above-described problems, it is suitable that the content of the monohydroxy compound is small as far as possible; however, it is difficult to make the monohydroxy compound remaining in the resin zero by the melt polymerization method, and hence, it requires a great deal of labor in order to remove the monohydroxy compound. In general, the above-described problems can be thoroughly suppressed by decreasing the content of the monohydroxy compound to 1 weight ppm.

In order to decrease low-molecular components inclusive of the monohydroxy compound derived from the carbonic diester, which remain in the resin, it is effective to subject the resin to a devolatilization treatment with an extruder, or to reduce the pressure at the final stage of polymerization to 3 kPa or less, preferably 2 kPa or less, and still preferably 1 kPa or less.

In the case of reducing the pressure at the final stage of polymerization, when the pressure of the reaction is excessively reduced, there is a case where the molecular weight abruptly increases, thereby making it difficult to control the reaction. Therefore, it is preferred that the terminal group concentration of the resin is made in excess of the hydroxy group terminal or ester group terminal to bias the terminal group balance, thereby undergoing the production. The terminal group balance can be regulated by a charging molar ratio of all dihydroxy compounds and all diester compounds.

In addition, there is a possibility that not only the above-described monohydroxy compound but also the unreacted monomer component in the resin becomes a residual low-molecular component. In particular, the carbonic diester and the dihydroxy compound containing the SBI structural unit represented by the foregoing formula (6) are apt to remain. Similar to the case of the residual monohydroxy compound, it becomes possible to decrease these components to specified amounts or less by controlling the terminal group balance or the reaction pressure at the final stage of polymerization, or subjecting the resin to a devolatilization treatment with an extruder. In the resin of the present invention, the content of the carbonic diester is preferably 300 weight ppm or less, more preferably 200 weight ppm or less, and especially preferably 150 weight ppm or less. In addition, the content of the dihydroxy compound represented by the foregoing formula (6) is preferably 1,000 weight ppm or less, more preferably 700 weight ppm or less, and especially preferably 500 weight ppm or less.

In order to solve the above-described problems, it is suitable that the contents of the carbonic diester and the dihydroxy compound represented by the formula (6) are small as far as possible; however, it is difficult to make the carbonic diester remaining in the resin zero by the melt polymerization method, and hence, it requires a great deal of labor in order to remove the carbonic diester. In general, the above-described problems can be thoroughly suppressed by decreasing the content of the carbonic diester to 1 weight ppm.

A pencil hardness of each of the polycarbonate resins according to the first embodiment and the second embodiment of the present invention is preferably HB or more, and more preferably F or more. Since the structural units represented by the foregoing formulae (1) and (2) which are used in the present invention are a component having a relatively high pencil hardness, by increasing the copolymerization ratio thereof, it becomes possible to achieve the above-described pencil hardness.

In each of the polycarbonate resins according to the first embodiment and the second embodiment of the present invention, under conditions of a weather resistance test as described later, a difference (ΔYI) of YI (yellowness index) of a plate molded body having a thickness of 3 mm before and after irradiation with ultraviolet light is preferably 1.0 or less, more preferably 0.8 or less, and still more preferably 0.5 or less.

When the coloration under irradiation with ultraviolet light is small, the polycarbonate resin can be suitably used for an application to be used in a place of the outdoors to be exposed to sunlight. In addition, by adding an ultraviolet absorber to the polycarbonate resin, it becomes possible to make the above-described ΔYI small. However, when the ΔYI of the polycarbonate working as a base material is larger than the above-described range, a necessary amount of the ultraviolet absorber becomes large, and therefore, the ultraviolet absorber bleeds out at the time of molding processing, so that a problem, such as staining of a molding machine, inferior appearance of a molded article, etc., is liable to be brought.

In each of the polycarbonate resins according to the first embodiment and the second embodiment of the present invention, in a boiling water immersion test as described later, it is preferred that a change of shape of a plate molded body, or whitening or cracking is not generated. In view of the fact that the polycarbonate resin has such properties, the polycarbonate resin can be suitably used for an application in which the reliability is required under high temperature and high humidity conditions. The above-described moist heat resistance can be achieved by making the glass transition temperature of the polycarbonate resin high and making the water absorption low. It is possible to regulate these physical properties by a copolymerization ratio of the various structural units used in the present invention.

A photoelastic coefficient of the polycarbonate resin of the present invention is preferably $30 \times 10^{-12}$ $Pa^{-1}$ or less, more preferably $25 \times 10^{-12}$ $Pa^{-1}$ or less, still more preferably $20 \times 10^{-12}$ $Pa^{-1}$ or less, and especially preferably $17 \times 10^{-12}$ $Pa^{-1}$ or less. In particular, in the case where the polycarbonate resin of the present invention is used for a retardation film, when the photoelastic coefficient is excessively large, on sticking the retardation film to a polarizing plate, there is a possibility that a worsening of the image quality, such as the matter that the surroundings of an image plane become blurred white, is caused. In particular, in the case where the polycarbonate resin is used for a large-sized display device, a flexible display, or the like, this problem remarkably appears.

In the polycarbonate resin of the present invention, it is possible to suppress the photoelastic coefficient low by constituting it by the structural unit represented by the foregoing formula (1) and the aliphatic structural unit and not using other aromatic structure.

In the polycarbonate resin of the present invention, a birefringence (Δn) revealed under stretching conditions as described later is preferably 0.0005 or more, and more preferably 0.001 or more. In the case where the birefringence revealed is smaller than the above-described range, in order to obtain a desired retardation, a thickness of the film must be made large, so that a thickness of the display becomes large, and such is also disadvantageous from the viewpoint of material costs.

[Additive]

In the polycarbonate resin of the present invention, it is permissible to contain a usually used additive, such as a heat stabilizer, an antioxidant, a catalyst deactivator, an ultraviolet absorber, a light stabilizer, a release agent, a dye or pigment, an impact improver, an antistatic agent, a lubricant, a lubricating agent, a plasticizer, a compatibilizing agent, a nucleating agent, a flame retarder, an inorganic filler, a blowing agent, etc.

(Heat Stabilizer)

In the polycarbonate resin of the present invention, a heat stabilizer can be blended for the purpose of preventing lowering of the molecular weight or worsening of the hue at the time of melt processing or the like as the need arises. Examples of such a heat stabilizer include generally known hindered phenol-based heat stabilizers and/or phosphorus-based heat stabilizers.

As the hindered phenol-based compound, for example, the following compounds can be adopted. 2,6-Di-tert-butylphenol, 2,4-di-tert-butylphenol, 2-tert-butyl-4-methoxyphenol, 2-tert-butyl-4,6-dimethylphenol, 2,6-di-tert-butyl-4-methylphenol, 2,6-di-tert-butyl-4-ethylphenol, 2,5-di-tert-butylhydroquinone, n-octadecyl-3-(3',5'-di-tert-butyl-4'-hydroxyphenyl)propionate, 2-tert-butyl-6-(3'-tert-butyl-5'-methyl-2'-hydroxybenzyl)-4-methylphenyl acrylate, 2,2'-methylene-bis-(4-methyl-6-tert-butylphenol), 2,2'-methylene-bis-(6-cyclohexyl-4-methylphenol), 2,2'-ethylidene-bis-(2,4-di-tert-butylphenol), tetrakis-[methylene-3-(3',5'-di-tert-butyl-4'-hydroxyphenyl)propionate]-methane, 1,3,5-trimethyl-2,4,6-tris-(3,5-di-tert-butyl-4-hydroxybenzyl)benzene, and the like. Among these, tetrakis-[methylene-3-(3',5'-di-tert-butyl-4'-hydroxyphenyl)propionate]-methane, n-octadecyl-3-(3',5'-di-tert-butyl-4'-hydroxyphenyl)propionate, and 1,3,5-trimethyl-2,4,6-tris-(3,5-di-tert-butyl-4-hydroxybenzyl)benzene are preferably used.

As the phosphorus-based compound, for example, the following phosphorous acid, phosphoric acid, phosphonous acid, phosphonic acid, and esters thereof, and the like can be adopted; however, it is also possible to adopt phosphorus-based compounds other than these compounds. Triphenyl phosphite, tris(nonylphenyl) phosphite, tris(2,4-di-tert-butylphenyl) phosphite, tridecyl phosphite, trioctyl phosphite, trioctadecyl phosphite, didecylmonophenyl phosphite, dioctylmonophenyl phosphite, diisopropylmonophenyl phosphite, monobutyldiphenyl phosphite, monodecyldiphenyl phosphite, monooctyldiphenyl phosphite, bis(2,6-di-tert-butyl-4-methylphenyl)pentaerythritol diphosphite, 2,2-methylenebis(4,6-di-tert-butylphenyl)octyl phosphite, bis(nonylphenyl)pentaerythritol diphosphite, bis(2,4-di-tert-butylphenyl)pentaerythritol diphosphite, distearylpentaerythritol diphosphite, tributyl phosphate, triethyl phosphate, trimethyl phosphate, triphenyl phosphate, diphenylmonoorthoxenyl phosphate, dibutyl phosphate, dioctyl phosphate, diisopropyl phosphate, tetrakis(2,4-di-tert-butylphenyl) 4,4'-biphenylenediphosphinate, dimethyl benzenephosphonate, diethyl benzenephosphonate, and dipropyl benzenephosphonate. These heat stabilizers may be used either alone or in combination of two or more thereof.

Such a heat stabilizer may be added to the reaction solution at the time of melt polymerization, or may be added to and kneaded with the resin by using an extruder. In the case of forming a film by the melt extrusion method, the above-described heat stabilizer or the like may be added in an extruder to form a film; or the above-described heat stabilizer or the like may be previously added in the resin by using an extruder and shaped in a pellet or the like, followed by providing for use.

In the case where the amount of the resin is defined as 100 parts by weight, a blending amount of such a heat stabilizer is preferably 0.0001 parts by weight or more, more preferably 0.0005 parts by weight or more, and still more preferably 0.001 parts by weight or more, and preferably 1 part by weight or less, more preferably 0.5 parts by weight or less, and still more preferably 0.2 parts by weight or less.

(Catalyst Deactivator)

When an acidic compound is added to the polycarbonate resin of the present invention in order to deactivate the catalyst used for the polymerization reaction through neutralization, the color tone or heat stability can be improved. As the acidic compound that is used as the catalyst deactivator, a compound having a carboxylic acid group, a phosphoric acid group, or a sulfonic acid group, or an ester thereof, and the like can be used. In particular, it is preferred to use a phosphorus-based compound containing a partial structure represented by the following formula (13) or (14).

(13)

(14)

Examples of the phosphorus-based compound represented by the foregoing formula (13) or (14) include phosphoric acid, phosphorous acid, phosphonic acid, hypophosphorous acid, polyphosphoric acid, a phosphonic acid ester, an acidic phosphoric acid ester, and the like. Among these, phosphorous acid, phosphonic acid, and a phosphonic acid ester are more excellent in an inhibition effect of catalyst deactivation or coloring, and phosphorous acid is especially preferred.

Examples of the phosphonic acid include phosphonic acid (phosphorous acid), methyl phosphonate, ethyl phosphonate, vinyl phosphonate, decyl phosphonate, phenyl phosphonate, benzyl phosphonate, aminomethyl phosphonate, methylenediphosphonic acid, 1-hydroxyethane-1,1-diphosphonic acid, 4-methoxyphenyl phosphonate, nitrilotris(methylenephosphonic acid), propylphosphonic acid anhydride, and the like.

Examples of the phosphonic acid ester include dimethyl phosphonate, diethyl phosphonate, bis(2-ethylhexyl) phosphonate, dilauryl phosphonate, dioleyl phosphonate, diphenyl phosphonate, dibenzyl phosphonate, dimethyl methylphosphonate, diphenyl methylphosphonate, diethyl ethylphosphonate, diethyl benzylphosphonate, dimethyl phenylphosphonate, diethyl phenylphosphonate, dipropyl phenylphosphonate, diethyl (methoxymethyl)phosphonate, diethyl vinylphosphonate, diethyl hydroxymethylphosphonate, dimethyl (2-hydroxyethyl)phosphonate, diethyl p-methylbenzylphosphonate, diethylphosphonoacetatic acid, ethyl diethylphosphonoacetate, tert-butyl diethylphosphonoacetate, diethyl (4-chlorobenzyl)phosphate, diethyl cyanophosphonate, diethyl cyanomethylphosphonate, diethyl 3,5-di-tert-butyl-4-hydroxybenzylphosphonate, diethylphosphonoacetaldehyde diethyl acetal, diethyl (methylthiomethyl)phosphonate, and the like.

Examples of the acidic phosphoric acid ester include phosphoric acid diesters, such as dimethyl phosphate, diethyl phosphate, divinyl phosphate, dipropyl phosphate, dibutyl phosphate, bis(butoxyethyl) phosphate, bis(2-ethylhexyl) phosphate, diisotridecyl phosphate, dioleyl phosphate, distearyl phosphate, diphenyl phosphate, dibenzyl phosphate, etc.; mixtures of a diester and a monoester; diethyl chlorophosphate, zinc stearyl phosphate salt, and the like.

These may be used alone or may be used as a mixture of an arbitrary combination of two or more thereof in an arbitrary ratio.

When the addition amount of the above-described phosphorus-based compound to the resin is too small, the inhibition effect of catalyst deactivation or coloring is insufficient, whereas when it is too large, the resin is rather colored, and in particular, in an endurance test at high temperature and high humidity, the resin is liable to be colored. As for the addition amount of the above-described phosphorus-based compound, the phosphorus-based compound is added in an amount corresponding to the amount of the catalyst used for the polymerization reaction. The addition amount of the above-described phosphorus-based compound is preferably 0.5 molar times or more and 5 molar times or less, more preferably 0.7 molar times or more and 4 molar times or less, and especially preferably 0.8 molar times or more and 3 molar times or less in terms of the amount of the phosphorus atom per mole of the metal used for the polymerization reaction.

(Ultraviolet Absorber and Light Stabilizer)

For the purpose of preventing the coloration or generation of a haze due to ultraviolet rays, each of the polycarbonate resins according to the first embodiment and the second embodiment of the present invention can be blended with an ultraviolet absorber or a light stabilizer.

Examples of the ultraviolet absorber include 2-(2'-hydroxy-5'-tert-octylphenyl)benzotriazole, 2-(3-tert-butyl-5-methyl-2-hydroxyphenyl)-5-chlorobenzotriazole, 2-(5-methyl-2-hydroxyphenyl)benzotriazole, 2-[2-hydroxy-3,5-bis(α,α-dimethylbenzyl)phenyl]-2H-benzotriazole, 2,2'-methylenebis(4-cumyl-6-benzotriazolephenyl), 2,2'-p-phenylenebis(1,3-benzoxazin-4-one), and the like.

Examples of the light stabilizer include hindered amine compounds having a radical scavenging action. Conventional aromatic polycarbonate resins are known to be unstable against a basic component, such as an alkali, etc., even at a normal temperature and also known to be hydrolyzed with an amine compound. However, in the polycarbonate resin of the present invention, the action of deterioration, such as hydrolysis, etc., is suppressed small, whereby the stability against light, such as ultraviolet rays, etc., can be tremendously improved.

Above all, those having a structure in which a nitrogen atom is a part of a cyclic structure are preferred, and those having a piperidine structure are more preferred. The piperidine structure as prescribed herein may be any structure in which a saturated 6-membered cyclic amine structure is taken and also includes those in which a part of the piperidine structure is substituted with a substituent.

As the substituent which the piperidine structure may include, an alkyl group having 4 or less carbon atoms is exemplified, and in particular, a methyl group is preferred. Furthermore, as the amine compound, a compound having plural piperidine structures is preferred. In the case of having plural piperidine structures, a compound in which those piperidine structures are connected with each other through an ester structure is preferred. A compound represented by the following formula (15) is preferred, and in particular, a compound represented by the following formula (15) in which $R^{20}$ and $R^{21}$ are a hydrogen atom or a methyl group, and n is 8 is preferred from the viewpoint of easiness of availability or compatibility with the polycarbonate resin.

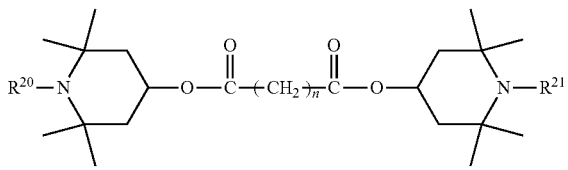

(15)

In the formula (15), $R^{20}$ and $R^{21}$ each independently represent a hydrogen atom, a substituted or unsubstituted alkyl group having 1 to 20 carbon atoms, or a substituted or unsubstituted cycloalkyl group having 6 to 20 carbon atoms; and n is an integer of 1 to 20.

Such an ultraviolet absorber or light stabilizer may be used either alone or in combination of two or more thereof; however, a synergistic effect can be expected through a combined use of the ultraviolet absorber and the light stabilizer.

A blending amount of the ultraviolet absorber or light stabilizer is preferably 0.001 parts by weight or more, and more preferably 0.005 parts by weight or more, and preferably 1 part by weight or less, and more preferably 0.5 parts by weight or less based on 100 parts by weight of the polycarbonate resin. When the blending amount is too large, the polycarbonate resin composition tends to be colored, and there is a concern that at the time of molding, the ultraviolet absorber or light stabilizer bleeds out, whereby staining of a molding machine or inferior appearance of a molded article is brought. On the other hand, when the blending amount is too small, there is a concern that a satisfactory improvement effect against a weather resistance test is not obtained.

(Release Agent)

For the purpose of more improving releasability from a die at the time of melt molding, each of the polycarbonate resins according to the first embodiment and the second embodiment of the present invention may be blended with a release agent. Examples of the release agent include a higher fatty acid, a higher fatty acid ester of a monohydric or polyhydric alcohol, a natural animal-based wax, such as beeswax, etc., a natural plant-based wax, such a carnauba wax, etc., a natural petroleum-based wax, such as paraffin wax, etc., a natural coal-based wax, such as montane wax, etc., an olefin-based wax, a silicone oil, an organosiloxane, and the like. Among these, a higher fatty acid and a higher fatty acid ester of a monohydric or polyhydric alcohol are especially preferred.

The higher fatty acid ester is preferably a partial ester or whole ester of a substituted or unsubstituted, monohydric or polyhydric acid having 1 to 20 carbon atoms with a substituted or unsubstituted, saturated fatty acid having 10 to 30 carbon atoms. Specifically, examples thereof include stearic acid monoglyceride, stearic acid diglyceride, stearic acid triglyceride, stearic acid monosorbitate, stearyl stearate, behenic acid monoglyceride, behenyl behenate, pentaerythritol monostearate, pentaerythritol tetrastearate, pentaerythritol tetrapelargonate, propylene glycol monostearate, palmityl palmitate, butyl stearate, methyl laurate, isopropyl palmitate, biphenyl biphenate, sorbitan monostearate, 2-ethylhexyl stearate, ethylene glycol distearate, and the like. Among these, stearic acid monoglyceride, stearic acid triglyceride, pentaerythritol tetrastearate, behenyl behenate, and ethylene glycol distearate are preferably used.

The higher fatty acid is preferably a substituted or unsubstituted, saturated fatty acid having 10 to 30 carbon atoms. Examples of such a saturated fatty acid include myristic acid, lauric acid, palmitic acid, stearic acid, behenic acid, and the like.

These release agents may be used either alone or in admixture of two or more thereof. A blending amount of the release agent is preferably 0.01 parts by weight or more, more preferably 0.05 parts by weight or more, and especially preferably 0.1 parts by weight or more, and preferably 1 part by weight or less, more preferably 0.7 parts by weight or less, and especially preferably 0.5 parts by weight or less based on 100 parts by weight of the polycarbonate resin.

(Dye or Pigment)

Each of the polycarbonate resins according to the first embodiment and the second embodiment of the present invention can be blended with a bluing agent in order to deny yellowness based on the polymer, the ultraviolet absorber, or the like. Though the bluing agent is not particularly limited so long as it is one used for current polycarbonate resins, it is preferably an anthraquinone-based dye. Specifically, examples thereof include Solvent Violet 13 [CA. No. (Color Index No.) 60725], Solvent Violet 31 (CA. No. 68210), Solvent Violet 33 (CA. No. 60725), Solvent Blue 94 (CA. No. 61500), Solvent Violet 36 (CA. No. 68210), Solvent Blue 97 ("MACROLEX Violet RR", manufactured by Bayer AG), Solvent Blue 45 (CA. No. 61110), and the like.

These bluing agents may be used either alone or in combination of two or more thereof.

A blending amount of the bluing agent is typically $1\times10^{-5}$ parts by weight or more, and preferably $5\times10^{-5}$ parts by weight or more, and typically $1\times10^{-3}$ parts by weight or less, and preferably $5\times10^{-4}$ parts by weight or less based on 100 parts by weight of the polycarbonate resin.

(Polymer Alloy)

For the purpose of modifying properties, such as mechanical properties, solvent resistance, etc., the polycarbonate resin of the present invention may be converted into a polymer alloy upon being kneaded with one or two or more synthetic resins or rubbers, such as an aromatic polycarbonate, an aromatic polyester, an aliphatic polyester, a polyamide, a polystyrene, a polyolefin, an acryl, an amorphous polyolefin, ABS, AS, polylactic acid, polybutylene succinate, etc., or the like.

The polymer alloy can be produced by mixing the above-described additive or modifier at the same time or in an arbitrary order of mixing the resin used in the present invention with the above-described components by using a mixing machine, such as a tumbler, a V-type blender, a Nauta mixer, a Banbury mixer, a kneading roll, an extruder, etc. Above all, from the viewpoint of improving the dispersibility, it is preferred to undergo the kneading by an extruder, particularly a twin-screw extruder.

[Application of Polycarbonate Resin of the Present Invention]

Each of the polycarbonate resins according to the first embodiment and the second embodiment of the present invention as obtained above is excellent in heat resistance, moist heat resistance, and weather resistance and small in a birefringence or photoelastic coefficient, and also has high transparency, and therefore, it can be used for a transparent glass substitute application, or an optical film, an optical disk, an optical prism, a pickup lens, and so on.

In addition, the polycarbonate resin of the present invention is also excellent in melt processability, and therefore, it can be formed into a molded article by a usually known method, such as an injection molding method, an extrusion molding method, a compression molding method, etc. In particular, a production method of a retardation film which can be suitably used is hereunder described in detail.

The third embodiment of the present invention is aimed especially at use for a retardation film.

[Production Method of Retardation Film]

(Production Method of Unstretched Film)

As a method of subjecting an unstretched film to film formation by using the polycarbonate resin of the present invention, a casting method of dissolving the resin in a solvent and casting the solution, followed by removing the solvent; and a melt film formation method of melting the resin without using a solvent and subjecting the molten resin to film formation can be adopted. Specifically, examples of the melt film formation method include a melt extrusion method using a T-die, a calendar molding method, a heat press method, a co-extrusion method, a co-melting method, a multi-layer extrusion method, an inflation molding method, and the like. Though the film formation method of an unstretched film is not particularly limited, according to the casting method, there is a concern that a problem by the residual solvent is caused. Therefore, a melt film formation method, especially a melt extrusion method using a T-die is preferred from the standpoint of easiness of a subsequent stretching treatment.

In the case of molding an unstretched film by the melt film formation method, a molding temperature is preferably set to 280° C. or lower, more preferably set to 270° C. or lower, and especially preferably set to 265° C. or lower. When the molding temperature is too high, there is a possibility that a fault to be caused due to a foreign matter or generation of air bubbles in the resulting film increases, or the film is colored.

However, when the molding temperature is too low, the melt viscosity of the resin becomes too high, and it becomes difficult to mold a raw film, so that there is a possibility that it is difficult to produce an unstretched film having a uniform thickness. Thus, a lower limit of the molding temperature is typically 200° C. or higher, preferably 210° C. or higher, and more preferably 220° C. or higher. Here, the molding temperature of the unstretched film refers to a temperature at the time of molding in the melt film formation method and is generally a value obtained by measuring the resin temperature at a die outlet for extruding the molten resin.

In addition, when a foreign matter is present in the film, in the case where the film is used as a polarizing plate, the foreign matter is recognized as a defect, such as light escaping, etc. In order to remove the foreign matter in the resin, a method in which a polymer filter is installed after the above-described extruder, and the resin is filtered and then extruded from a die to mold a film is preferred. On that occasion, it is required that the extruder, the polymer filter, and the die are connected with each other via a pipe to transfer the molten resin. In order to suppress the heat deterioration within the pipe as far as possible, it is important to arrange the respective equipment such that the residence time becomes shortest. In addition, it is required to pay the best attention in such a manner that a step of conveyance or winding-up of the film after extrusion is performed within a clean room, whereby a foreign matter is not attached to the film.

A thickness of the unstretched film is determined in conformity with a design of the thickness of the retardation film after stretching, or stretching conditions, such as stretch ratio, etc. When the thickness is too thick, a thickness unevenness is liable to be generated, whereas when it is too thin, there is a possibility that breakage is brought at the time of conveyance or at the time of stretching. Therefore, the thickness of the unstretched film is typically 30 μm or more, preferably 40 μm or more, and more preferably 50 μm or more, and typically 200 μm or less, preferably 160 μm or less, and more preferably 120 μm or less.

In addition, when a thickness unevenness is present in the unstretched film, a retardation unevenness of the retardation film is brought. Therefore, the thickness of a portion to be used as the retardation film is preferably [(preset thickness) ±3 μm] or less, more preferably [(preset thickness)±2 μm] or less, and especially preferably [(preset thickness)±1 μm] or less.

A thickness of the unreacted film in the longitudinal direction is preferably 500 m or more, more preferably 1,000 m or more, and especially preferably 1,500 m or more. From the viewpoint of productivity or quality, on producing the retardation film of the present invention, it is preferred to perform the stretching in a continuous manner; however, in general, it is required to regulate the conditions so as to make the length of the unstretched film in conformity with a predetermined retardation at the time of starting the stretching. When the length of the film is too short, the amount of products capable of be acquired after regulating the conditions decreases.

In the present specification, the term "lengthiness" means that the dimension of the film in the longitudinal direction is sufficiently larger than that in the width direction and means a degree at which the film can be substantially wound up in a coil form in the longitudinal direction. More specifically, the dimension of the film in the longitudinal direction is larger by 10 times or more than the dimension in the width direction.

An internal haze of the thus obtained unstretched film is preferably 3% or less, more preferably 2% or less, and especially preferably 1% or less. When the internal haze of the unstretched film is larger than the above-described upper limit value, scattering of light occurs, and for example, on laminating with a polarizer, there is a case where the generation of polarization cancellation is caused. Though a lower limit value of the internal haze is not particularly set, it is typically 0.1% or more.

On measuring the internal haze, a sample in a state that a pressure sensitive adhesive-provided transparent film whose haze has been measured in advance is stuck onto the both surfaces of the unstretched film to remove any influence of an external haze is used, and a value obtained by subtracting the haze value of the pressure sensitive adhesive-provided transparent film from the measured value of the above-described sample is defined as a value of the internal haze.

A b* value of the unstretched film is preferably 3 or less. When the b* value of the film is too large, a problem, such as coloration, etc., is caused. The b* value is more preferably 2 or less, and especially preferably 1 or less. The b* value is measured by using a spectrophotometer CM-2600d, manufactured by Konica Minolta, Inc.

Regardless of the thickness of the unstretched film, a total light transmittance of the film per se is preferably 80% or more, more preferably 85% or more, and especially preferably 90% or more. When the transmittance is the above-described lower limit value or more, a film with less coloration is obtained, and on sticking to a polarizing plate, a circularly polarizing plate with a high degree of polarization or transmittance is formed, whereby on using for an image display device, it becomes possible to realize a high display grade. Though an upper limit of the total light transmittance of the film of the present invention is not particularly limited, it is typically 99% or less.

(Production Method of Retardation Film)

By subjecting the above-described unstretched film to stretch orientation, a retardation film can be obtained. As a stretching method, in order that the unstretched film may be stretched in at least one direction, a known method, such as longitudinal uniaxial stretching, or transverse uniaxial stretching using a tenter or the like, or simultaneous biaxial stretching or sequential biaxial stretching composed of a combination thereof, etc., can be adopted. Though the stretching may be performed in a batch mode, it is preferably performed in a continuous mode from the standpoint of productivity. Furthermore, as compared with the batch mode, according to the continuous mode, a retardation film with a less scattering of retardation in a film plane is obtained.

A stretching temperature is in a rage of (Tg−20° C.) to (Tg+30° C.), preferably of (Tg−10° C.) to (Tg+20° C.), and more preferably (Tg−5° C.) to (Tg+15° C.) relative to a glass transition temperature (Tg) of the resin to be used as a raw material.

Though a stretch ratio is determined by a targeted retardation value, it is preferably 1.2 times to 4 times, more preferably 1.5 times to 3.5 times, and still more preferably 2 times to 3 times lengthwise and widthwise. When the stretch ratio is too small, an effective range where the desired degree of orientation and orientation angle are obtained becomes narrow. On the other hand, when the stretch ratio is too large, there is a concern that the film is broken, or wrinkles are generated during stretching.

Though a stretching rate is properly selected according to the object, it can be selected such that a strain rate expressed by the following numerical formula is typically 50% to 2,000%, preferably 100% to 1,500%, more preferably 200% to 1,000%, and especially preferably 250% to 500%.

When the stretching rate is excessively large, there is a possibility that breakage is brought at the time of stretching, or a fluctuation of optical properties to be caused due to long-term use under high temperature conditions becomes large. In addition, when the stretching rate is excessively small, there is a case where not only the productivity is lowered, but also in order to obtain a desired retardation, the stretch ratio must be made excessively large.

Strain rate (%/min)=[{Stretching rate (mm/min)}/{Length of raw film (mm)}]×100

After stretching the film, as the need arises, a heat fixing treatment with a heating furnace may be performed, or a relaxation step may be performed by controlling a width of the tenter or regulating a roll peripheral velocity. The heat fixing treatment is performed at a temperature in a range of 60° C. to (Tg), and preferably 70° C. to (Tg−5° C.) relative to a glass transition temperature (Tg) of the resin to be used for the unstretched film. When the heat treatment temperature is too high, there is a possibility that the orientation of a molecule obtained by stretching is disordered, so that the retardation is largely lowered from the desired value.

In addition, in the case of providing a relaxation step, a stress generated in the stretched film can be removed by shrinking the film in a ratio of 95% to 99% relative to the width of the film expanded by stretching. On that occasion, a treatment temperature to be applied in the film is identical with the heat fixing treatment temperature. By performing the above-described heat fixation treatment or relaxation step, a fluctuation of optical properties to be caused due to long-term use under high temperature conditions can be inhibited.

The retardation film of the present invention can be prepared by properly selecting and regulating the treatment conditions in such a stretching step.

In the retardation film of the present invention, an in-plane birefringence (Δn) at a wavelength of 550 nm is preferably 0.001 or more, more preferably 0.002 or more, and especially preferably 0.0025 or more. Since the retardation is in proportion to the thickness (d) and the birefringence (Δn) of the film, by allowing the birefringence to fall within the above-described specified range, it becomes possible to reveal the retardation as designed in terms of a thin film, and a film adaptable to a thin-type instrument can be readily prepared.

In order to reveal a high birefringence, the degree of orientation of a polymer molecule must be increased by, for example, lowering the stretching temperature or increasing the stretch ratio, etc. However, since the film is liable to be broken under such stretching conditions, the resin to be used is more advantageous as its toughness becomes more excellent.

Though the thickness of the retardation film of the present invention varies with a designed value of the retardation, it is preferably 70 μm or less. In addition, the thickness of the retardation film is more preferably 60 μm or less, still more preferably 55 μm or less, and especially preferably 50 μm or less.

On the other hand, when the thickness is excessively thin, it becomes difficult to deal with the film, and wrinkles are generated, or breakage occurs during the production. Therefore, a lower limit of the thickness of the retardation film of the present invention is preferably 10 μm or more, and more preferably 15 μm or more.

In each of the retardation films according to the first embodiment and the second embodiment of the present invention, a value of wavelength dispersion (R450/R550) that is a ratio of a retardation (R450) measured at a wavelength of 450 nm to a retardation (R550) measured at a wavelength of 550 nm is preferably 0.5 or more and 1.03 or less. In addition, the above-described value of wavelength dispersion is more preferably 0.7 or more and 1.01 or less, still more preferably 0.75 or more and 1.00 or less, and especially preferably 0.8 or more and 0.98 or less.

When the above-described value of wavelength dispersion falls within this range, ideal retardation properties can be obtained within a wide wavelength range of the visible region. For example, by preparing a retardation film having such wavelength dependence as a quarter-wave plate and sticking it to a polarizing plate, a circularly polarizing plate or the like can be prepared, and it is possible to realize a polarizing plate and a display device with less wavelength dependence of hue. On the other hand, in the case where the above-described ratio falls outside this range, the wavelength dependence of hue becomes large, and optical compensation is not achieved at all wavelengths in the visible region, resulting in problems, such as coloration or lowering of contrast to be caused due to the matter that the light passes through the polarizing plate or display device, etc.

In the retardation film according to the third embodiment of the present invention, a value of wavelength dispersion (R450/R550) that is a ratio of a retardation (R450) measured at a wavelength of 450 nm to a retardation (R550) measured at a wavelength of 550 nm is 0.50 or more and 1.03 or less.

In an application in which flat wavelength dispersibility is suitably used, the value of wavelength dispersion (R450/R550) is more preferably 0.98 or more and 1.02 or less. In addition, in the case where the retardation film according to the third embodiment of the present invention is used for a quarter-wave plate, the value of wavelength dispersion (R450/R550) is more preferably 0.70 or more and 0.96 or less, still more preferably 0.75 or more and 0.94 or less, and especially preferably 0.78 or more and 0.92 or less.

So long as the above-described value of wavelength dispersion falls within this range, ideal retardation properties can be obtained within a wide wavelength range of the visible region. For example, by preparing a retardation film having such wavelength dependence as a quarter-wave plate and sticking it to a polarizing plate, a circularly polarizing plate or the like can be prepared, and it is possible to realize a polarizing plate and a display device with less wavelength dependence of hue. On the other hand, in the case where the above-described ratio falls outside this range, the wavelength dependence of hue becomes large, and optical compensation is not achieved at all wavelengths in the visible region, resulting in problems, such as coloration or lowering of contrast to be caused due to the matter that the light passes through the polarizing plate or display device, etc.

In each of the retardation films according to the first embodiment and the second embodiment of the present invention, a water absorption in a measurement method as described later is preferably 3.0% by weight or less, and more preferably 2.5% by weight or less. When the water absorption is more than 3.0% by weight, the durability of optical properties under a humidity environment tends to become worse, and hence, such is not preferred. On the other hand, a lower limit of the water absorption is preferably 0.5% by weight or more.

In view of the fact that the retardation film has hydrophilicity or polarity to some extent, on sticking this film to other film or the like, there is a tendency that adhesiveness can be readily secured. For example, on sticking to a polarizing plate, since the film is hydrophilic, a contact angle of water is low, an adhesive is readily freely designed, and a high adhesive design can be made. In the case where the water absorption is less than 0.5% by weight, the film becomes hydrophobic, a contact angle of water is high, and the design of adhesiveness becomes difficult. In addition, the film is liable to be charged with electrification, and on incorporation into a circularly polarizing plate or an image display device, a problem of an increase of inferior appearance by entrainment of a foreign matter, etc. is liable to be generated.

In the retardation films according to the third embodiment of the present invention, a water absorption in a measurement method as described later is preferably 3.5% by weight or less, and more preferably 3.0 by weight or less. When the water absorption is more than 3.5% by weight, the durability of optical properties under a humidity environment tends to become worse, and hence, such is not preferred. On the other hand, a lower limit of the water absorption is preferably 0.5% by weight or more.

In view of the fact that the retardation film has hydrophilicity or polarity to some extent, on sticking this film to other film or the like, there is a tendency that adhesiveness can be readily secured. For example, on sticking to a polarizing plate, since the film is hydrophilic, a contact angle of water is low, an adhesive is readily freely designed, and a high adhesive design can be made. In the case where the water absorption is less than 0.5% by weight, the film becomes hydrophobic, a contact angle of water is high, and the design of adhesiveness becomes difficult. In addition, the film is liable to be charged with electrification, and on incorporation into a circularly polarizing plate or an image display device, a problem of an increase of inferior appearance by entrainment of a foreign matter, etc. is liable to be generated.

When the above-described retardation film is laminated on and stuck to a known polarizing film and then cut into desired dimensions, a circularly polarizing plate is formed. Such a circularly polarizing plate can be used for compensation for viewing angle of various displays (e.g., a liquid display device, an organic EL display device, a plasma display device, a field emission display (FED) device, and a surface electric field display (SED) device), prevention of reflection of external light, color compensation, conversion of linear polarized light into circularly polarized light, and so on.

EXAMPLES

Although the present invention is hereunder described in more detail by reference to the Examples and Comparative Examples, it should be construed that the present invention is by no means limited by the following Examples so long as the gist thereof is not deviated.

Properties of resins, molded articles, and retardation films of the present invention were evaluated by the following methods. The methods for property evaluation are not limited to the following methods, and suitable methods can be selected by a person skilled in the art.

<Examples According to the First Embodiment and the Second Embodiment of the Present Invention>
(1) Reduced Viscosity of Polycarbonate Resin:

A polycarbonate resin was dissolved in methylene chloride to prepare a resin solution having a concentration of 0.6 g/L. The measurement was performed at a temperature of 20.0° C.±0.1° C. by using an Ubbelohde viscometer, manufactured by Moritomo Rika Kogyo Co., Ltd., and a flow-through time $t_0$ of the solvent and a flow-through time t of the solution were measured. Using the obtained $t_0$ and t values, a relative viscosity $\eta_{rel}$ was determined according to the following formula (i), and furthermore, using the obtained relative viscosity $\eta_{rel}$, a specific viscosity $\eta_{sp}$ was determined according to the following formula (ii).

$$\eta_{rel}=t/t_0 \quad (i)$$

$$\eta_{sp}=(\eta-\eta_0)/\eta_0=\eta_{rel}-1 \quad (ii)$$

Thereafter, the obtained specific viscosity $\eta_{sp}$ was divided by a concentration c [g/dL], thereby determining a reduced viscosity $\eta_{sp}/c$. The higher this value, the larger the molecular weight is.

(2) Melt Viscosity of Polycarbonate Resin:

A polycarbonate resin in a pellet form was dried in vacuo at 90° C. for 5 hours or more. Using the dried pellets, the measurement was performed with a capillary rheometer, manufactured by Toyo Seiki Seisaku-Sho, Ltd. A measurement temperature was set to 240° C., a melt viscosity was measured at a shear rate ranging from 9.12 to 1,824 $sec^{-1}$, and a value of the melt viscosity at 91.2 $sec^{-1}$ was used. An orifice having a die diameter of 41 mm×10 mmL was used.

(3) Glass Transition Temperature (Tg) of Polycarbonate Resin:

A glass transition temperature of a polycarbonate resin was measured by using a differential scanning calorimeter DSC6220, manufactured by SII Technology Inc. About 10 mg of a resin was charged in an aluminum pan made by the same company and hermetically sealed, and the temperature was then elevated from 30° C. to 250° C. at a temperature elevation rate of 20° C./min in a nitrogen gas stream of 50 mL/min. After holding the temperature for 3 minutes, the resultant was cooled to 30° C. at a rate of 20° C./min. After holding at 30° C. for 3 minutes, the temperature was again elevated to 200° C. at a rate of 20° C./min. From the DSC data obtained by the second temperature elevation, an extrapolated starting temperature of glass transition that is a temperature of the point of intersection of a straight line of the base line on the low temperature side extending to the high temperature side with a tangent line drawn at a point where a gradient of a curve of stepwise change part of glass transition becomes maximum was determined and defined as a glass transition temperature.

(4) Measurement of Contents of Monohydroxy Compound and Carbonic Diester in Polycarbonate Resin and Dihydroxy Compound Represented by the Foregoing Formula (6):

About 1 g of a polycarbonate resin sample was precisely weighed and dissolved in 5 mL of methylene chloride to prepare a solution, to which was then added acetone such that a total amount was 25 mL, thereby performing a reprecipitation treatment. Subsequently, the treatment liquid was measured by means of liquid chromatography.

Apparatuses and conditions used are as follows.
Apparatus: Manufactured by Shimadzu Corporation
   System controller: CBM-20A
   Pump: LC-10AD
   Column oven: CTO-10ASvp
   Detector: SPD-M20A Analysis column: Cadenza CD-18 4.6 mmφ×250 mm
Oven temperature: 60° C.
Detection wavelength: 220 nm
Eluent: A liquid: 0.1% phosphorus acid aqueous solution, B liquid: acetonitrile
Gradient from A/B=50/50 (vol %) to A/B=0/100 (vol %) for 10 minutes, and
holding at A/B=0/100 (vol %) for 5 minutes
Flow rate: 1 mL/min
Injection amount of sample: 10 µL As for the content of each of the compounds in the resin, solutions in which a concentration of the respective compound was changed were prepared and measured under the same conditions as in the above-described liquid chromatography to prepare a calibration curve, and the content was calculated by the absolute calibration curve method.

(5) Molding of Plate:

Pellets of a polycarbonate resin were dried in vacuo at 90° C. for 5 hours. The dried polycarbonate resin pellets were fed into an injection molding machine J75EII Model, manufactured by The Japan Steel Works, Ltd., a temperature of a final cylinder was regulated between 230 to 280° C. according to the Tg or melt viscosity of the polycarbonate resin, and an operation of molding a plate-type injection molded piece (60 mm in width×60 mm in length×3 mm in thickness) under a condition in a molding cycle of 38 seconds was repeated, thereby obtaining a plate molded article.

(6) Pencil Hardness:

The above-described plate molded article was used and measured for a pencil hardness by using a pencil scratch coating hardness tester, manufactured by Toyo Seiki Seisaku-Sho, Ltd. by the method described in JIS K 5600-5-4.

(7) Weather Resistance Test:

The above-described plate molded article was used and treated for 100 hours by using an Atlas weather-o-meter Ci4000 (xenon-arc weather-o-meter), manufactured by Toyo Seiki Seisaku-Sho, Ltd. under conditions at an irradiation intensity of 60 W/m² and at a black panel temperature of 65° C. in a rainfall cycle of (rainfall: 12 minutes)/(no rainfall: 48 minutes).

A color tone of the plate before and after the irradiation was measured by using a spectrophotometer CM-5, manufactured by Konica Minolta, Inc. in conformity with ASTM D1925. The plate was placed in a measurement chamber and measured for a YI (yellowness index) value of the transmitted light. It is indicated that as a difference (ΔYI) between YI after the irradiation treatment and YI before the treatment is smaller, the coloration due to the irradiation with UV is less, and the weather resistance is more excellent.

(8) Boiling Water Immersion Test (Moist Heat Resistance Test):

The above-described plate molded article was immersed in boiling water and treated for 3 hours, thereby observing the presence or absence of any change in shape, whitening, or cracking of the molded article.

(9) Molding of Film:

Pellets of a resin having been dried in vacuo at 90° C. for 5 hours were extruded from a T-die (width: 200 mm, preset temperature: 200 to 270° C.) by using a single-screw extruder, manufactured by Isuzu Kakoki Co., Ltd. (screw diameter: 25 mm, cylinder preset temperature: 220° C. to 270° C.). The extruded film was wound up in a roll shape with cooling by chill rolls (preset temperature: 120° C. to 170° C.), thereby preparing an unstretched film.

(10) Measurement of Water Absorption:

A film having a thickness of 100 to 300 µm was molded by the above-described method and then cut out in a regular square having a length of 100 mm and a width of 100 mm, thereby preparing a sample. This sample was used and measured in conformity with the "Testing methods for water and boiling water absorption of plastics" as described in JIS K 7209.

(11) Measurement of Photoelastic Coefficient:

The measurement was performed by using a combined apparatus of a birefringence measuring apparatus composed of a He—Ne laser, a polarizer, a compensator, an analyzer, and a photodetector with a vibration type viscoelasticity measuring apparatus (DVE-3, manufactured by Rheology Co., Ltd.). (For details, refer to *Journal of the Society of Rheology Japan*, Vol. 19, pp. 93-97 (1991).)

A sample having a width of 5 mm and a length of 20 mm was cut out from the above-described unstretched film and fixed in the viscoelasticity measuring apparatus, and a storage elastic modulus E' at room temperature of 25° C. was measured at a frequency of 96 Hz. Simultaneously, the outgoing laser light was passed through the polarizer, the sample, the compensator, and the analyzer in this order, picked up by the photodetector (photodiode), and then passed through a lock-in amplifier, and with respect to a waveform at an angular frequency ω or 2ω, a retardation relative to its amplitude and strain was determined, and a strain-optical coefficient O' was determined. At that time, the polarizer and the analyzer were regulated in such a manner that the directions thereof were perpendicular to each other and each formed an angle of π/4 with the direction of extension of the sample. The photoelastic coefficient C was determined from the storage elastic coefficient E' and the strain-optical coefficient O' according to the following formula.

$$C = O'/E'$$

(12) Measurement of Birefringence (Δn) and Wavelength Dispersion (R450/R550):

A film piece having a width of 50 mm and a length of 125 mm was cut out from the above-described unstretched film. The above-described film piece was subjected to free-end uniaxial stretching at a stretching temperature of (glass transition temperature of the resin+15° C.) and at a stretching rate of 300%/min in a stretch ratio of 1.5 times by using a batch-type twin-screw stretching apparatus (twin-screw stretching machine BIX-277-AL, manufactured by Island Kogyo Co., Ltd.), thereby obtaining a retardation film.

A central part of the stretched film obtained by the above-described method was cut out in a size of 4 cm in width and 4 cm in length and measured for retardations at a measuring wavelength of 450, 500, 550, 590, and 630 nm, respectively by using a retardation measuring apparatus KOBRA-WPR, manufactured by Oji Scientific Instruments Co., Ltd., thereby measuring wavelength dispersibility. The wavelength dispersibility was expressed by a ratio (R450/R550) of the retardations R450 and R550 measured at 450 nm and 550 nm, respectively. When the R450/R550 is larger than 1, the wavelength dispersion is positive, whereas when it is less than 1, the wavelength dispersion becomes reverse wavelength dispersion. In the case of using the stretched film as a quarter-wave plate, an ideal value of R450/R550 is 0.818 (R450/R550=0.818).

In addition, a birefringence Δn was determined from the retardation R550 at 550 nm and the thickness of the stretched film according to the following formula.

$$\text{Birefringence} = R550 \,[\text{nm}] / \{(\text{Film thickness }[\text{mm}]) \times 10^6\}$$

In the measurement of this time, when the Δn has a positive value, it is possible to use the stretched film as a retardation film.

[Determination Criteria]

In the evaluation of physical properties for injection molded article, one satisfying all of the following items was determined to be acceptable.

Glass transition temperature: 125° C. or higher
Weather resistance test ΔYI: 1 or less
Boiling water immersion test: Not changed
Photoelastic coefficient: 30 or less
Δn: 0.0050 or less In the evaluation of physical properties for application of retardation film, one satisfying all of the following items was determined to be acceptable.

Glass transition temperature: 160° C. or higher
Wavelength dispersion (R450/R550): 0.98 to 1.02, or 0.75 to 0.90
Water absorption: 3% or less
Photoelastic coefficient: 30 or less
Δn: 0.0010 or more Synthesis Examples of Monomer Synthesis Example 1

Synthesis of 6,6'-dihydroxy-3,3,3',3'-tetramethyl-1,1'-spirobiindane (SBI)

The compound was synthesized by the method described in JP-A-2014-114281.

Synthesis Example 2

Synthesis of bis(fluoren-9-yl)methane (Compound 1)

In a one-liter four-necked flask, fluorene (120 g, 722 mmol) and N,N-dimethylformamide (480 mL) were charged, and after purging with nitrogen, the contents were cooled to 5° C. or lower. Sodium ethoxide (24.6 g, 361 mmol) was added, p-formaldehyde (8.7 g, 289 mmol) was added little by little such that the temperature did not exceed 10° C., and the contents were stirred. After two hours, 1N hydrochloric acid (440 mL) was added dropwise to terminate the reaction. The resulting suspension solution was subjected to suction filtration and washed with desalted water (240 mL) by sprinkling. Thereafter, the resulting crude product was dispersed in desalted water (240 mL) and stirred for one hour. This suspension liquid was subjected to suction filtration and then washed with desalted water (120 mL) by sprinkling. The resulting crude product was dispersed in toluene (480 mL) and then dehydrated under heat refluxing conditions by using a Dean-Stark apparatus. After returning to room temperature (20° C.), the resultant was subjected to suction filtration and then dried under reduced pressure at 80° C. until it became a constant weight, thereby obtaining 84.0 g of bis(fluoren-9-yl)methane (Compound 1) (yield: 84.5%, HPLC purity: 94.0%) as a white solid. A chemical shift of Compound 1 in the $^1$H-NMR spectrum was as follows.

$^1$H-NMR (400 MHz, CDCl$_3$) δ7.83 (d, J=7.6 Hz, 4H), 7.56 (dd, J1=7.6 Hz, J2=0.8 Hz, 4H), 7.41 (t, J=7.3 Hz, 4H), 7.29 (dt, J1=7.3 Hz, J2=1.3 Hz, 4H), 4.42 (t, J=7.6 Hz, 2H), 2.24 (d, J=7.6 Hz, 2H).

Synthesis Example 3

Synthesis of bis[9-(2-ethoxycarbonylethyl)fluoren-9-yl]methane (Compound 2)

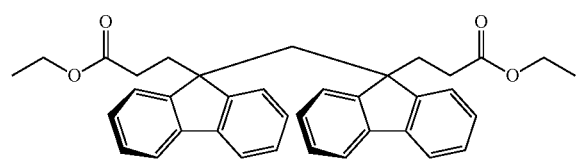

In a one-liter three-necked flask, the above obtained bis(fluoren-9-yl)methane (Compound 1, 80 g, 232.3 mmol), N-benzyl-N,N,N-triethylammonium chloride (10.6 g, 46.5 mmol), and methylene chloride (400 mL) were charged. After purging with nitrogen, the contents were controlled to 15° C. to 20° C. by a water bath, and a 50% sodium hydroxide aqueous solution (64 mL) was added. As a result, a color of the solution was changed to pale red. Thereafter, ethyl acrylate (50.5 mL, 465 mmol) was added dropwise over 5 minutes. After one hour, ethyl acrylate (25.3 mL, 232 mL) was further added, and the contents were stirred for 9 hours with following the progress of the reaction by means of HPLC. After a mono-adduct was confirmed to become 5% or less by means of HPLC, the resultant was cooled by an ice bath, and 3N hydrochloric acid (293 mL) was added dropwise in conformity with the temperature, thereby undergoing quenching. After an organic layer was washed with water until the liquid property became neutral, the organic layer was dried over anhydrous magnesium sulfate and filtered, and the solvent was then distilled off under reduced pressure. The resulting crude product was dispersed in methanol (400 mL) and heat refluxed for 30 minutes, thereby undergoing washing in thermal suspension. Thereafter, the temperature was returned to room temperature (20° C.), and the resultant was subjected to suction filtration and then dried under reduced pressure at 80° C. until it became a constant weight, thereby obtaining 96.1 g of bis[9-(2-ethoxycarbonylethyl)fluoren-9-yl]methane (Compound 2) (yield: 75.9%, HPLC purity: 96.0%) as a white solid. A chemical shift of Compound 2 in the $^1$H-NMR spectrum was as follows.

$^1$H-NMR (400 MHz, CDCl$_3$) δ7.03 (d, J=7.6 Hz, 4H), 6.97 (dt, J1=7.6 Hz, J2=1.5 Hz, 4H), 6.82 (dt, J1=7.6 Hz, J2=1.3 Hz, 4H), 6.77 (d, J=7.6 Hz, 4H), 3.88 (q, J=7.1 Hz, 4H), 3.12 (s, 2H), 2.23 (m, 4H), 1.13 (m, 4H), 1.02 (t, J=7.1 Hz, 6H).

Synthesis Example 4

Synthesis of bis[9-(2-phenoxycarbonylethyl)fluoren-9-yl]methane (Compound 3)

In a one-liter four-necked flask, the above obtained bis[9-(2-ethoxycarbonylethyl)fluoren-9-yl]methane (Compound 2, 50.0 g, 91.80 mmol), diphenyl carbonate (98.3 g, 459 mmol), and tetraisopropyl orthotitanate (1.3 mL, 4.59 mmol) were charged, a degree of reduced pressure was regulated to 3 kPa, and the contents were stirred at a temperature in the range of 145° C. to 150° C. for 6 hours with distilling off a by-product. The resultant was cooled to 90° C., and after confirming completion of the reaction by means of HPLC, toluene (100 mL) was added, followed by cooling to 50° C. Methanol (250 mL) was added thereto, and the contents were cooled to 5° C. and then subjected to suction filtration. The resulting white solid was dispersed in toluene (100 mL) and heat refluxed for 30 minutes. After cooling to 50° C., methanol (200 mL) was added. After cooling to room temperature (20° C.), the resultant was subjected to suction filtration and then dried under reduced pressure at 100° C. until it became a constant weight, thereby obtaining 50 g of bis[9-(2-phenoxycarbonylethyl)fluoren-9-yl]methane (Compound 3) (yield: 85%, HPLC purity: 98.1%) as a white solid. A chemical shift of Compound 3 in the $^1$H-NMR spectrum was as follows.

$^1$H-NMR (400 MHz, CDCl$_3$) δ7.23 to 7.28 (m, 4H), 7.07 to 7.16 (m, 6H), 7.03 (dt, J1=6.9 Hz, J2=2.0, 4H), 6.78 to 6.90 (m, 12H), 3.20 (s, 2H), 2.37 (t, J=8.3 Hz, 4H), 1.40 (t, J=8.3 Hz, 4H)

Synthesis Examples of Resin and Property Evaluations

Abbreviations and so on of compounds used in the following Examples and Comparative Examples are as follows.

SBI: 6,6'-Dihydroxy-3,3,3',3'-tetramethyl-1,1'-spirobiindane
ISB: Isosorbide (a trade name: POLYSORB, manufactured by Roquette Freres)
CHDM: 1,4-Cyclohexane dimethanol (a mixture of cis and trans isomers, manufactured by SK Chemicals Ltd.)
TCDDM: Tricyclodecane dimethanol (manufactured by Oxea Corporation)
SPG: Spiroglycol (manufactured by Mitsubishi Gas Chemical Company, Ltd.)
BPA: 2,2-Bis[4-hydroxyphenyl]propane (manufactured by Mitsubishi Chemical Corporation)
BHEPF: 9,9-Bis[4-(2-hydroxyethoxy)phenyl]-fluorene (manufactured by Osaka Gas Chemicals Co., Ltd.)
Compound 3: Bis[9-(2-phenoxycarbonylethyl)fluoren-9-yl]methane
DPC: Diphenyl carbonate (manufactured by Mitsubishi Chemical Corporation)

The term "mol %" in the tables of the Examples indicates "mol %" of the dihydroxy compound in all dihydroxy compounds or the diester compound in all diester compounds.

In addition, the term "% by weight" indicates "% by weight" of the structural unit derived from the compound when a total amount in weight of all of the structural units and connecting groups constituting the polycarbonate resin is defined as 100% by weight.

Example 1-1

18.45 parts by weight (0.060 mol) of SBI, 42.45 parts by weight (0.290 mol) of ISB, 25.42 parts by weight (0.176 mol) of CHDM, 115.05 parts by weight (0.537 mol) of DPC, and $1.86 \times 10^{-3}$ parts by weight ($1.05 \times 10^{-5}$ mol) of calcium acetate monohydrate as a catalyst were charged in a reactor, and the inside of the reaction apparatus was purged with nitrogen under reduced pressure. The raw materials were dissolved with stirring in a nitrogen atmosphere at 150° C. for about 10 minutes. As a step of the first stage of the reaction, the temperature was elevated to 220° C. over 30 minutes, and the contents were allowed to react with each other at atmospheric pressure for 60 minutes. Subsequently, the pressure was reduced from the atmospheric pressure to 13.3 kPa over 90 minutes and held at 13.3 kPa for 30 minutes, and phenol generated was discharged out the reaction system. Subsequently, as a step of the second stage of the reaction, the pressure was reduced to 0.10 kPa or less over 15 minutes while elevating the catalyst temperature to 240° C. over 15 minutes, and phenol generated was discharged out the reaction system. After reaching a predetermined stirring torque, the pressure was recovered to atmospheric pressure with nitrogen to terminate the reaction, a produced polycarbonate was extruded into water, and a strand was subjected to cutting to obtain pellets. The resulting polycarbonate pellets were used and subjected to the above-described various evaluations. The evaluation results are shown in Tables 1 and 2.

(Evaluation Results for Application of Injection Molded Article)

The polycarbonate obtained in Example 1-1 had advantages of being not only high in the pencil hardness and low in the photoelastic coefficient and birefringence but also excellent in the weather resistance and moist heat resistance. Nevertheless SBI had an aromatic structure, it was unexpectedly noted that SBI was also favorable in the weather resistance. The evaluation results are shown in Table 1.

Example 1-2

The synthesis was performed in the same manner as in Example 1-1, except for using 18.45 parts by weight (0.060 mol) of SBI, 42.45 parts by weight (0.290 mol) of ISB, 28.32 parts by weight (0.065 mol) of BHEPF, 90.65 parts by weight (0.423 mol) of DPC, and $1.10 \times 10^{-3}$ parts by weight ($6.22 \times 10^{-6}$ mol) of calcium acetate monohydrate as a catalyst and setting the final polymerization temperature to 250° C., thereby obtaining pellets of a polycarbonate. The resulting polycarbonate pellets were used and subjected to the above-described various evaluations. The evaluation results are shown in Table 2.

(Evaluation Results for Application of Retardation Film)

The polycarbonate exhibited reverse dispersibility such that the wavelength dispersion (R450/R550) was 0.98 and had high heat resistance (Tg) and low photoelastic coefficient. As compared with the case not using SBI (Comparative Example 1-8), the glass transition temperature could be improved while keeping the photoelastic coefficient low. The evaluation results are shown in Table 2.

Example 1-3

The synthesis was performed in the same manner as in Example 1-1, except for using 15.10 parts by weight (0.049 mol) of SBI, 53.87 parts by weight (0.369 mol) of ISB, 30.31 parts by weight (0.047 mol) of Compound 3, 80.21 parts by weight (0.374 mol) of DPC, and $1.10 \times 10^{-3}$ parts by weight ($6.26 \times 10^{-6}$ mol) of calcium acetate monohydrate as a catalyst and setting the final polymerization temperature to 250° C., thereby obtaining pellets of a polyester carbonate. The resulting polyester carbonate pellets were used and subjected to the above-described various evaluations. The evaluation results are shown in Table 2.
(Evaluation Results for Application of Retardation Film)

The polyester carbonate exhibited had the wavelength dispersion (R450/R550) of 0.85 and exhibited stronger reverse dispersibility than that in Example 1-2, and also had high heat resistance (Tg) and low photoelastic coefficient. In addition, as compared with the case not using SBI (Comparative Example 1-9), the glass transition temperature could be improved while keeping the photoelastic coefficient low. The evaluation results are shown in Table 2.

Example 1-4

The polymerization reaction was performed in the same manner as in Example 1-3, and the reaction was allowed to proceed to a higher stirring torque than that in Example 1-3, thereby obtaining a polyester carbonate having a higher molecular weight. The evaluation results are shown in Table 2. In addition to the above-described evaluation (8), the following evaluation was performed. The stretching temperature was decreased at a pitch of 1° C. from (Tg+15° C.) until the film was broken, thereby obtaining a film stretched under conditions of the one just before the breakage. In comparing the Δn at that time, the film of Example 1-3 exhibited 0.0023, and the film of Example 1-4 exhibited 0.0035, and therefore, by enhancing the molecular weight, the orientation properties could be improved. When the resulting film was folded, the film of Example 1-3 caused brittle fracture; whereas the film of Example 1-4 was not fractured, so that it was confirmed that the toughness was improved, too.

Comparative Example 1-1

The synthesis was performed in the same manner as in Example 1-1, except for using 84.90 parts by weight (0.581 mol) of ISB, 125.69 parts by weight (0.587 mol) of DPC, and $1.02 \times 10^{-4}$ parts by weight ($5.81 \times 10^{-7}$ mol) of calcium acetate monohydrate as a catalyst, thereby obtaining pellets of a polycarbonate. The resulting polycarbonate pellets were used and subjected to the above-described various evaluations. The evaluation results are shown in Tables 1 and 2.
(Evaluation Results for Application of Injection Molded Article)

Though the resulting polycarbonate had high heat resistance (Tg), since the water absorption of the resin was high, the molded article caused cracking in the boiling water immersion test. In addition, the results in which the birefringence was slightly high were revealed. The evaluation results are shown in Table 1.

(Evaluation Results for Application of Retardation Film)
The evaluation results are shown in Table 2.

Comparative Example 1-2

The synthesis was performed in the same manner as in Example 1-1, except for using 59.63 parts by weight (0.408 mol) of ISB, 25.22 parts by weight (0.175 mol) of CHDM, 126.12 parts by weight (0.589 mol) of DPC, and $1.54 \times 10^{-4}$ parts by weight ($8.74 \times 10^{-7}$ mol) of calcium acetate monohydrate as a catalyst and setting the final polymerization temperature to 220° C., thereby obtaining pellets of a polycarbonate. The resulting polycarbonate pellets were used and subjected to the above-described various evaluations. The evaluation results are shown in Tables 1 and 2.
(Evaluation Results for Application of Injection Molded Article)

Since the molded article caused not only deformation but also whitening in the boiling water immersion test, it was problematic in the most heat resistance. In addition, the results in which the birefringence was slightly high were revealed. The evaluation results are shown in Table 1.
(Evaluation Results for Application of Retardation Film)
The evaluation results are shown in Table 2.

Comparative Example 1-3

The synthesis was performed in the same manner as in Example 1-1, except for using 54.65 parts by weight (0.374 mol) of ISB, 31.46 parts by weight (0.160 mol) of TCDDM, 115.59 parts by weight (0.540 mol) of DPC, and $1.41 \times 10^{-4}$ parts by weight ($8.01 \times 10^{-7}$ mol) of calcium acetate monohydrate as a catalyst and setting the final polymerization temperature to 220° C., thereby obtaining pellets of a polycarbonate. The resulting polycarbonate pellets were used and subjected to the above-described various evaluations. The evaluation results are shown in Tables 1 and 2.
(Evaluation Results for Application of Injection Molded Article)

Since the molded article caused deformation in the boiling water immersion test, its heat moist resistance was insufficient. The evaluation results are shown in Table 1.
(Evaluation Results for Application of Retardation Film)
The evaluation results are shown in Table 2.

Comparative Example 1-4

The synthesis was performed in the same manner as in Example 1-1, except for using 33.24 parts by weight (0.108 mol) of SBI, 57.42 parts by weight (0.252 mol) of BPA, 81.59 parts by weight (0.381 mol) of DPC, and $3.17 \times 10^{-4}$ parts by weight ($1.80 \times 10^{-6}$ mol) of calcium acetate monohydrate as a catalyst and setting the final polymerization temperature to 280° C., thereby obtaining pellets of a polycarbonate. The resulting polycarbonate pellets were used and subjected to the above-described various evaluations. The evaluation results are shown in Tables 1 and 2.
(Evaluation Results for Application of Injection Molded Article)

Though the polycarbonate was excellent in the heat resistance and moist heat resistance, it was poor in the pencil hardness and weather resistance. Its birefringence exhibited a high value, too. The evaluation results are shown in Table 1.

(Evaluation Results for Application of Retardation Film)

The resulting polycarbonate had the wavelength dispersion (R450/R550) of 1.07 and exhibited positive wavelength dispersibility, and its photoelastic coefficient was high, too. The evaluation results are shown in Table 2.

Comparative Example 1-5

The synthesis was performed in the same manner as in Example 1-1, except for using 26.40 parts by weight (0.181 mol) of ISB, 61.86 parts by weight (0.271 mol) of BPA, 98.68 parts by weight (0.461 mol) of DPC, and $3.98 \times 10^{-4}$ parts by weight ($2.26 \times 10^{-6}$ mol) of calcium acetate monohydrate as a catalyst, thereby obtaining pellets of a polycarbonate. The resulting polycarbonate pellets were used and subjected to the above-described various evaluations. The evaluation results are shown in Tables 1 and 2.
(Evaluation Results for Application of Injection Molded Article)

Though the polycarbonate was excellent in the heat resistance and moist heat resistance, it was poor in the pencil hardness and weather resistance. Its birefringence and photoelastic coefficient exhibited high values, too. The evaluation results are shown in Table 1.
(Evaluation Results for Application of Retardation Film)

The resulting polycarbonate had the wavelength dispersion (R450/R550) of 1.05 and exhibited positive wavelength dispersibility, and its photoelastic coefficient was high, too. The evaluation results are shown in Table 2.

Comparative Example 1-6

The synthesis was performed in the same manner as in Example 1-1, except for using 42.45 parts by weight (0.290 mol) of ISB, 17.96 parts by weight (0.079 mol) of BPA, 25.42 parts by weight (0.176 mol) of CHDM, 119.17 parts by weight (0.556 mol) of DPC, and $9.61 \times 10^{-4}$ parts by weight ($5.45 \times 10^{-6}$ mol) of calcium acetate monohydrate as a catalyst, thereby obtaining pellets of a polycarbonate. The resulting polycarbonate pellets were used and subjected to the above-described various evaluations. The evaluation results are shown in Tables 1 and 2.
(Evaluation Results for Application of Injection Molded Article)

The polycarbonate was inferior in the moist heat resistance, pencil hardness, and weather resistance. In comparison with Example 1-1, it may be said that BPA is insufficient in terms of the effect for improving the heat resistance. The evaluation results are shown in Table 1.
(Evaluation Results for Application of Retardation Film)

In the evaluation for application of retardation film, the resulting polycarbonate had the wavelength dispersion (R450/R550) of 1.05 and exhibited positive wavelength dispersibility, and its photoelastic coefficient was slightly high, too. The evaluation results are shown in Table 2.

Comparative Example 1-7

NOVAREX 7022R, manufactured by Mitsubishi Engineering-Plastics Corporation was used as the polycarbonate resin of BPA and subjected to the above-described various evaluations. The evaluation results are shown in Tables 1 and 2.
(Evaluation Results for Application of Injection Molded Article)

The polycarbonate was poor in the weather resistance and exhibited a very high birefringence. The evaluation results are shown in Table 1.
(Evaluation Results for Application of Retardation Film)

The resulting polycarbonate had the wavelength dispersion (R450/R550) of 1.08 and exhibited positive wavelength dispersibility, and its photoelastic coefficient was very high, too. The evaluation results are shown in Table 2.

Comparative Example 1-8

The synthesis was performed in the same manner as in Example 1-1, except for using 42.45 parts by weight (0.290 mol) of ISB, 47.20 parts by weight (0.108 mol) of BHEPF, 86.13 parts by weight (0.402 mol) of DPC, and $7.01 \times 10^{-4}$ parts by weight ($3.98 \times 10^{-6}$ mol) of calcium acetate monohydrate as a catalyst, thereby obtaining pellets of a polycarbonate. The resulting polycarbonate pellets were used and subjected to the above-described various evaluations. The evaluation results are shown in Table 2.
(Evaluation Results for Application of Retardation Film)

The resulting polycarbonate had the wavelength dispersion (R450/R550) of 0.98 and exhibited reverse wavelength dispersibility; however, its heat resistance was inferior to that in Example 1-2. The evaluation results are shown in Table 2.

Comparative Example 1-9

The synthesis was performed in the same manner as in Example 1-1, except for using 63.1 parts by weight (0.438 mol) of ISB, 36.94 parts by weight (0.058 mol) of Compound 3, 82.43 parts by weight (0.385 mol) of DPC, and $3.86 \times 10^{-4}$ parts by weight ($2.19 \times 10^{-6}$ mol) of calcium acetate monohydrate as a catalyst, thereby obtaining pellets of a polyester carbonate. The resulting polyester carbonate pellets were used and subjected to the above-described various evaluations. The evaluation results are shown in Table 2.
(Evaluation Results for Application of Retardation Film)

The resulting polyester carbonate had the wavelength dispersion (R450/R550) of 0.79 and exhibited reverse wavelength dispersibility; however, its heat resistance was inferior to that in Example 1-3. The evaluation results are shown in Table 2.

Comparative Example 1-10

The synthesis was performed in the same manner as in Example 1-1, except for using 73.78 parts by weight (0.239 mol) of SBI, 16.99 parts by weight (0.116 mol) of ISB, 80.71 parts by weight (0.377 mol) of DPC, and $3.13 \times 10^{-5}$ parts by weight ($1.78 \times 10^{-5}$ mol) of calcium acetate monohydrate as a catalyst and setting the final polymerization temperature to 250° C., thereby obtaining pellets of a polycarbonate. The resulting polycarbonate pellets were used and subjected to the above-described various evaluations. The evaluation results are shown in Table 1. Though the polycarbonate exhibited a very high value of Tg as 195° C., the resin was very brittle, so that any molded piece for the various evaluations could not be obtained.

TABLE 1

|  |  |  | Example | Comparative Example | | | |
|---|---|---|---|---|---|---|---|
|  |  |  | 1-1 | 1-1 | 1-2 | 1-3 | 1-4 |
| Resin composition | SBI | mol % | 11.4 | — | — | — | 30.0 |
|  | ISB | mol % | 55.2 | 100.0 | 70.0 | 70.0 | — |
|  | CHDM | mol % | 33.5 | — | 30.0 | — | — |
|  | TCDDM | mol % | — | — | — | 30.0 | — |
|  | BPA | mol % | — | — | — | — | 70.0 |
|  | DPC | mol % | 100.0 | 100.0 | 100.0 | 100.0 | 100.0 |
|  | SBI structural unit | % by weight | 18.3 | — | — | — | 33.0 |
|  | ISB structural unit | % by weight | 41.9 | 83.7 | 58.8 | 53.9 | — |
|  | CHDM structural unit | % by weight | 25.1 | — | 24.9 | — | — |
|  | TCDDM structural unit | % by weight | — | — | — | 31.1 | — |
|  | BPA structural unit | % by weight | — | — | — | — | 56.9 |
|  | DPC structural unit | % by weight | 14.7 | 16.3 | 16.3 | 15.0 | 10.1 |
| Evaluation of physical properties for injection molded article | Reduced viscosity | dL/g | 0.389 | 0.458 | 0.413 | 0.393 | 0.412 |
|  | Melt viscosity | Pa·s | 2690 | 2320 | 960 | 1470 | >6000 1500 (at 280° C.) |
|  | Glass transition temperature | ° C. | 130 | 160 | 122 | 129 | 171 |
|  | Residual amount of phenol | ppm | 650 | 800 | 760 | 710 | 38 |
|  | Residual amount of DPC | ppm | 120 | 130 | 120 | 80 | 12 |
|  | Residual amount of SBI | ppm | 280 | — | — | — | 30 |
|  | Pencil hardness | — | F | 2H | F | H | B |
|  | Weather resistance test ΔYI | — | 0.2 | 0.0 | −0.1 | −0.1 | 3.8 |
|  | Boiling water immersion test | — | ○ Not changed | x Cracked | x Deformed and whitened | x Deformed | ○ Not changed |
|  | Photoelastic coefficient | ×10$^{-12}$ Pa$^{-1}$ | 23 | 13 | 18 | 9 | 62 |
|  | Δn | — | 0.0025 | 0.0060 | 0.0057 | 0.0028 | 0.0084 |

|  |  |  | Comparative Example | | | |
|---|---|---|---|---|---|---|
|  |  |  | 1-5 | 1-6 | 1-7 | 1-10 |
| Resin composition | SBI | mol % | — | — | — | 67.3 |
|  | ISB | mol % | 40.0 | 53.3 | — | 32.7 |
|  | CHDM | mol % | — | 32.3 | — | — |
|  | TCDDM | mol % | — | — | — | — |
|  | BPA | mol % | 60.0 | 14.4 | 100.0 | — |
|  | DPC | mol % | 100.0 | 100.0 | 100.0 | 100.0 |
|  | SBI structural unit | % by weight | — | — | — | 73.3 |
|  | ISB structural unit | % by weight | 26.0 | 41.9 | — | 16.8 |
|  | CHDM structural unit | % by weight | — | 25.1 | — | — |
|  | TCDDM structural unit | % by weight | — | — | — | — |
|  | BPA structural unit | % by weight | 61.3 | 17.8 | 89.0 | — |
|  | DPC structural unit | % by weight | 12.7 | 15.3 | 11.0 | 10.0 |
| Evaluation of physical properties for injection molded article | Reduced viscosity | dL/g | 0.370 | 0.528 | 0.505 | 0.210 |
|  | Melt viscosity | Pa·s | 2880 | 2750 | >6000 1050 (at 280° C.) | 4600 |
|  | Glass transition temperature | ° C. | 152 | 119 | 146 | 195 |
|  | Residual amount of phenol | ppm | 540 | 770 | — | 320 |
|  | Residual amount of DPC | ppm | 130 | 120 | — | 150 |
|  | Residual amount of SBI | ppm | — | — | — | 450 |
|  | Pencil hardness | — | 2B | HB | 3B | — |
|  | Weather resistance test ΔYI | — | 3.5 | 2.6 | 4.1 | — |
|  | Boiling water immersion test | — | ○ Not changed | x Deformed and whitened | ○ Not changed | — |
|  | Photoelastic coefficient | ×10$^{-12}$ Pa$^{-1}$ | 59 | 35 | 80 | — |
|  | Δn | — | 0.0170 | 0.0053 | 0.0195 | — |

TABLE 2

|  |  |  | Example | | | Comparative Example | | | |
|---|---|---|---|---|---|---|---|---|---|
|  |  |  | 1-2 | 1-3 | 1-4 | 1-1 | 1-2 | 1-3 | 1-4 |
| Resin composition | SBI | mol % | 14.4 | 11.7 | 11.7 | — | — | — | 30.0 |
|  | ISB | mol % | 70.0 | 88.3 | 88.3 | 100.0 | 70.0 | 70.0 | — |
|  | CHDM | mol % | — | — | — | — | 30.0 | — | — |
|  | TCDDM | mol % | — | — | — | — | — | 30.0 | — |
|  | BPA | mol % | — | — | — | — | — | — | 70.0 |
|  | BHEPF | mol % | 15.6 | — | — | — | — | — | — |
|  | Compound 3 | mol % | — | 11.3 | 11.3 | — | — | — | — |
|  | DPC | mol % | 100.0 | 88.7 | 88.7 | 100.0 | 100.0 | 100.0 | 100.0 |
|  | SBI structural unit | % by weight | 18.3 | 15.0 | 15.0 | — | — | — | 33.0 |
|  | ISB structural unit | % by weight | 41.9 | 53.1 | 53.1 | 83.7 | 58.8 | 53.9 | — |
|  | CHDM structural unit | % by weight | — | — | — | — | 24.9 | — | — |
|  | TCDDM structural unit | % by weight | — | — | — | — | — | 31.1 | — |
|  | BPA structural unit | % by weight | — | — | — | — | — | — | 56.9 |
|  | BHEPF structural unit | % by weight | 28.2 | — | — | — | — | — | — |
|  | Compound 3 structural unit | % by weight | — | 21.5 | 21.5 | — | — | — | — |
|  | DPC structural unit | % by weight | 11.6 | 10.4 | 10.4 | 16.3 | 16.3 | 15.0 | 10.1 |
| Evaluation of physical properties for retardation film | Reduced viscosity | dL/g | 0.279 | 0.298 | 0.335 | 0.458 | 0.413 | 0.393 | 0.412 |
|  | Melt viscosity | Pa · s | 3200 | 3280 | 5900 | 2320 | 960 | 1470 | >6000 1200 (at 280° C.) |
|  | Glass transition temperature | ° C. | 163 | 165 | 169 | 160 | 122 | 129 | 171 |
|  | Water absorption | % | 1.3 | 2.1 | 2.0 | 4.3 | 1.9 | 1.7 | 0.4 |
|  | Residual amount of phenol | ppm | 560 | 630 | 590 | 800 | 760 | 710 | 38 |
|  | Residual amount of DPC | ppm | 140 | 50 | 30 | 130 | 120 | 80 | 12 |
|  | Residual amount of SBI | ppm | 340 | 780 | 620 | — | — | — | 30 |
|  | Photoelastic coefficient | $\times 10^{-12}$ $Pa^{-1}$ | 23 | 15 | 15 | 13 | 18 | 9 | 62 |
|  | Δn | — | — | 0.016 | 0.0010 | 0.0012 | 0.0060 | 0.0057 | 0.0028 | 0.0084 |
|  | R450/R550 | — | — | 0.98 | 0.85 | 0.85 | 1.02 | 1.02 | 1.02 | 1.07 |

|  |  |  | Comparative Example | | | | |
|---|---|---|---|---|---|---|---|
|  |  |  | 1-5 | 1-6 | 1-7 | 1-8 | 1-9 |
| Resin composition | SBI | mol % | — | — | — | — | — |
|  | ISB | mol % | 40.0 | 53.3 | — | 73.0 | 100.0 |
|  | CHDM | mol % | — | 32.3 | — | — | — |
|  | TCDDM | mol % | — | — | — | — | — |
|  | BPA | mol % | 60.0 | 14.4 | 100.0 | — | — |
|  | BHEPF | mol % | — | — | — | 27.0 | — |
|  | Compound 3 | mol % | — | — | — | — | 13.2 |
|  | DPC | mol % | 100.0 | 100.0 | 100.0 | 100.0 | 86.8 |
|  | SBI structural unit | % by weight | — | — | — | — | — |
|  | ISB structural unit | % by weight | 26.0 | 41.9 | — | 41.9 | 63.1 |
|  | CHDM structural unit | % by weight | — | 25.1 | — | — | — |
|  | TCDDM structural unit | % by weight | — | — | — | — | — |
|  | BPA structural unit | % by weight | 61.3 | 17.8 | 89.0 | — | — |
|  | BHEPF structural unit | % by weight | — | — | — | 47.0 | — |
|  | Compound 3 structural unit | % by weight | — | — | — | — | 26.2 |
|  | DPC structural unit | % by weight | 12.7 | 15.3 | 11.0 | 11.2 | 10.7 |
| Evaluation of physical properties for retardation film | Reduced viscosity | dL/g | 0.370 | 0.528 | 0.505 | 0.322 | 0.410 |
|  | Melt viscosity | Pa · s | 2880 | 2750 | >6000 1050 (at 280° C.) | 2800 | 3400 |
|  | Glass transition temperature | ° C. | 152 | 119 | 146 | 151 | 157 |
|  | Water absorption | % | 0.8 | 1.1 | 0.2 | 1.1 | 2.7 |
|  | Residual amount of phenol | ppm | 540 | 770 | — | 600 | 570 |
|  | Residual amount of DPC | ppm | 130 | 120 | — | 140 | 120 |
|  | Residual amount of SBI | ppm | — | — | — | — | — |
|  | Photoelastic coefficient | $\times 10^{-12}$ $Pa^{-1}$ | 59 | 35 | 80 | 24 | 15 |
|  | Δn | — | 0.0170 | 0.0053 | 0.0195 | 0.0015 | 0.0012 |
|  | R450/R550 | — | 1.05 | 1.05 | 1.08 | 0.98 | 0.79 |

<Examples According to the Third Embodiment of the Present Invention>

(1) Reduced Viscosity of Polycarbonate Resin:

A polycarbonate resin was dissolved in methylene chloride, thereby precisely preparing a resin solution having a concentration of 0.6 g/L. The measurement was performed at a temperature of 20.0° C.±0.1° C. by using an Ubbelohde viscometer, manufactured by Moritomo Rika Kogyo Co., Ltd., and a flow-through time $t_0$ of the solvent and a flow-through time t of the solution were measured. Using the obtained $t_0$ and t values, a relative viscosity $\eta_{rel}$ was determined according to the following formula (i), and furthermore, using the obtained relative viscosity $\eta_{rel}$, a specific viscosity $\eta_{sp}$ was determined according to the following formula (ii).

$$\eta_{rel}=t/t_0 \quad (i)$$

$$\eta_{sp}=(\eta-\eta_0)/\eta_0=\eta_{rel}-1 \quad (ii)$$

Thereafter, the obtained specific viscosity $\eta_{sp}$ was divided by a concentration c [g/dL], thereby determining a reduced viscosity $\eta_{sp}/c$.

(2) Melt Viscosity of Polycarbonate Resin:

A polycarbonate resin in a pellet form was dried in vacuo at 90° C. for 5 hours or more. Using the dried pellets, the measurement was performed with a capillary rheometer, manufactured by Toyo Seiki Seisaku-Sho, Ltd. A measurement temperature was set to 240° C., a melt viscosity was measured at a shear rate ranging from 91.2 to 1,824 sec$^{-1}$, and a value of the melt viscosity at 91.2 sec$^{-1}$ was used. An orifice having a die diameter of 41 mm×10 mmL was used.

(3) Glass Transition Temperature (Tg) of Polycarbonate Resin:

A glass transition temperature of a polycarbonate resin was measured by using a differential scanning calorimeter DSC6220, manufactured by SII Technology Inc. About 10 mg of a resin was charged in an aluminum pan made by the same company and hermetically sealed, and the temperature was then elevated from 30° C. to 250° C. at a temperature elevation rate of 20° C./min in a nitrogen gas stream of 50 mL/min. After holding the temperature for 3 minutes, the resultant was cooled to 30° C. at a rate of 20° C./min. After holding at 30° C. for 3 minutes, the temperature was again elevated to 200° C. at a rate of 20° C./min. From the DSC data obtained by the second temperature elevation, an extrapolated starting temperature of glass transition that is a temperature of the point of intersection of a straight line of the base line on the low temperature side extending to the high temperature side with a tangent line drawn at a point where a gradient of a curve of stepwise change part of glass transition becomes maximum was determined and defined as a glass transition temperature.

In general, when the glass transition temperature is higher, the heat resistance is more preferable. However, in the present application, it is one of the effects of the present application that as compared with a similar polycarbonate resin not containing SBT, the glass transition temperature of the polycarbonate resin containing SBI is improved.

(4) Measurement of Contents of Monohydroxy Compound and Carbonic Diester in Polycarbonate Resin and Dihydroxy Compound Represented by the Foregoing Formula (6):

About 1 g of a polycarbonate resin sample was precisely weighed and dissolved in 5 mL of methylene chloride to prepare a solution, to which was then added acetone such that a total amount was 25 mL, thereby performing a reprecipitation treatment. Subsequently, the treatment liquid was measured by means of liquid chromatography.

Apparatuses and conditions used are as follows.
Apparatus: Manufactured by Shimadzu Corporation
  System controller: CBM-20A
  Pump: LC-10AD
  Column oven: CTO-10ASvp
  Detector: SPD-M20A
  Analysis column: Cadenza CD-18 4.6 mmφ×250 mm
  Oven temperature: 60° C.
Detection wavelength: 220 nm
Eluent: A liquid: 0.1% phosphorus acid aqueous solution, B liquid: acetonitrile
  Gradient from A/B=50/50 (vol %) to A/B=0/100 (vol %) for 10 minutes, and holding at A/B=0/100 (vol %) for 5 minutes
Flow rate: 1 mL/min
Injection amount of sample: 10 μL As for the content of each of the compounds in the resin, solutions in which a concentration of the respective compound was changed were prepared and measured under the same conditions as in the above-described liquid chromatography to prepare a calibration curve, and the content was calculated by the absolute calibration curve method.

(5) Molding of Film:

Pellets of a resin having been dried in vacuo at 90° C. for 5 hours were extruded from a T-die (width: 200 mm, preset temperature: 200 to 270° C.) by using a single-screw extruder, manufactured by Isuzu Kakoki Co., Ltd. (screw diameter: 25 mm, cylinder preset temperature: 220° C. to 270° C.). The extruded film was wound up in a roll shape while cooling by chill rolls (preset temperature: 120° C. to 170° C.), thereby preparing an unstretched film.

(6) Measurement of Water Absorption:

A film having a thickness of 100 to 300 m was molded by the above-described method and then cut out in a regular square having a length of 100 mm and a width of 100 mm, thereby preparing a sample. This sample was used and measured in conformity with the "Testing methods for water and boiling water absorption of plastics" as described in JIS K 7209.

In the present application, one having a water absorption of 3% or less was determined to be acceptable.

(7) Measurement of Photoelastic Coefficient:

The measurement was performed by using a combined apparatus of a birefringence measuring apparatus composed of a He—Ne laser, a polarizer, a compensator, an analyzer, and a photodetector with a vibration type viscoelasticity measuring apparatus (DVE-3, manufactured by Rheology Co., Ltd.). (For details, refer to *Journal of the Society of Rheology Japan*, Vol. 19, pp. 93-97 (1991).)

A sample having a width of 5 mm and a length of 20 mm was cut out from the above-described unstretched film and fixed in the viscoelasticity measuring apparatus, and a storage elastic modulus E' at room temperature of 25° C. was measured at a frequency of 96 Hz. Simultaneously, the outgoing laser light was passed through the polarizer, the sample, the compensator, and the analyzer in this order, picked up by the photodetector (photodiode), and then passed through a lock-in amplifier, and with respect to a waveform at an angular frequency ω or 2ω, a retardation relative to its amplitude and strain was determined, and a strain-optical coefficient O' was determined. At that time, the polarizer and the analyzer were regulated in such a manner that the directions thereof were perpendicular to each other and each formed an angle of π/4 with the direction of extension of the sample. The photoelastic coefficient C was determined from the storage elastic coefficient E' and the strain-optical coefficient O' according to the following formula.

$$C=O'/E'$$

In general, it is preferred that the photoelastic coefficient C is smaller. However, in the present application, it is one of the effects of the present application that as compared with a similar polycarbonate resin not containing SBI, the photoelastic coefficient of the polycarbonate resin containing SBI is equal to or less than the former.

(8) Measurement of Birefringence (Δn) and Wavelength Dispersion (R450/R550):

A film piece having a width of 50 mm and a length of 125 mm was cut out from the above-described unstretched film. The above-described film piece was subjected to free-end uniaxial stretching at a stretching temperature of (glass transition temperature of the resin+15° C.) and at a stretching rate of 300%/min in a stretch ratio of 1.5 times by using a batch-type twin-screw stretching apparatus (twin-screw stretching machine BIX-277-AL, manufactured by Island Kogyo Co., Ltd.), thereby obtaining a retardation film. A central part of the stretched film obtained by the above-described method was cut out in a size of 4 cm in width and 4 cm in length and measured for retardations at a measuring wavelength of 450, 500, 550, 590, and 630 nm, respectively by using a retardation measuring apparatus KOBRA-WPR, manufactured by Oji Scientific Instruments Co., Ltd., thereby measuring wavelength dispersibility. The wavelength dispersibility was expressed by a ratio (R450/R550) of the retardations R450 and R550 measured at 450 nm and 550 nm, respectively. When the R450/R550 is larger than 1, the wavelength dispersion is positive, whereas when it is less than 1, the wavelength dispersion becomes reverse wavelength dispersion. In the case of using the stretched film as a quarter-wave plate, an ideal value of R450/R550 is 0.818 (R450/R550=0.818).

In addition, a birefringence Δn was determined from the retardation R550 at 550 nm and the thickness of the stretched film according to the following formula.

$$\text{Birefringence}=R550\ [\text{nm}]/\{(\text{Film thickness [mm]})\times 10^6\}$$

In the measurement of this time, when the Δn has a positive value, it is possible to use the stretched film as a retardation film.

[Determination Criteria]

In the evaluation of physical properties for application of retardation film exhibiting flat wavelength dispersion, one satisfying all of the following items was determined to be acceptable.

Glass transition temperature: 155° C. or higher
Wavelength dispersion (R450/R550): 0.98 to 1.02
Water absorption: 3% or less
Photoelastic coefficient: 25 or less
Δn: 0.0010 or more In the evaluation of physical properties for application of retardation film exhibiting reverse wavelength dispersion, one satisfying all of the following items was determined to be acceptable.

Glass transition temperature: 160° C. or higher
Wavelength dispersion (R450/R550): 0.75 to 0.90
Water absorption: 3% or less
Photoelastic coefficient: 17 or less
Δn: 0.0010 or more Synthesis Examples of Monomer Synthesis Example 1

Synthesis of 6,6'-dihydroxy-3,3,3',3'-tetramethyl-1,1'-spirobiindane (SBT)

The compound was synthesized by the method described in JP-A-2014-114281.

Synthesis Example 2

Synthesis of bis(fluoren-9-yl)methane (Compound 1)

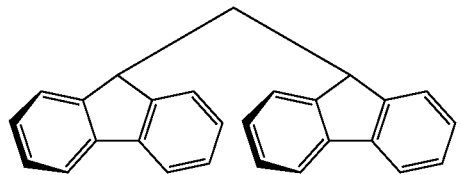

In a one-liter four-necked flask, fluorene (120 g, 722 mmol) and N,N-dimethylformamide (480 mL) were charged, and after purging with nitrogen, the contents were cooled to 5° C. or lower. Sodium ethoxide (24.6 g, 361 mmol) was added, p-formaldehyde (8.7 g, 289 mmol) was added little by little such that the temperature did not exceed 10° C., and the contents were stirred. After two hours, 1N hydrochloric acid (440 mL) was added dropwise to terminate the reaction. The resulting suspension solution was subjected to suction filtration and washed with desalted water (240 mL) by sprinkling. Thereafter, the resulting crude product was dispersed in desalted water (240 mL) and stirred for one hour. This suspension liquid was subjected to suction filtration and then washed with desalted water (120 mL) by sprinkling. The resulting crude product was dispersed in toluene (480 mL) and then dehydrated under heat refluxing conditions by using a Dean-Stark apparatus. After returning to room temperature (20° C.), the resultant was subjected to suction filtration and then dried under reduced pressure at 80° C. until it became a constant weight, thereby obtaining 84.0 g of bis(fluoren-9-yl)methane (Compound 1) (yield: 84.5%, HPLC purity: 94.0%) as a white solid. A chemical shift of Compound 1 in the $^1$H-NMR spectrum was as follows.

$^1$H-NMR (400 MHz, CDCl$_3$) δ7.83 (d, J=7.6 Hz, 4H), 7.56 (dd, J1=7.6 Hz, J2=0.8 Hz, 4H), 7.41 (t, J=7.3 Hz, 4H), 7.29 (dt, J1=7.3 Hz, J2=1.3 Hz, 4H), 4.42 (t, J=7.6 Hz, 2H), 2.24 (d, J=7.6 Hz, 2H).

Synthesis Example 3

Synthesis of bis[9-(2-ethoxycarbonylethyl)fluoren-9-yl]methane (Compound 2)

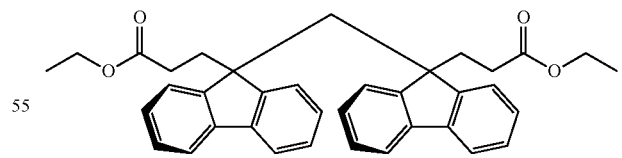

In a one-liter three-necked flask, the above obtained bis(fluoren-9-yl)methane (Compound 1, 80 g, 232.3 mmol), N-benzyl-N,N,N-triethylammonium chloride (10.6 g, 46.5 mmol), and methylene chloride (400 mL) were charged. After purging with nitrogen, the contents were controlled to 15° C. to 20° C. by a water bath, and a 50% sodium hydroxide aqueous solution (64 mL) was added. As a result, a color of the solution was changed to pale red. Thereafter, ethyl acrylate (50.5 mL, 465 mmol) was added dropwise over 5 minutes. After one hour, ethyl acrylate (25.3 mL, 232 mL) was further added, and the contents were stirred for 9 hours while following the progress of the reaction by means of HPLC. After a mono-adduct was confirmed to become 5% or less by means of HPLC, the resultant was cooled by an ice bath, and 3N hydrochloric acid (293 mL) was added dropwise in conformity with the temperature, thereby undergoing quenching. After an organic layer was washed with water until the liquid property became neutral, the organic layer was dried over anhydrous magnesium sulfate and filtered, and the solvent was then distilled off under reduced pressure. The resulting crude product was dispersed in methanol (400 mL) and heat refluxed for 30 minutes, thereby undergoing washing in thermal suspension. Thereafter, the temperature was returned to room temperature (20° C.), and the resultant was subjected to suction filtration and then dried under reduced pressure at 80° C. until it became a constant weight, thereby obtaining 96.1 g of bis[9-(2-ethoxycarbonylethyl)fluoren-9-yl]methane (Compound 2) (yield: 75.9%, HPLC purity: 96.0%) as a white solid. A chemical shift of Compound 2 in the $^1$H-NMR spectrum was as follows.

$^1$H-NMR (400 MHz, CDCl$_3$) δ7.03 (d, J=7.6 Hz, 4H), 6.97 (dt, J1=7.6 Hz, J2=1.5 Hz, 4H), 6.82 (dt, J1=7.6 Hz, J2=1.3 Hz, 4H), 6.77 (d, J=7.6 Hz, 4H), 3.88 (q, J=7.1 Hz, 4H), 3.12 (s, 2H), 2.23 (m, 4H), 1.13 (m, 4H), 1.02 (t, J=7.1 Hz, 6H).

Synthesis Example 4

Synthesis of bis[9-(2-phenoxycarbonylethyl)fluoren-9-yl]methane (Compound 3)

In a one-liter four-necked flask, the above obtained bis [9-(2-ethoxycarbonylethyl)fluoren-9-yl]methane (Compound 2, 50.0 g, 91.80 mmol), diphenyl carbonate (98.3 g, 459 mmol), and tetraisopropyl orthotitanate (1.3 mL, 4.59 mmol) were charged, a degree of reduced pressure was regulated to 3 kPa, and the contents were stirred at a temperature in the range of 145° C. to 150° C. for 6 hours while distilling off a by-product. The resultant was cooled to 90° C., and after confirming completion of the reaction by means of HPLC, toluene (100 mL) was added, followed by cooling to 50° C. Methanol (250 mL) was added thereto, and the contents were cooled to 5° C. and then subjected to suction filtration. The resulting white solid was dispersed in toluene (100 mL) and heat refluxed for 30 minutes. After cooling to 50° C., methanol (200 mL) was added. After cooling to room temperature (20° C.), the resultant was subjected to suction filtration and then dried under reduced pressure at 100° C. until it became a constant weight, thereby obtaining 50 g of bis[9-(2-phenoxycarbonylethyl) fluoren-9-yl]methane (Compound 3) (yield: 85%, HPLC purity: 98.1%) as a white solid. A chemical shift of Compound 3 in the $^1$H-NMR spectrum was as follows.

$^1$H-NMR (400 MHz, CDCl$_3$) δ7.23 to 7.28 (m, 4H), 7.07 to 7.16 (m, 6H), 7.03 (dt, J1=6.9 Hz, J2=2.0, 4H), 6.78 to 6.90 (m, 12H), 3.20 (s, 2H), 2.37 (t, J=8.3 Hz, 4H), 1.40 (t, J=8.3 Hz, 4H)

Synthesis Examples of Polycarbonate Resin and Property Evaluations

Abbreviations and so on of compounds used in the following Examples and Comparative Examples are as follows.
SBI: 6, 6'-Dihydroxy-3,3,3',3'-tetramethyl-1,1'-spirobiindane
ISB: Isosorbide (a trade name: POLYSORB, manufactured by Roquette Freres)
CHDM: 1,4-Cyclohexane dimethanol (a mixture of cis and trans isomers, manufactured by SK Chemicals Ltd.)
TCDDM: Tricyclodecane dimethanol (manufactured by Oxea Corporation)
SPG: Spiroglycol (manufactured by Mitsubishi Gas Chemical Company, Ltd.)
BPA: 2,2-Bis[4-hydroxyphenyl]propane (manufactured by Mitsubishi Chemical Corporation)
BHEPF: 9,9-Bis[4-(2-hydroxyethoxy)phenyl]-fluorene (manufactured by Osaka Gas Chemicals Co., Ltd.)
BisZ: 1,1,-Bis(4-hydroxyphenyl)cyclohexane (manufactured by Honshu Chemical Industry Co., Ltd.)
TER-BP: Terpene bisphenol . . . a mixture of 1,3-bis(4-hydroxyphenyl)-p-menthane and 2,8-bis(4-hydroxyphenyl)-p-menthane (manufactured by Yasuhara Chemical Co., Ltd.)
Compound 3: Bis[9-(2-phenoxycarbonylethyl)fluoren-9-yl]methane
DPC: Diphenyl carbonate (manufactured by Mitsubishi Chemical Corporation)

The term "mol %" in the tables of the Examples indicates "mol %" of the dihydroxy compound in all dihydroxy compounds or the diester compound in all diester compounds.

In addition, the term "% by weight" indicates "% by weight" of the structural unit derived from the compound when a total amount in weight of all of the structural units and connecting groups constituting the polycarbonate resin is defined as 100% by weight.

Example 2-1

23.06 parts by weight (0.075 mol) of SBI, 55.18 parts by weight (0.378 mol) of ISB, 8.47 parts by weight (0.059 mol) of CHDM, 112.78 parts by weight (0.526 mol) of DPC, and $1.80 \times 10^{-3}$ parts by weight ($1.02 \times 10^5$ mol) of calcium acetate monohydrate as a catalyst were charged in a reactor, and the inside of the reaction apparatus was purged with nitrogen under reduced pressure. The raw materials were dissolved with stirring in a nitrogen atmosphere at 150° C. for about 10 minutes. As a step of the first stage of the reaction, the temperature was elevated to 220° C. over 30 minutes, and the contents were allowed to react with each other at atmospheric pressure for 60 minutes. Subsequently, the pressure was reduced from the atmospheric pressure to 13.3 kPa over 90 minutes and held at 13.3 kPa for 30 minutes, and phenol generated was discharged out the reaction system. Subsequently, as a step of the second stage of the reaction, the pressure was reduced to 0.10 kPa or less over 15 minutes while elevating the catalyst temperature to 250° C. over 15 minutes, and phenol generated was discharged out the reaction system. After reaching a predetermined stirring torque, the pressure was recovered to atmospheric pressure with nitrogen to terminate the reaction, a produced polycarbonate was extruded into water, and a strand was subjected to cutting to obtain pellets. The resulting polycarbonate pellets were used and subjected to the above-described various evaluations. The evaluation results are shown in Table 3.

In addition to the fact that the resulting polycarbonate had high heat resistance (Tg) and relatively low photoelastic coefficient, it had flat wavelength properties equal to those of wholly polycarbonate resins of Comparative Examples 2-1 to 2-3.

Example 2-2

The synthesis was performed in the same manner as in Example 2-1, except for using 51.00 parts by weight (0.165 mol) of SBI, 41.18 parts by weight (0.135 mol) of SPG 68.59 parts by weight (0.320 mol) of DPC, and $5.30 \times 10^{-3}$ parts by weight ($3.01 \times 10^{-5}$ mol) of calcium acetate monohydrate as a catalyst, thereby obtaining pellets of a polycarbonate. The resulting polycarbonate pellets were used and subjected to the above-described various evaluations. The evaluation results are shown in Table 3.

The polycarbonate exhibited the same properties as those in Example 2-1.

Example 2-3

The synthesis was performed in the same manner as in Example 2-1, except for using 18.45 parts by weight (0.060 mol) of SBI, 42.45 parts by weight (0.290 mol) of ISB, 28.32 parts by weight (0.065 mol) of BHEPF, 90.65 parts by weight (0.423 mol) of DPC, and $1.10 \times 10^{-3}$ parts by weight ($6.22 \times 10^{-6}$ mol) of calcium acetate monohydrate as a catalyst, thereby obtaining pellets of a polycarbonate. The resulting polycarbonate pellets were used and subjected to the above-described various evaluations. The evaluation results are shown in Table 3.

The polycarbonate exhibited reverse dispersibility such that the wavelength dispersion (R450/R550) was 0.98 and had high heat resistance and relatively low photoelastic coefficient. As compared with the case not using SBI (Comparative Example 2-8), the glass transition temperature could be improved while keeping the photoelastic coefficient low.

Example 2-4

The synthesis was performed in the same manner as in Example 2-1, except for using 15.10 parts by weight (0.049 mol) of SBI, 53.87 parts by weight (0.369 mol) of ISB, 30.31 parts by weight (0.047 mol) of Compound 3, 80.21 parts by weight (0.374 mol) of DPC, and $1.10 \times 10^{-3}$ parts by weight ($6.26 \times 10^{-6}$ mol) of calcium acetate monohydrate as a catalyst, thereby obtaining pellets of a polyester carbonate. The resulting polyester carbonate pellets were used and subjected to the above-described various evaluations. The evaluation results are shown in Table 4.

The polyester carbonate exhibited had the wavelength dispersion (R450/R550) of 0.85 and exhibited stronger reverse dispersibility than that in Example 2-3, and also had high heat resistance and low photoelastic coefficient. In addition, as compared with the case not using SBI (Comparative Example 2-9), the glass transition temperature could be improved while keeping the photoelastic coefficient low.

Example 2-5

The polymerization reaction was performed in the same manner as in Example 2-4, and the reaction was allowed to proceed to a higher stirring torque than that in Example 2-4, thereby obtaining a polyester carbonate having a higher molecular weight. The evaluation results are shown in Table 4. In addition to the above-described evaluation (8), the following evaluation was performed. The stretching temperature was decreased at a pitch of 1° C. from (Tg+15° C.) until the film was broken, thereby obtaining a film stretched under conditions of the one just before the breakage. In comparing the Δn at that time, the film of Example 2-4 exhibited 0.0023, and the film of Example 2-5 exhibited 0.0035, and therefore, by enhancing the molecular weight, the orientation properties could be improved. When the resulting film was folded, the film of Example 2-4 caused brittle fracture; whereas the film of Example 2-5 was not fractured, so that it was confirmed that the toughness was improved, too.

Comparative Example 2-1

The synthesis was performed in the same manner as in Example 2-1, except for using 84.90 parts by weight (0.581 mol) of ISB, 125.69 parts by weight (0.587 mol) of DPC, and $1.02 \times 10^{-4}$ parts by weight ($5.81 \times 10^{-7}$ mol) of calcium acetate monohydrate as a catalyst and setting the final polymerization temperature to 240° C., thereby obtaining pellets of a polycarbonate. The resulting polycarbonate pellets were used and subjected to the above-described various evaluations. The evaluation results are shown in Table 3.

Though the resulting polycarbonate has high glass transition temperature and low photoelastic coefficient, since its water absorption is high, it is problematic for the use at a high humidity.

Comparative Example 2-2

The synthesis was performed in the same manner as in Example 2-1, except for using 59.63 parts by weight (0.408 mol) of ISB, 25.22 parts by weight (0.175 mol) of CHDM, 126.12 parts by weight (0.589 mol) of DPC, and $1.54 \times 10^{-4}$ parts by weight ($8.74 \times 10^{-7}$ mol) of calcium acetate monohydrate as a catalyst and setting the final polymerization temperature to 220° C., thereby obtaining pellets of a polycarbonate. The resulting polycarbonate pellets were used and subjected to the above-described various evaluations. The evaluation results are shown in Table 3.

Comparative Example 2-3

The synthesis was performed in the same manner as in Example 2-1, except for using 54.65 parts by weight (0.374 mol) of ISB, 31.46 parts by weight (0.160 mol) of TCDDM, 115.59 parts by weight (0.540 mol) of DPC, and $1.41 \times 10^{-4}$ parts by weight ($8.01 \times 10^{-7}$ mol) of calcium acetate monohydrate as a catalyst and setting the final polymerization temperature to 220° C., thereby obtaining pellets of a polycarbonate. The resulting polycarbonate pellets were used and subjected to the above-described various evaluations. The evaluation results are shown in Table 3.

Comparative Example 2-4

The synthesis was performed in the same manner as in Example 2-1, except for using 33.24 parts by weight (0.108 mol) of SBI, 57.42 parts by weight (0.252 mol) of BPA, 81.59 parts by weight (0.381 mol) of DPC, and $3.17 \times 10^{-4}$ parts by weight ($1.80 \times 10^{-6}$ mol) of calcium acetate monohydrate as a catalyst and setting the final polymerization temperature to 280° C., thereby obtaining pellets of a polycarbonate. The resulting polycarbonate pellets were used and subjected to the above-described various evaluations. The evaluation results are shown in Table 3.

The resulting polycarbonate has the wavelength dispersion (R450/R550) of 1.07 and exhibits positive wavelength dispersibility, and its photoelastic coefficient is large, too.

Comparative Example 2-5

The synthesis was performed in the same manner as in Example 2-1, except for using 26.40 parts by weight (0.181 mol) of ISB, 61.86 parts by weight (0.271 mol) of BPA, 98.68 parts by weight (0.461 mol) of DPC, and $3.98 \times 10^{-4}$ parts by weight ($2.26 \times 10^{-6}$ mol) of calcium acetate monohydrate as a catalyst, thereby obtaining pellets of a polycarbonate. The resulting polycarbonate pellets were used and subjected to the above-described various evaluations. The evaluation results are shown in Table 3.

The resulting polycarbonate has the wavelength dispersion (R450/R550) of 1.05 and exhibits positive wavelength dispersibility, and its photoelastic coefficient is large, too.

Comparative Example 2-6

The synthesis was performed in the same manner as in Example 2-1, except for using 42.45 parts by weight (0.290 mol) of ISB, 17.96 parts by weight (0.079 mol) of BPA, 25.42 parts by weight (0.176 mol) of CHDM, 119.17 parts by weight (0.556 mol) of DPC, and $9.61 \times 10^{-4}$ parts by weight ($5.45 \times 10^{-6}$ mol) of calcium acetate monohydrate as a catalyst, thereby obtaining pellets of a polycarbonate. The resulting polycarbonate pellets were used and subjected to the above-described various evaluations. The evaluation results are shown in Table 3.

The resulting polycarbonate has the wavelength dispersion (R450/R550) of 1.05 and exhibits positive wavelength dispersibility, and its photoelastic coefficient is slightly large, too.

Comparative Example 2-7

NOVAREX 7022R, manufactured by Mitsubishi Engineering-Plastics Corporation was used as the polycarbonate resin of BPA and subjected to the above-described various evaluations. The evaluation results are shown in Table 3.

The resulting polycarbonate has the wavelength dispersion (R450/R550) of 1.08 and exhibits positive wavelength dispersibility, and its photoelastic coefficient is very large, too.

Comparative Example 2-8

The synthesis was performed in the same manner as in Example 2-1, except for using 42.45 parts by weight (0.290 mol) of ISB, 47.20 parts by weight (0.108 mol) of BHEPF, 86.13 parts by weight (0.402 mol) of DPC, and $7.01 \times 10^{-4}$ parts by weight ($3.98 \times 10^{-6}$ mol) of calcium acetate monohydrate as a catalyst, thereby obtaining pellets of a polycarbonate. The resulting polycarbonate pellets were used and subjected to the above-described various evaluations. The evaluation results are shown in Table 3.

The resulting polycarbonate had the wavelength dispersion (R450/R550) of 0.98 and exhibited reverse wavelength dispersibility; however, its glass transition temperature is lower than that in Example 2-3.

Comparative Example 2-9

The synthesis was performed in the same manner as in Example 2-1, except for using 64.02 parts by weight (0.438 mol) of ISB, 36.94 parts by weight (0.058 mol) of Compound 3, 82.43 parts by weight (0.385 mol) of DPC, and $3.86 \times 10^{-4}$ parts by weight ($2.19 \times 10^{-6}$ mol) of calcium acetate monohydrate as a catalyst, thereby obtaining pellets of a polyester carbonate. The resulting polyester carbonate pellets were used and subjected to the above-described various evaluations. The evaluation results are shown in Table 4.

The resulting polyester carbonate had the wavelength dispersion (R450/R550) of 0.79 and exhibited reverse wavelength dispersibility; however, its glass transition temperature is lower than that in Example 2-4.

Comparative Example 2-10

The synthesis was performed in the same manner as in Example 2-1, except for using 45.42 parts by weight (0.311 mol) of ISB, 36.65 parts by weight (0.057 mol) of Compound 3, 20.15 parts by weight (0.075 mol) of BisZ, 70.41 parts by weight (0.329 mol) of DPC, and $6.80 \times 10^{-4}$ parts by weight ($3.86 \times 10^{-6}$ mol) of calcium acetate monohydrate as a catalyst, thereby obtaining pellets of a polyester carbonate. The resulting polyester carbonate pellets were used and subjected to the above-described various evaluations. The evaluation results are shown in Table 4.

The resulting polyester carbonate is slightly low in the glass transition temperature and large in the photoelastic coefficient as compared with that in Example 2-4. In addition, the reverse wavelength dispersibility was lowered due to influences of the aromatic ring oriented in the main chain direction.

Comparative Example 2-11

The synthesis was performed in the same manner as in Example 2-1, except for using 45.73 parts by weight (0.313 mol) of ISB, 36.65 parts by weight (0.057 mol) of Compound 3, 20.13 parts by weight (0.062 mol) of TER-BP, 68.07 parts by weight (0.318 mol) of DPC, and $1.32 \times 10^3$ parts by weight ($7.50 \times 10^{-6}$ mol) of calcium acetate monohydrate as a catalyst, thereby obtaining pellets of a polyester carbonate. The resulting polyester carbonate pellets were used and subjected to the above-described various evaluations. The evaluation results are shown in Table 4.

The resulting polyester carbonate is large in the photoelastic coefficient as compared with that in Example 2-4. In addition, the reverse wavelength dispersibility was lowered due to influences of the aromatic ring oriented in the main chain direction.

Comparative Example 2-12

The synthesis was performed in the same manner as in Example 2-1, except for using 73.78 parts by weight (0.239 mol) of SBI, 16.99 parts by weight (0.116 mol) of ISB, 80.71 parts by weight (0.377 mol) of DPC, and 3.13×10⁻⁵ parts by weight (1.78×10⁻⁵ mol) of calcium acetate monohydrate as a catalyst and setting the final polymerization temperature to 250° C., thereby obtaining pellets of a polycarbonate. The resulting polycarbonate pellets were used and subjected to the above-described various evaluations. The evaluation results are shown in Table 3. Though the polycarbonate exhibited a very high value of Tg as 195° C., the resin was very brittle, so that any molded piece for the various evaluations could not be obtained.

TABLE 3

|  |  |  | Example | | | Comparative Example | | | |
|---|---|---|---|---|---|---|---|---|---|
|  |  |  | 2-1 | 2-2 | 2-3 | 2-1 | 2-2 | 2-3 | 2-4 |
| Resin composition | SBI | mol % | 14.6 | 55.0 | 14.4 | — | — | — | 30.0 |
|  | ISB | mol % | 73.9 | — | 70.0 | 100.0 | 70.0 | 70.0 | — |
|  | CHDM | mol % | 11.5 | — | — | — | 30.0 | — | — |
|  | TCDDM | mol % | — | — | — | — | — | 30.0 | — |
|  | SPG | mol % | — | 45.0 | — | — | — | — | — |
|  | BPA | mol % | — | — | — | — | — | — | — |
|  | BHEPF | mol % | — | — | 15.6 | — | — | — | — |
|  | BPA | mol % | — | — | — | — | — | — | 70.0 |
|  | DPC | mol % | 100.0 | 100.0 | 100.0 | 100.0 | 100.0 | 100.0 | 100.0 |
|  | SBI structural unit | % by weight | 22.9 | 50.7 | 18.3 | — | — | — | 33.0 |
|  | ISB structural unit | % by weight | 54.4 | — | 41.9 | 83.7 | 58.8 | 53.9 | — |
|  | CHDM structural unit | % by weight | 8.4 | — | — | — | 24.9 | — | — |
|  | TCDDM structural unit | % by weight | — | — | — | — | — | 31.1 | — |
|  | SPG structural unit | % by weight | — | 40.9 | — | — | — | — | — |
|  | BPA structural unit | % by weight | — | — | — | — | — | — | 56.9 |
|  | BHEPF structural unit | % by weight | — | — | 28.2 | — | — | — | — |
|  | DPC structural unit | % by weight | 14.3 | 8.4 | 11.6 | 16.3 | 16.3 | 15.0 | 10.1 |
| Evaluation of physical properties | Reduced viscosity | dL/g | 0.285 | 0.265 | 0.279 | 0.458 | 0.413 | 0.393 | 0.412 |
|  | Melt viscosity | Pa·s | 2720 | 2200 | 3200 | 2320 | 960 | 1470 | >6000 1200 (at 280° C.) |
|  | Glass transition temperature | ° C. | 158 | 161 | 163 | 160 | 122 | 129 | 171 |
|  | Water absorption | % | 2.8 | 0.5 | 1.3 | 4.3 | 1.9 | 1.7 | 0.4 |
|  | Residual amount of phenol | ppm | 580 | 720 | 560 | 800 | 760 | 710 | 38 |
|  | Residual amount of DPC | ppm | 160 | 140 | 140 | 130 | 120 | 80 | 12 |
|  | Residual amount of SBI | ppm | 330 | 200 | 340 | — | — | — | 30 |
|  | Photoelastic coefficient | ×10⁻¹² Pa⁻¹ | 17 | 16 | 23 | 13 | 18 | 9 | 62 |
|  | Δn | — | 0.0031 | 0.0019 | 0.0016 | 0.0060 | 0.0057 | 0.0028 | 0.0084 |
|  | R450/R550 | — | 1.02 | 1.02 | 0.98 | 1.02 | 1.02 | 1.02 | 1.07 |

|  |  |  | Comparative Example | | | | |
|---|---|---|---|---|---|---|---|
|  |  |  | 2-5 | 2-6 | 2-7 | 2-8 | 2-12 |
| Resin composition | SBI | mol % | — | — | — | — | 67.3 |
|  | ISB | mol % | 40.0 | 53.3 | — | 73.0 | 32.7 |
|  | CHDM | mol % | — | 32.3 | — | — | — |
|  | TCDDM | mol % | — | — | — | — | — |
|  | SPG | mol % | — | — | — | — | — |
|  | BPA | mol % | 60.0 | 14.4 | 100.0 | — | — |
|  | BHEPF | mol % | — | — | — | 27.0 | — |
|  | DPC | mol % | 100.0 | 100.0 | 100.0 | 100.0 | 100.0 |
|  | SBI structural unit | % by weight | — | — | — | — | 73.3 |
|  | ISB structural unit | % by weight | 26.0 | 41.9 | — | 41.9 | 16.8 |
|  | CHDM structural unit | % by weight | — | 25.1 | — | — | — |
|  | TCDDM structural unit | % by weight | — | — | — | — | — |
|  | SPG structural unit | % by weight | — | — | — | — | — |
|  | BPA structural unit | % by weight | 61.3 | 17.8 | 89.0 | — | — |
|  | BHEPF structural unit | % by weight | — | — | — | 47.0 | — |
|  | DPC structural unit | % by weight | 12.7 | 15.3 | 11.0 | 11.2 | 10.0 |
| Evaluation of physical properties | Reduced viscosity | dL/g | 0.370 | 0.528 | 0.505 | 0.322 | 0.210 |
|  | Melt viscosity | Pa·s | 2880 | 2750 | >6000 1050 (at 280° C.) | 2800 | 4600 |
|  | Glass transition temperature | ° C. | 152 | 119 | 146 | 151 | 195 |
|  | Water absorption | % | 0.8 | 1.1 | 0.2 | 1.1 | — |
|  | Residual amount of phenol | ppm | 540 | 770 | — | 600 | 320 |
|  | Residual amount of DPC | ppm | 130 | 120 | — | 140 | 150 |
|  | Residual amount of SBI | ppm | — | — | — | — | 450 |
|  | Photoelastic coefficient | ×10⁻¹² Pa⁻¹ | 59 | 35 | 80 | 24 | — |
|  | Δn | — | 0.0170 | 0.0053 | 0.0195 | 0.0015 | — |
|  | R450/R550 | — | 1.05 | 1.05 | 1.08 | 0.98 | — |

TABLE 4

|  |  |  | Example | | Comparative Example | | |
|---|---|---|---|---|---|---|---|
|  |  |  | 2-4 | 2-5 | 2-9 | 2-10 | 2-11 |
| Resin composition | SBI | mol % | 11.7 | 11.7 | — | — | — |
|  | ISB | mol % | 88.3 | 88.3 | 100.0 | 80.5 | 83.5 |
|  | BisZ | mol % | — | — | — | 19.5 | — |
|  | TER-BP | mol % | — | — | — | — | 16.5 |
|  | Compound 3 | mol % | 11.3 | 11.3 | 13.2 | 14.8 | 15.3 |
|  | DPC | mol % | 88.7 | 88.7 | 86.8 | 85.2 | 84.7 |
|  | SBI structural unit | % by weight | 15.0 | 15.0 | — | — | — |
|  | ISB structural unit | % by weight | 53.1 | 53.1 | 63.1 | 44.8 | 45.1 |
|  | BisZ structural unit | % by weight | — | — | — | 20.0 | — |
|  | TER-BP structural unit | % by weight | — | — | — | — | 20.0 |
|  | Compound 3 structural unit | % by weight | 21.5 | 21.5 | 26.2 | 26.0 | 26.0 |
|  | DPC structural unit | % by weight | 10.4 | 10.4 | 10.7 | 9.2 | 8.9 |
| Evaluation of physical properties | Reduced viscosity | dL/g | 0.298 | 0.335 | 0.410 | 0.325 | 0.313 |
|  | Melt viscosity | Pa · s | 3280 | 5900 | 3400 | 3100 | 3150 |
|  | Glass transition temperature | ° C. | 165 | 169 | 157 | 158 | 164 |
|  | Water absorption | % | 2.1 | 2.0 | 2.7 | 1.8 | 1.8 |
|  | Residual amount of phenol | ppm | 630 | 590 | 570 | 550 | 490 |
|  | Residual amount of DPC | ppm | 50 | 30 | 120 | 80 | 70 |
|  | Residual amount of SBI | ppm | 780 | 620 | — | — | — |
|  | Photoelastic coefficient | ×10$^{-12}$ Pa$^{-1}$ | 15 | 15 | 15 | 22 | 19 |
|  | Δn | — | 0.0010 | 0.0012 | 0.0012 | 0.0017 | 0.0022 |
|  | R450/R550 | — | 0.85 | 0.85 | 0.79 | 0.98 | 0.98 |

While the invention has been described in detail and with reference to specific embodiments thereof, it will be apparent to one skilled in the art that various changes and modifications can be made therein without departing from the spirit and scope thereof. It is to be noted that the present application is based on a Japanese patent application filed on Oct. 28, 2014 (Japanese Patent Application No. 2014-219462) and a Japanese patent application filed on Jan. 5, 2015 (Japanese Patent Application No. 2015-000163), and the contents are incorporated herein by reference.

The invention claimed is:

1. A polycarbonate resin comprising at least a structural unit represented by the following formula (1) and a structural unit represented by the following formula (2),

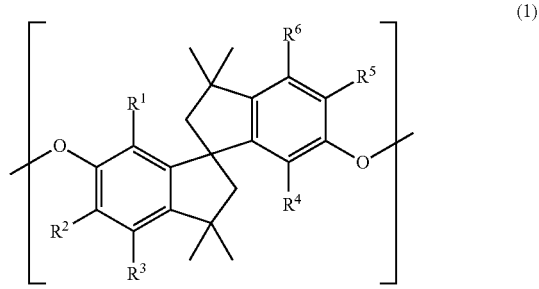

wherein in the formula (1), $R^1$ to $R^6$ each independently represent a hydrogen atom, an alkyl group having 1 to 12 carbon atoms, an aryl group, an alkoxy group having 1 to 12 carbon atoms, or a halogen atom,

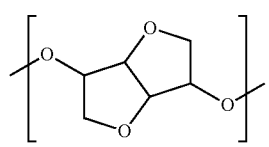

wherein when a total amount in weight of all of the structural units and connecting groups constituting the polycarbonate resin is defined as 100% by weight, the content of the structural unit represented by the following formula (1) is 1% by weight or more and 70% by weight or less, the content of the structural unit represented by the following formula (2) is 1% by weight or more and 70% by weight or less, and a structural unit derived from at least one compound selected from an aliphatic dihydroxy compound, an alicyclic dihydroxy compound, a dihydroxy compound containing an acetal ring, an oxyalkylene glycol, a dihydroxy compound containing an aromatic component, and a diester compound is contained in an amount of 0.1% by weight or more and 50% by weight or less.

2. A polycarbonate resin comprising at least a structural unit represented by the following formula (1) and a structural unit represented by the following formula (2),

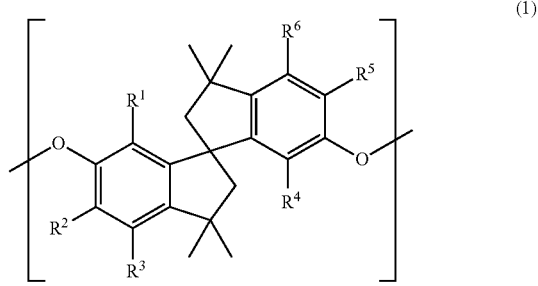

wherein in the formula (1), $R^1$ to $R^6$ each independently represent a hydrogen atom, an alkyl group having 1 to 12 carbon atoms, an aryl group, an alkoxy group having 1 to 12 carbon atoms, or a halogen atom;

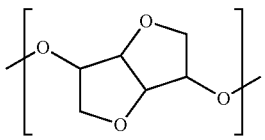

unsubstituted cycloalkyl group having 6 to 20 carbon atoms, or a substituted or unsubstituted aryl group having 6 to 20 carbon atoms; X represents a substituted or unsubstituted alkylene group having 2 to 10 carbon atoms, a substituted or unsubstituted cycloalkylene group having 6 to 20 carbon atoms, or a substituted or unsubstituted arylene group having 6 to 20 carbon atoms, and each X may be the same as or different; and m and n each independently represent an integer of 0 to 5;

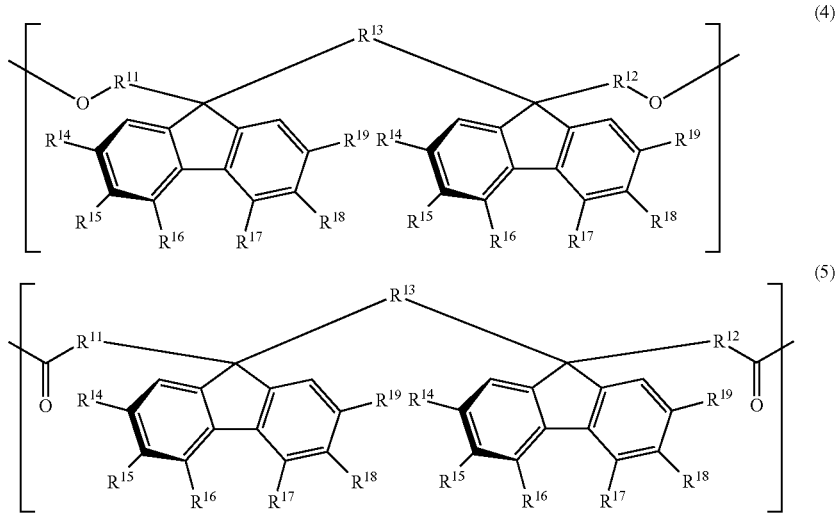

wherein
when a total amount in weight of all of the structural units and connecting groups constituting the polycarbonate resin is defined as 100% by weight,
the content of the structural unit represented by the following formula (1) is 1% by weight or more and 70% by weight or less,
the content of the structural unit represented by the following formula (2) is 1% by weight or more and 70% by weight or less, and
a structural unit derived from a compound having negative intrinsic birefringence is contained in an amount of 1% by weight or more and 70% by weight or less.

3. The polycarbonate resin according to claim 2, wherein the structural unit derived from the compound having a negative intrinsic birefringence is at least one selected from structural units represented by the following formulae (3) to (5):

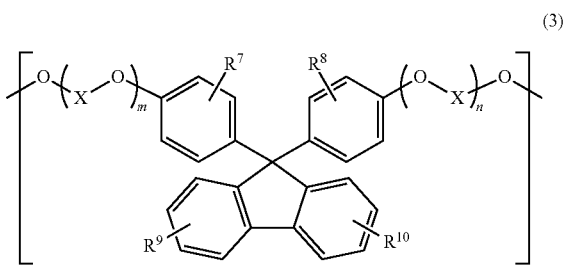

wherein in the formula (3), $R^7$ to $R^{10}$ each independently represent a hydrogen atom, a substituted or unsubstituted alkyl group having 1 to 20 carbon atoms, a substituted or wherein in the formulae (4) and (5), $R^{11}$ to $R^{13}$ each independently represent a direct bond or an optionally substituted alkylene group having 1 to 4 carbon atoms; and $R^{14}$ to $R^{19}$ each independently represent a hydrogen atom, an optionally substituted alkyl group having 1 to 10 carbon atoms, an optionally substituted aryl group having 4 to 10 carbon atoms, an optionally substituted acyl group having 1 to 10 carbon atoms, an optionally substituted alkoxy group having 1 to 10 carbon atoms, an optionally substituted aryloxy group having 1 to 10 carbon atoms, an optionally substituted amino group, an optionally substituted vinyl group having 1 to 10 carbon atoms, an optionally substituted ethynyl group having 1 to 10 carbon atoms, a sulfur atom having a substituent, a silicon atom having a substituent, a halogen atom, a nitro group, or a cyano group, provided that $R^{14}$ to $R^{19}$ may be the same as or different from each other, and at least two adjacent groups among $R^{14}$ to $R^{19}$ may be bonded to each other to form a ring.

4. The polycarbonate resin according to claim 1, wherein a glass transition temperature thereof is 120° C. or higher and 200° C. or lower.

5. The polycarbonate resin according to claim 2, wherein a glass transition temperature thereof is 120° C. or higher and 200° C. or lower.

6. A polycarbonate resin comprising a structural unit represented by the following formula (1) and having a glass transition temperature of 120° C. or higher and 180° C. or lower and a value of wavelength dispersion (R450/ R550) which is a ratio of a retardation (R450) at a wavelength of 450 nm and a retardation (R550) at a wavelength of 550 nm of 0.50 or more and 1.03 or less:

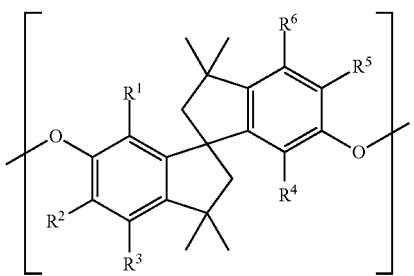
(1)

wherein in the formula (1), $R^1$ to $R^6$ each independently represent a hydrogen atom, an alkyl group having 1 to 12 carbon atoms, an aryl group, an alkoxy group having 1 to 12 carbon atoms, or a halogen atom.

7. The polycarbonate resin according to claim 6, wherein when a total amount in weight of all of the structural units and connecting groups constituting the polycarbonate resin is defined as 100% by weight, the structural unit represented by the formula (1) is contained in an amount of 1% by weight or more and 30% by weight or less.

8. The polycarbonate resin according to claim 6, wherein when a total amount in weight of all of the structural units and connecting groups constituting the polycarbonate resin is defined as 100% by weight, a structural unit represented by the following formula (2) is contained in an amount of 1% by weight or more and 70% by weight or less

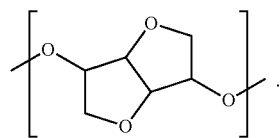
(2)

9. The polycarbonate resin according to claim 6, wherein when a total amount in weight of all of the structural units and connecting groups constituting the polycarbonate resin is defined as 100% by weight, at least one selected from structural units represented by the following formulae (3) to (5) is contained in an amount of 1% by weight or more and 70% by weight or less:

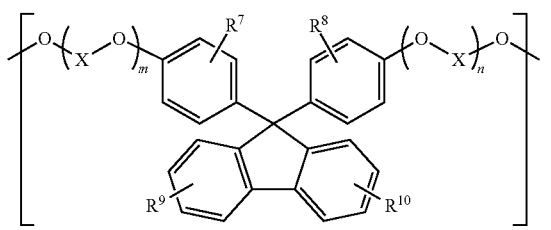
(3)

wherein in the formula (3), $R^7$ to $R^{10}$ each independently represent a hydrogen atom, a substituted or unsubstituted alkyl group having 1 to 20 carbon atoms, a substituted or unsubstituted cycloalkyl group having 6 to 20 carbon atoms, or a substituted or unsubstituted aryl group having 6 to 20 carbon atoms; X represents a substituted or unsubstituted alkylene group having 2 to 10 carbon atoms, a substituted or unsubstituted cycloalkylene group having 6 to 20 carbon atoms, or a substituted or unsubstituted arylene group having 6 to 20 carbon atoms, and each X may be the same as or different; and m and n each independently represent an integer of 0 to 5;

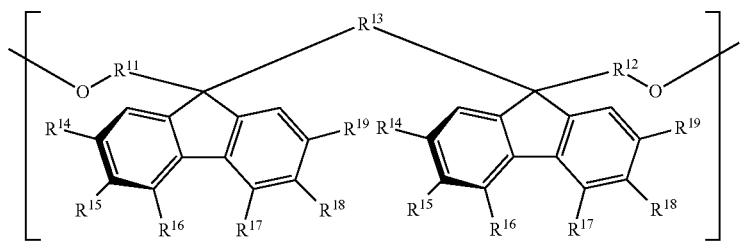
(4)

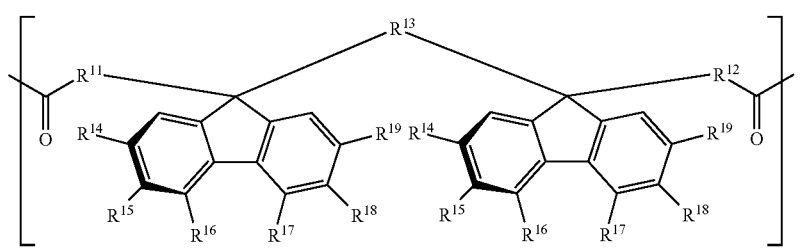
(5)

wherein in the formulae (4) and (5), $R^{11}$ to $R^{13}$ each independently represent a direct bond or an optionally substituted alkylene group having 1 to 4 carbon atoms; and $R^{14}$ to $R^{19}$ each independently represent a hydrogen atom, an optionally substituted alkyl group having 1 to 10 carbon atoms, an optionally substituted aryl group having 4 to 10 carbon atoms, an optionally substituted acyl group having 1 to 10 carbon atoms, an optionally substituted alkoxy group having 1 to 10 carbon atoms, an optionally substituted aryloxy group having 1 to 10 carbon atoms, an optionally substituted amino group, an optionally substituted vinyl group having 1 to 10 carbon atoms, an optionally substituted ethynyl group having 1 to 10 carbon atoms, a sulfur atom having a substituent, a silicon atom having a substituent, a halogen atom, a nitro group, or a cyano group, provided that $R^{14}$ to $R^{19}$ may be the same as or different from each other, and at least two adjacent groups among $R^{14}$ to $R^{19}$ may be bonded to each other to form a ring.

10. The polycarbonate resin according to claim 6, wherein when a total amount in weight of all of the structural units and connecting groups constituting the polycarbonate resin is defined as 100% by weight, a structural unit derived from at least one compound selected from an aliphatic dihydroxy compound, an alicyclic dihydroxy compound, a dihydroxy compound containing an acetal ring, an oxyalkylene glycol, a dihydroxy compound containing an aromatic component, and a diester compound is contained in an amount of 0.1% by weight or more and 50% by weight or less.

11. The polycarbonate resin according to claim 1, wherein when a total amount in weight of all of the structural units and connecting groups constituting the polycarbonate resin is defined as 100% by weight, an aromatic structural unit other than the structural units represented by the formulae (1), (3), (4), and (5) is contained in an amount of 5% by weight or less.

12. The polycarbonate resin according to claim 2, wherein when a total amount in weight of all of the structural units and connecting groups constituting the polycarbonate resin is defined as 100% by weight, an aromatic structural unit other than the structural units represented by the formulae (1), (3), (4), and (5) is contained in an amount of 5% by weight or less.

13. The polycarbonate resin according to claim 1, wherein a melt viscosity thereof at a measurement temperature of 240° C. and a shear rate of 91.2 sec$^{-1}$ is 800 Pa·s or more and 7,000 Pa·s or less.

14. The polycarbonate resin according to claim 2, wherein a melt viscosity thereof at a measurement temperature of 240° C. and a shear rate of 91.2 sec$^{-1}$ is 800 Pa·s or more and 7,000 Pa·s or less.

15. The polycarbonate resin according to claim 1, wherein in the polycarbonate resin, the content of the carbonic diester is 1 weight ppm or more and 300 weight ppm or less, the content of the monohydroxy compound derived from the carbonic diester is 1 weight ppm or more and 1,000 weight ppm or less, and the content of the dihydroxy compound represented by the following formula (6) is 1 weight ppm or more and 1,000 weight ppm or less;

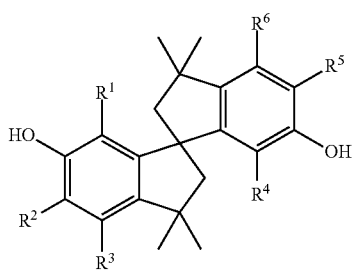

(6)

wherein in the formula (6), $R^1$ to $R^6$ each independently represent a hydrogen atom, an alkyl group having 1 to 12 carbon atoms, an aryl group, an alkoxy group having 1 to 12 carbon atoms, or a halogen atom.

16. The polycarbonate resin according to claim 2, wherein in the polycarbonate resin, the content of the carbonic diester is 1 weight ppm or more and 300 weight ppm or less, the content of the monohydroxy compound derived from the carbonic diester is 1 weight ppm or more and 1,000 weight ppm or less, and the content of the dihydroxy compound represented by the following formula (6) is 1 weight ppm or more and 1,000 weight ppm or less;

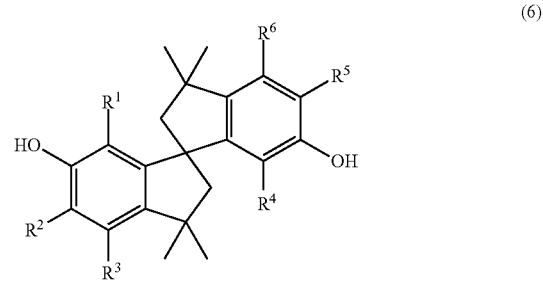

(6)

wherein in the formula (6), $R^1$ to $R^6$ each independently represent a hydrogen atom, an alkyl group having 1 to 12 carbon atoms, an aryl group, an alkoxy group having 1 to 12 carbon atoms, or a halogen atom.

17. A polycarbonate resin molded article comprising the polycarbonate resin according to claim 1.

18. A film or sheet comprising the polycarbonate resin according to claim 1.

19. A method for producing a transparent film comprising molding the polycarbonate resin according to claim 1 at a molding temperature of 280° C. or lower by a melt film formation method.

20. A retardation film comprising the film according to claim 18.

* * * * *